US012777166B1

(12) United States Patent
Misra et al.

(10) Patent No.: US 12,777,166 B1
(45) Date of Patent: Oct. 27, 2026

(54) COMPUTER-IMPLEMENTED MULTI-SCALE MACHINE LEARNING MODEL FOR THE MULTIPLE CHANNEL OUTPUT ENHANCEMENT OF COMPRESSED VIDEO

(71) Applicant: Amazon Technologies, Inc., Seattle, WA (US)

(72) Inventors: Kiran Mukesh Misra, Camas, WA (US); Christopher Andrew Segall, Camas, WA (US); Byeongdoo Choi, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/967,352

(22) Filed: Dec. 3, 2024

(51) Int. Cl.
*H04N 19/172* (2014.01)
*G06T 11/60* (2026.01)
(Continued)

(52) U.S. Cl.
CPC ............ *H04N 19/172* (2014.11); *G06T 11/60* (2013.01); *G06V 10/44* (2022.01); *H04N 19/59* (2014.11)

(58) Field of Classification Search
CPC ...... H04N 19/172; H04N 19/59; G06T 11/60; G06V 10/44
(Continued)

(56) References Cited

U.S. PATENT DOCUMENTS 8,989,508 B2 3/2015 Deshpande
9,049,427 B2 6/2015 Hattori
(Continued)

FOREIGN PATENT DOCUMENTS

WO 2025/025198 A1 2/2025

OTHER PUBLICATIONS

Final Office Action, U.S. Appl. No. 18/186,084, Mar. 7, 2025, 25 pages.
(Continued)

*Primary Examiner* — Asmamaw G Tarko
(74) *Attorney, Agent, or Firm* — NICHOLSON DE VOS WEBSTER & ELLIOTT LLP

(57) ABSTRACT

The present disclosure relates to methods, apparatus, systems, and non-transitory computer-readable storage media for training and using a multi-scale machine learning model for the multiple channel output enhancement of compressed video. According to some examples, a computer-implemented method includes receiving a video comprising a frame at a content delivery service; performing an encode on the frame of the video by the content delivery service that coverts the frame from a pixel domain to a transform domain and back to the pixel domain to generate first pixel values and first sample values based on a prediction for a block of the frame at a first resolution; generating a first set of features at the first resolution, by a machine learning model of the content delivery service, for a first input at the first resolution of the first pixel values and the first sample values of the block; generating a second set of features at a second lower resolution than the first resolution, by the machine learning model of the content delivery service, for a second input based on the first pixel values and the first sample values of the block; upsampling the second set of features to the first resolution to generate an upsampled second set of features; generating, by the machine learning model of the content delivery service, a multiple channel output based on the first set of features and the upsampled second set of features; generating a modified version of the frame based on the encode; generating a correction value based on the multiple channel output; and transmitting the modified version of the frame and the correction value from the content delivery service to a viewer device.

20 Claims, 79 Drawing Sheets

(51) Int. Cl.
*G06V 10/44* (2022.01)
*H04N 19/59* (2014.01)

(58) Field of Classification Search
USPC ........................................ 375/240.12, 240.18
See application file for complete search history.

(56) References Cited

U.S. PATENT DOCUMENTS

| | | | | |
|---|---|---|---|---|
| 9,319,703 | B2 | 4/2016 | Wang | |
| 9,969,299 | B2 | 5/2018 | Murase et al. | |
| 10,313,698 | B2 | 6/2019 | Sullivan et al. | |
| 10,623,753 | B2 | 4/2020 | Skupin et al. | |
| 11,700,390 | B2 | 7/2023 | Wang | |
| 11,743,505 | B2 | 8/2023 | Wang | |
| 11,765,394 | B2 | 9/2023 | Wang et al. | |
| 11,812,062 | B2 | 11/2023 | Wang | |
| 12,022,122 | B2 | 6/2024 | Deshpande | |
| 12,034,927 | B2 | 7/2024 | Okawa et al. | |
| 12,646,149 | B2 | 6/2026 | Vasconcelos | |
| 2006/0126952 | A1 * | 6/2006 | Suzuki | H04N 19/192 375/E7.199 |
| 2010/0220939 | A1 * | 9/2010 | Tourapis | H04N 19/577 382/261 |
| 2014/0086336 | A1 | 3/2014 | Wang | |
| 2018/0249158 | A1 | 8/2018 | Huang et al. | |
| 2019/0068969 | A1 | 2/2019 | Rusanovskyy et al. | |
| 2020/0374524 | A1 * | 11/2020 | Gao | H04N 19/105 |
| 2022/0321919 | A1 * | 10/2022 | Deshpande | H04N 19/117 |
| 2023/0017808 | A1 | 1/2023 | Tan et al. | |
| 2023/0412806 | A1 | 12/2023 | Yang et al. | |
| 2024/0137577 | A1 * | 4/2024 | Lin | G06T 3/4053 |
| 2024/0205439 | A1 | 6/2024 | Sjberg et al. | |
| 2024/0214558 | A1 | 6/2024 | Dumas et al. | |
| 2024/0236345 | A1 | 7/2024 | Misra et al. | |
| 2024/0236366 | A1 | 7/2024 | Choi et al. | |
| 2024/0267548 | A1 | 8/2024 | Du et al. | |
| 2024/0292003 | A1 * | 8/2024 | Damghanian | H04N 19/188 |
| 2024/0422360 | A1 | 12/2024 | Kang et al. | |
| 2025/0126290 | A1 | 4/2025 | Kondaparthi et al. | |
| 2025/0165854 | A1 | 5/2025 | Shim et al. | |
| 2025/0238964 | A1 | 7/2025 | Huang et al. | |

OTHER PUBLICATIONS

Kang, Jihong et al., "Multi-modal/Multi-scale Convolutional Neural Network Based In-loop Filter Design for Next Generation Video Codec", IEEE International Conference on Image Processing, Sep. 2017, 5 pages.
Notice of Allowance, U.S. Appl. No. 18/186,006, Apr. 7, 2025, 7 pages.
Notice of Allowance, U.S. Appl. No. 18/342,406, Mar. 19, 2025, 5 pages.
Wang, Zhao et al., "AHG11: Separate Density Attention Network for Loop Filtering", 22nd Meeting of the Joint Video Experts Team (JVET), Document No. JVET-V0074-v3, Apr. 2021, 3 pages.
Wang, Zhao et al., "Multi-Density Attention Network for Loop Filtering in Video Compression", arXiv:2104.12865v1, Apr. 8, 2021, 9 pages.
Notice of Allowance, U.S. Appl. No. 18/186,084, Jun. 24, 2025, 10 pages.
U.S. Appl. No. 18/186,006, Pending.
U.S. Appl. No. 18/186,084, Pending.
U.S. Appl. No. 18/342,406, Pending.
U.S. Appl. No. 18/752,554, Pending.
U.S. Appl. No. 18/895,188, Pending.
De Rivaz, P., et al., "AV1 Bitstream & Decoding Process Specification", Version 1.0.0 with Errata 1, Jan. 8, 2019, available online at https://aomediacodec.github.io/av1-spec/av1-spec.pdf, 681 pages.
Ding, Dandan et al., "Advances In Video Compression System Using Deep Neural Network: A Review And Case Studies", arXiv:2101.06341v1, Jan. 16, 2021, 27 pages.
International Search Report and Written Opinion, PCT App. No. PCT/US2024/010748, May 3, 2024, 09 pages.
Kang, Jihong et al., "Multi-modal/multi-scale Convolutional Neural Network Based In-loop Filter Design for Next Generation Video Codec", IEEE International Conference on Image Processing (ICIP), Sep. 2017, pp. 26-30.
Non-Final Office Action, U.S. Appl. No. 18/186,006, Oct. 25, 2024, 12 pages.
Non-Final Office Action, U.S. Appl. No. 18/186,084, Aug. 14, 2024, 20 pages.
Non-Final Office Action, U.S. Appl. No. 18/342,406, Dec. 4, 2024, 14 pages.
The Linux Foundation, "CONV2D", PyTorch open source code, Dec. 2022, retrieved from https://pytorch.org/docs/stable/generated/torch.nn.Conv2d.html, 2 pages.
Wang, Zhao et al., "AHG11: Separate Density Attention Network for Loop Filtering", Joint Video Experts Team (JVET) of ITU-T SG 16 WP 3 and ISO/IEC JTC 1/SC 29, 22nd Meeting, Apr. 2021, 3 pages.
Zhao, Yanchen et al., "Joint Luma and Chroma Multi-Scale CNN In-loop Filter for Versatile Video Coding", IEEE International Symposium on Circuits and Systems (ISCAS), May 2022, pp. 3205-3209.
Galpin, Franck et al., "Algorithm Description for Neural Network-based Video Coding (NNVC-7.0)", Joint Video Experts Team, Document JVET-AF2019-v1, Oct. 2023, 38 pages.
Galpin, Franck et al., "Algorithm Description for Neural Network-based Video Coding (NNVC-9.1)", Joint Video Experts Team, Document JVET-AH2019-v1, Apr. 2024, 44 pages.
International Search Report and Written Opinion, PCT App. No. PCT/US2025/032709, Sep. 16, 2025, 16 pages.
Merkle, Phillipp, "Spatio-Temporal Convolutional Neural Network for Enhanced Inter Prediction in Video Coding", IEEE Transactions on Image Processing, vol. 33, Aug. 2024, pp. 4738-4752.
Misra, Kiran et al., "Reduced Complexity Multiscale CNN for In-Loop Video Restoration", IEEE International Conference on Image Processing, Oct. 2023, pp. 930-934.
Purica, Andrei et al., "A Convex Optimization Framework for Video Quality and Resolution Enhancement from Multiple Descriptions", IEEE Transactions on Image Processing, vol. 28, No. 4, Apr. 2019, pp. 1661-1674.
Shi, Wenzhe, "Real-Time Single Image and Video Super-Resolution Using an Efficient Sub-Pixel Convolutional Neural Network", IEEE Conference on Computer Vision and Pattern Recognition, Jun. 2016, pp. 1874-1883.
Non-Final Office Action, U.S. Appl. No. 18/752,554, Mar. 27, 2026, 9 pages.
Non-Final Office Action, U.S. App. No. 18/895,188, Jun. 10, 2026, 13 pages.
Requirement for Restriction/Election, U.S. Appl. No. 19/082,042, Apr. 22, 2026, 7 pages.
Non-Final Office Action, U.S. Appl. No. 19/072,989, Jul. 31, 2026, 17 pages.
Notice of Allowance, U.S. Appl. No. 18/752,554, Aug. 12, 2026, 10 pages.
International Search Report and Written Opinion, PCT App. No. PCT/US2026/017836, Jun. 29, 2026, 18 pages.
Lam, Yat-Hong et al., "Efficient Adaptation of Neural Network Filter for Video Compression", Proceedings of the 28th ACM International Conference on Multimedia, Oct. 12, 2020, pp. 358-366.

* cited by examiner $$ReLU(x) \equiv \begin{cases} x & x > 0 \\ 0 & x \leq 0 \end{cases}$$

$$sigmoid(x) = \frac{1}{1 + e^{-x}}$$

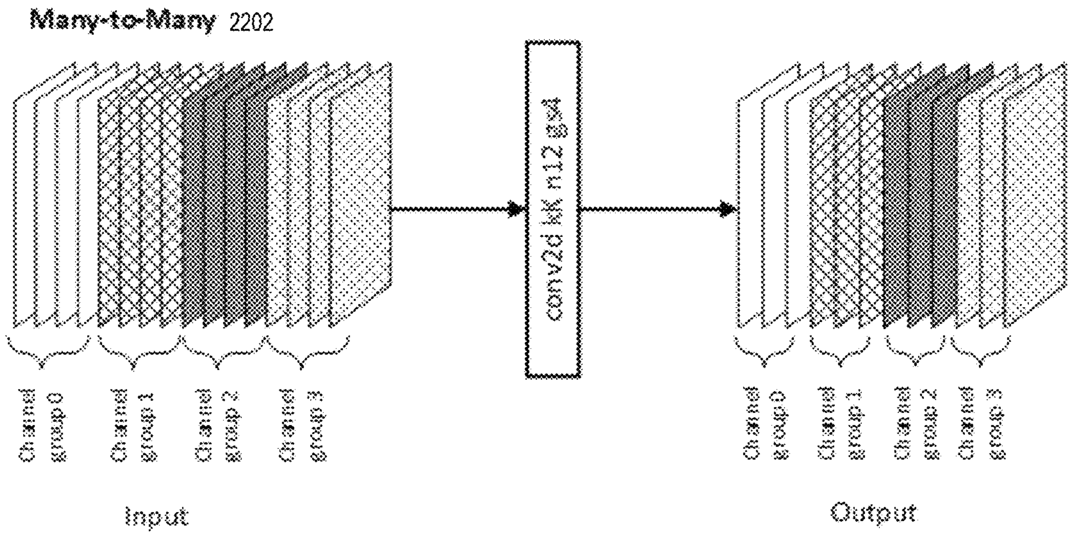
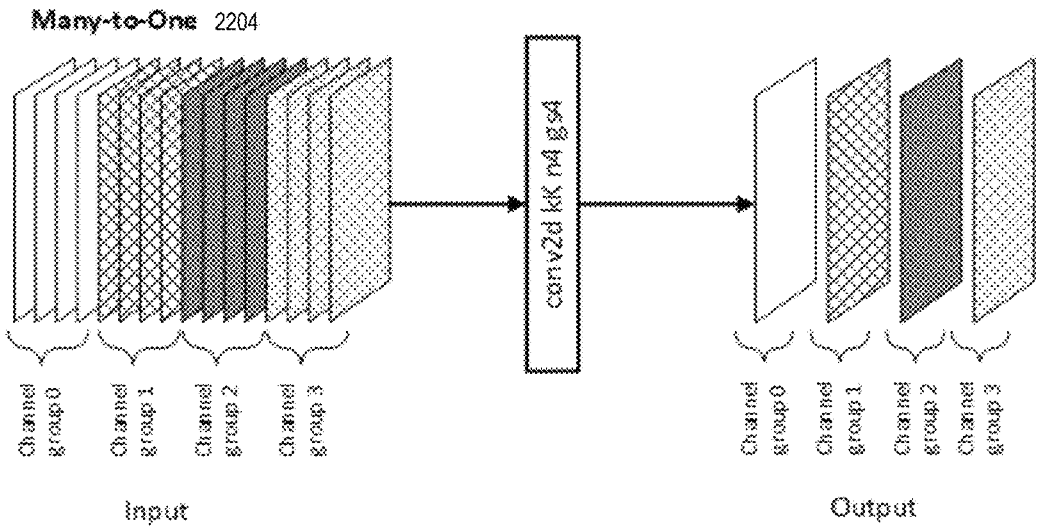
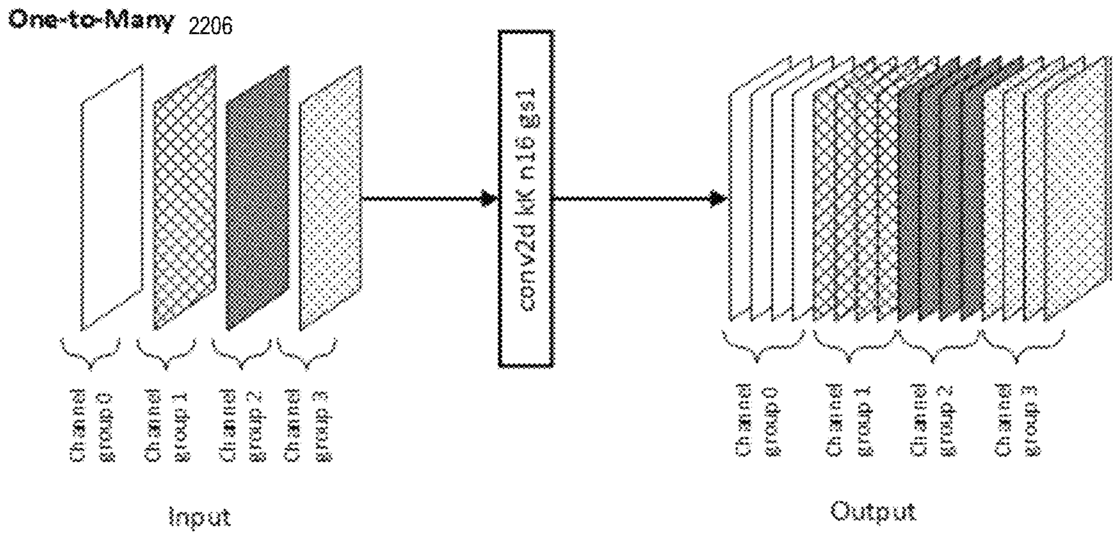
FIG. 22

$$out_i = \frac{input_i - bn_0}{bn_1} * bn_2 + bn_3$$

FIG. 26

3300

| | | High resolution processing path | | | | | Low resolution processing path | | | |
|---|---|---|---|---|---|---|---|---|---|---|
| Super resolution spatial resampling scale factor (*SF*) | | Desired upsampling: *scale=SF* | Number of phases (output channels per input channel) needed: *g(scale)* | Stride for convolutional layer generating phases | PixelShuffle upscale factor: *g(scale)^1/2* | | Desired upsampling: *scale=2*SF* | Number of phases (output channels per input channel) needed: *g(scale)* | Stride for convolutional layer generating phases | PixelShuffle upscale factor: *g(scale)^1/2* |
| 1x | | 1x | N/A | N/A | N/A | | 2x | 4 | 1 | 2 |
| 1.5x | | 1.5x | 9 | 2 | 3 | | 3x | 9 | 1 | 3 |
| 2x | | 2x | 4 | 1 | 2 | | 4x | 16 | 1 | 4 |
| 3x | | 3x | 9 | 1 | 3 | | 6x | 36 | 1 | 6 |
| 4x | | 4x | 16 | 1 | 4 | | 8x | 64 | 1 | 8 |
| 6x | | 6x | 36 | 1 | 6 | | 12x | 144 | 1 | 12 |

FIG. 33

3900

| | |
|---|---|
| sequence_header_obu() { | Type |
| ... | |
| enable_ml_operation_seq | f(1) |
| ... | |
| } | |

FIG. 39

4000

| uncompressed_header() { | Type |
|---|---|
| .... | |
| loop_filter_params() | |
| cdef_params() | |
| nn_operation_params() | |
| lr_params() | |
| .... | |
| } | |

FIG. 40

4100

| nn_operation_params() { | Type |
| --- | --- |
| .... | |
| UsesNN = 0 | |
| if (enable_nn_operation_seq) { | |
| **enable_nn_operation** | f(1) |
| if (enable_nn_operation) | |
| UsesNN = 1 | |
| if (UsesNN) { | |
| model_selector() | |
| nn_operation_scale() | |
| } | |
| | |
| .... | |
| } | |

*FIG. 41*

4200

| model_selector() { | Type |
| --- | --- |
| .... | |
| model_idc | f(2) |
| | |
| .... | |
| } | |

FIG. 42

4300

| model_selector() { | Type |
|---|---|
| .... | |
| for (model_idx = 0; model_idx<12; model_idx++) | |
| ModelSelected[model_idx] = 0 | |
| model_count = 0 | |
| for (model_idx = 0; model_idx<11; model_idx++) { | |
| **model_flag** | f(1) |
| if (model_flag) { | |
| ModelSelected[model_idx] = 1 | |
| model_count++ | |
| } | |
| if (mode_count == 3) | |
| break | |
| } | |
| if (model_count < 3) | |
| ModelSelected[11] = 1 | |
| .... | |
| } | |

*FIG. 43*

4400

| nn_operation_scale() { | Type |
| --- | --- |
| .... | |
| NNScale = 1.0 | |
| **nn_operation_scale_indicator0** | f(1) |
| if (nn_operation_scale_indicator0) { | |
| **nn_operation_scale_indicator1** | f(1) |
| NNScale = (nn_operation_scale_indicator1) ? 0.75 : 0.50 | |
| } | |
| .... | |
| } | |

FIG. 44

4500

| nn_operation_scale() { | Type |
|---|---|
| .... | |
| NNScale = 0.75 | |
| **nn_operation_scale_indicator0** | f(1) |
| if (nn_operation_scale_indicator0) { | |
| **nn_operation_scale_indicator1** | f(1) |
| NNScale = (nn_operation_scale_indicator1) ? 0.50 : 1.00 | |
| } | |
| .... | |
| } | |

FIG. 45

4600

| nn_operation_scale() { | Type |
| --- | --- |
| .... | |
| index_value = 0 | |
| do { | |
| **nn_operation_scale_indicator** | f(1) |
| if( nn_operation_scale_indicator ) { | |
| index_value = index_value + 1 | |
| } | |
| } while (nn_operation_scale_indicator0) | |
| | |
| NNScale = ValueTable[ index_value ] | |
| .... | |
| } | |

FIG. 46

4700

| nn_operation_scale() { | Type |
|---|---|
| .... | |
| channel_idx = 0 | |
| for (model_idx = 0; model_idx < 12; model_idx++) { | |
| if (ModelSelected[model_idx]) { | |
| for (cur_model_channel_idx = 0; cur_model_channel_idx < 4; cur_model_channel_idx++) { | |
| NNScale[channel_idx] = 1.0 | |
| **nn_operation_scale_indicator0** | f(1) |
| if (nn_operation_scale_indicator0) { | |
| **nn_operation_scale_indicator1** | f(1) |
| NNScale[channel_idx] = (nn_operation_scale_indicator1) ? 0.75 : 0.50 | |
| } | |
| channel_idx++ | |
| } | |
| } | |
| } | |
| .... | |
| } | |

FIG. 47

4800

| QP Range | Intra Picture Model Sets | | QP Range | Inter Picture Sets |
|---|---|---|---|---|
| QP <= 99 | model 0, 1, 2, 3 | | QP <= 110 | model 24, 25, 26, 27 |
| 100 <= QP <= 124 | model 4, 5, 6, 7 | | 111 <= QP <= 135 | model 28, 29, 30, 31 |
| 125 <= QP <= 149 | model 8, 9, 10, 11 | | 136 <= QP <= 160 | model 32, 33, 34, 35 |
| 150 <= QP <= 174 | model 12, 13, 14, 15 | | 161 <= QP <= 185 | model 36, 37, 38, 39 |
| 175 <= QP <= 199 | model 16, 17, 18, 19 | | 186 <= QP <= 210 | model 40, 41, 42, 43 |
| 200 <= QP | model 20, 21, 22, 23 | | 211 <= QP | model 44, 45, 46, 47 |

*FIG. 48*

4900

| nn_operation_params() { | Type |
|---|---|
| .... | |
| UsesNN = 0 | |
| if (enable_nn_operatoin_seq) { | |
| **enable_nn_operation** | f(1) |
| if (enable_nn_operation) | |
| UsesNN = 1 | |
| if (UsesNN) { | |
| **model_available_count_minus1** | f(2) |
| for (model_available_idx = 0; model_available_idx < (model_available_count_minus1 + 1); model_available_idx++) { | |
| **model_identifier** | f(6) |
| AvailableModelList[ model_available_idx ] = model_identifier | |
| } | |
| model_selector() | |
| nn_operation_scale() | |
| }} | |
| | |
| .... | |
| } | |

*FIG. 49*

5000

| nn_operation_params() { | Type |
|---|---|
| … | |
| if (UsesNN) { | |
| … | |
| nn_operation_block_control_enable | f(1) |
| if (nn_operation_block_control_enable) | |
| nn_operation_block_size_idc | f(2) |
| } | |
| | |
| … | |
| } | |

FIG. 50

5100

| decode_tile() { | Type |
|---|---|
|   ... | |
|   sbSize = use_128x128_superblock ? BLOCK_128X128 : BLOCK_64X64 | |
|   sbSize4 = Num_4x4_Blocks_Wide[ sbSize ] | |
|   for ( r = MiRowStart; r < MiRowEnd; r += sbSize4 ) { | |
|     ... | |
|     for ( c = MiColStart; c < MiColEnd; c += sbSize4 ) { | |
|       ... | |
|       if (nn_operation_block_control_enable) | |
|         read_nn_operation( r, c, sbSize ) | |
|       ... | |
|     } | |
|   } | |
|   ... | |
| } | |

FIG. 51

5200

| read_nn_operation( r, c, bSize ) { | Type |
|---|---|
| ... | |
| unitSize = NNOperationUnitSize[ nn_operatoin_block_size_idc ] | |
| for ( unitRow = unitRowStart; unitRow < unitRowEnd; unitRow++ ) { | |
| for ( unitCol = unitColStart; unitCol < unitColEnd; unitCol++ ) { | |
| **enable_unit_nn_operation** | S() |
| ApplyNNOperationToUnit[ unitRow ][ unitCol ] = enable_unit_nn_operation | |
| } | |
| } | |
| ... | |
| } | |

*FIG. 52*

5300

| nn_operation_params() { | Type |
| --- | --- |
| .... | |
| UseBlockLevelControlMode = 0 | |
| MODE_ON_OFF_FLAG_AT_BLOCK_LEVEL = 1 | |
| MODE_SCALE_AT_BLOCK_LEVEL = 2 | |
| if (UsesNN) { | |
| .... | |
| **nn_operation_block_control_enable** | f(1) |
| if (nn_operation_block_control_enable) { | |
| **nn_operation_block_size_idc** | f(2) |
| **nn_signal_scale_at_pic_level** | f(1) |
| if (nn_signal_scale_at_pic_level) { | |
| UseBlockLevelControlMode = MODE_ON_OFF_FLAG_AT_BLOCK_LEVEL | |
| nn_operation_scale() | |
| } else { | |
| UseBlockLevelControlMode = MODE_SCALE_AT_BLOCK_LEVEL | |
| } // end if (nn_signal_scale_at_pic_level) | |
| } else { | |
| nn_operation_scale() | |
| } // end if (nn_operation_block_control_enable) | |
| model_selector() | |
| } // end if (UsesNN) | |
| .... | |
| } | |

FIG. 53

5400

| read_nn_operation( r, c, bSize ) { | Type |
|---|---|
| .... | |
| unitSize = NNOperationUnitSize[ nn_operatoin_block_size_idc ] | |
| for ( unitRow = unitRowStart; unitRow < unitRowEnd; unitRow++ ) { | |
| for ( unitCol = unitColStart; unitCol < unitColEnd; unitCol++ ) { | |
| **enable_unit_nn_operation** | S() |
| ApplyNNOperationToUnit[ unitRow ][ unitCol ] = enable_unit_nn_operation | |
| if (ApplyNNOperationToUnit[ unitRow ][ unitCol ] && UseBlockLevelControlMode == MODE_SCALE_AT_BLOCK_LEVEL) { | |
| nn_operation_scale() | |
| ScaleNNOperationToUnit[ unitRow ][ unitCol ] = NNScale | |
| } | |
| } | |
| } | |
| .... | |
| } | |

FIG. 54

5500

| nn_operation_params() { | Type |
|---|---|
| .... | |
| UseBlockLevelControlMode = 0 | |
| MODE_ON_OFF_FLAG_AT_BLOCK_LEVEL = 1 | |
| MODE_MODEL_AT_BLOCK_LEVEL = 2 | |
| if (UsesNN) { | |
| .... | |
| **nn_operation_block_control_enable** | f(1) |
| if (nn_operation_block_control_enable) { | |
| **nn_operation_block_size_idc** | f(2) |
| **nn_signal_model_at_pic_level** | f(1) |
| if (nn_signal_model_at_pic_level) { | |
| UseBlockLevelControlMode = MODE_ON_OFF_FLAG_AT_BLOCK_LEVEL | |
| model_selector() | |
| } else { | |
| UseBlockLevelControlMode = MODE_MODEL_AT_BLOCK_LEVEL | |
| } // end if (nn_signal_model_at_pic_level) | |
| } else { | |
| model_selector() | |
| } // end if (nn_operation_block_control_enable) | |
| nn_operation_scale() | |
| } // end if (UsesNN) | |
| .... | |
| } | |

*FIG. 55*

5600

| read_nn_operation( r, c, bSize ) { | Type |
|---|---|
| .... | |
| unitSize = NNOperationUnitSize[ nn_operatoin_block_size_idc ] | |
| for ( unitRow = unitRowStart; unitRow < unitRowEnd; unitRow++ ) { | |
| for ( unitCol = unitColStart; unitCol < unitColEnd; unitCol++ ) { | |
| **enable_unit_nn_operation** | S() |
| ApplyNNOperationToUnit[ unitRow ][ unitCol ] = enable_unit_nn_operation | |
| if (ApplyNNOperationToUnit[ unitRow ][ unitCol ] && UseBlockLevelControlMode == MODE_MODEL_AT_BLOCK_LEVEL) { | |
| model_selector() | |
| ModelNNOperationToUnit[ unitRow ][ unitCol ] = model_idc | |
| } | |
| } | |
| } | |
| .... | |
| } | |

*FIG. 56*

5700

| nn_operation_params() { | Type |
|---|---|
| .... | |
| UseBlockLevelControlMode = 0 | |
| MODE_ON_OFF_FLAG_AT_BLOCK_LEVEL = 1 | |
| MODE_SCALE_AT_BLOCK_LEVEL = 2 | |
| MODE_MODEL_AT_BLOCK_LEVEL = 3 | |
| MODE_MODEL_AND_SCALE_AT_BLOCK_LEVEL = 4 | |
| if (UsesNN) { | |
| .... | |
| **nn_operation_block_control_enable** | f(1) |
| if (nn_operation_block_control_enable) { | |
| **nn_operation_block_size_idc** | f(2) |
| **nn_signal_scale_at_pic_level** | f(1) |
| if (nn_signal_scale_at_pic_level) { | |
| UseBlockLevelControlMode = MODE_ON_OFF_FLAG_AT_BLOCK_LEVEL | |
| nn_operation_scale() | |
| } else { | |
| UseBlockLevelControlMode = MODE_SCALE_AT_BLOCK_LEVEL | |
| } // end if (nn_signal_scale_at_pic_level) | |
| **nn_signal_model_at_pic_level** | f(1) |
| if (nn_signal_model_at_pic_level) { | |
| UseBlockLevelControlMode = MODE_ON_OFF_FLAG_AT_BLOCK_LEVEL | |
| model_selector() | |
| } else { | |
| UseBlockLevelControlMode = (UseBlockLevelControlMode == MODE_SCALE_AT_BLOCK_LEVEL) ? MODE_MODEL_AND_SCALE_AT_BLOCK_LEVEL : MODE_MODEL_AT_BLOCK_LEVEL | |
| } // end if (nn_signal_model_at_pic_level) | |
| } else { | |
| nn_operation_scale() | |
| model_selector() | |
| } // end if (nn_operation_block_control_enable) | |
| } // end if (UsesNN) | |
| .... | |
| } | |

FIG. 57

5800

| read_nn_operation( r, c, bSize ) { | Type |
| --- | --- |
| .... | |
| unitSize = NNOperationUnitSize[ nn_operatoin_block_size_idc ] | |
| for ( unitRow = unitRowStart; unitRow < unitRowEnd; unitRow++ ) { | |
| for ( unitCol = unitColStart; unitCol < unitColEnd; unitCol++ ) { | |
| **enable_unit_nn_operation** | S() |
| ApplyNNOperationToUnit[ unitRow ][ unitCol ] = enable_unit_nn_operation | |
| if (ApplyNNOperationToUnit[ unitRow ][ unitCol ]) { | |
| if (UseBlockLevelControlMode == MODE_SCALE_AT_BLOCK_LEVEL \|\| UseBlockLevelControlMode == MODE_MODEL_AND_SCALE_AT_BLOCK_LEVEL) { | |
| nn_operation_scale_blk() | |
| ScaleNNOperationToUnit[ unitRow ][ unitCol ] = NNScale | |
| } | |
| if (UseBlockLevelControlMode == MODE_MODEL_AT_BLOCK_LEVEL \|\| UseBlockLevelControlMode == MODE_MODEL_AND_SCALE_AT_BLOCK_LEVEL) { | |
| model_selector() | |
| ModelNNOperationToUnit[ unitRow ][ unitCol ] = model_idc | |
| } | |
| } | |
| } | |
| } | |
| .... | |
| } | |

FIG. 58

6400

| nn_operation_params() { | Type |
|---|---|
| .... | |
| if (UsesNN) { | |
| model_selector() | |
| **nn_scale_centroid0** | f(4) |
| **nn_scale_centroid1** | f(4) |
| // Derive value for stepSizeCentroid, and array with valid set of values for stepSizeDifference0 and stepSizeDifference1 | |
| DeriveCentroidStepSizes(base qp, bit depth, is_intra) | |
| centroid0 = ( nn_scale_centroid0 - ($2^3$ - 1) ) | |
| centroid1 = ( nn_scale_centroid1 - ($2^3$ - 1) ) | |
| **nn_scale_diff_bits_idc0** | f(2) |
| **nn_scale_diff_bits_idc1** | f(2) |
| nn_scale_diff_bits0 = nn_scale_diff_bits_array[nn_scale_diff_bits_idc0] | |
| nn_scale_diff_bits1 = nn_scale_diff_bits_array[nn_scale_diff_bits_idc1] | |
| if (nn_scale_diff_bits0 > 0) { | |
| **nn_scale_diff_step_size_idc0** | f(3) |
| stepSizeDifference0 = diff_step_size_array[nn_scale_diff_step_size_idc0] | |
| } else | |
| stepSizeDifference0 = 0 | |
| if (nn_scale_diff_bits1 > 0) { | |
| **nn_scale_diff_step_size_idc1** | f(3) |
| stepSizeDifference1 = diff_step_size_array[nn_scale_diff_step_size_idc1] | |
| } else | |
| stepSizeDifference1 = 0 | |
| **nn_operation_block_control_enable** | f(1) |
| if (nn_operation_block_control_enable) { | |
| **nn_operation_block_size_idc** | f(3) |
| **nn_pic_merge_enable** | f(1) |
| } | |
| } // end if (UsesNN) | |
| .... | |
| } | |

FIG. 64

6500

| read_nn_operation( r, c, bSize ) { | Type |
| --- | --- |
| .... | |
| unitSize = NNOperationUnitSize[ nn_operatoin_block_size_idc ] | |
| for ( unitRow = unitRowStart; unitRow < unitRowEnd; unitRow++ ) { | |
| for ( unitCol = unitColStart; unitCol < unitColEnd; unitCol++ ) { | |
| curBlkH = min(PicH - unitRow * unitSize, unitRow * unitSize) // in variants can use distance to tile or slice boundary instead of pic boundary to bound the derived value | |
| curBlkW = min(PicW - unitCol * unitSize, unitHeight * unitSize) // in variants can use distance to tile or slice boundary instead of pic boundary to bound the derived value | |
| read_nn_splits(uintRow, uintCol, curBlkH, curBlkW, unitSize) | |
| } | |
| } | |
| .... | |
| } | |

FIG. 65

6600

| | |
|---|---|
| read_nn_splits( y, x, curBlkH, curBlkW, unitSize ) { | Type |
| if ( SplitAllowed( y, x, curBlkH, curBlkW, unitSize ) ) { | |
| leftNoSplitTypeCtxt = leftNeighborSplitTypeAvailable ? (SplitType[y][x-1] == NN_NO_SPLIT ? 1 : 0 ) : 0 | |
| topNoSplitTypeCtxt = topNeighborSplitTypeAvailable ? (SplitType[y-1][x] == NN_NO_SPLIT ? 1 : 0 ) : 0 | |
| **nn_no_split** // Coded using context selected based on leftNoSplitTypeCtxt and topNoSplitTypeCtxt | S() |
| if (nn_no_split) { | |
| SetSplitType( y, x, curBlkH, curBlkW, NN_NO_SPLIT ) | |
| read_nn_blk_info( y, x, curBlkH, curBlkW ) | |
| } else { | |
| if ( QuadSplitAllowed( y, x, curBlkH, curBlkW, unitSize ) ) { | |
| leftQuadSplitTypeCtxt = leftNeighborSplitTypeAvailable ? (SplitType[y][x-1] == NN_QUAD_SPLIT ? 1 : 0 ) : 0 | |
| topQuadSplitTypeCtxt = topNeighborSplitTypeAvailable ? (SplitType[y-1][x] == NN_QUAD_SPLIT ? 1 : 0 ) : 0 | |
| **nn_quad_split** // Coded using context selected based on leftQuadSplitTypeCtxt and topQuadSplitTypeCtxt | S() |
| if ( nn_quad_split ) { | |
| SetSplitType( y, x, curBlkH, curBlkW, NN_QUAD_SPLIT ) | |
| read_nn_blk_info( y, x, unitSize/2, unitSize/2 ) | |
| read_nn_blk_info( y, x + unitSize/2, unitSize/2, curBlkW - unitSize/2 ) | |
| read_nn_blk_info( y + unitSize/2, x, curBlkH - unitSize/2, unitSize/2 ) | |
| read_nn_blk_info( y + unitSize/2, x + unitSize/2, curBlkH - unitSize/2, curBlkW - unitSize/2 ) | |
| } else { | |
| read_nn_vert_horz_splits( y, x, curBlkH, curBlkW, unitSize ) | |
| } | |
| } else { | |
| read_nn_vert_horz_splits( y, x, curBlkH, curBlkW, unitSize ) | |
| } | |
| } | |
| } else { | |
| SetSplitType( y, x, curBlkH, curBlkW, NN_NO_SPLIT ) | |
| read_nn_blk_info( y, x, curBlkH, curBlkW ) | |
| } | |
| } | |

FIG. 66

6700

| read_nn_vert_horz_splits( y, x, curBlkH, curBlkW, unitSize ) { | Type |
|---|---|
| if ( BothHorzAndVertSplitAllowed( y, x, curBlkH, curBlkW, unitSize ) ) { | |
| leftVertSplitTypeCtxt = leftNeighborSplitTypeAvailable ? (SplitType[y][x-1] == NN_VERT_SPLIT ? 1 : 0 ) : 0 | |
| topVertSplitTypeCtxt = topNeighborSplitTypeAvailable ? (SplitType[y-1][x] == NN_VERT_SPLIT ? 1 : 0 ) : 0 | |
| **nn_vert_split** // Coded using context selected based on leftVertSplitTypeCtxt and topVertSplitTypeCtxt | S() |
| if ( nn_vert_split ) { | |
| SetSplitType( y, x, curBlkH, curBlkW, NN_VERT_SPLIT ) | |
| read_nn_blk_info( y, x, curBlkH, unitSize/2 ) | |
| read_nn_blk_info( y, x + unitSize/2, curBlkH, curBlkW - unitSize/2 ) | |
| } else { | |
| SetSplitType( y, x, curBlkH, curBlkW, NN_HORZ_SPLIT ) | |
| read_nn_blk_info( y, x, unitSize/2, curBlkW ) | |
| read_nn_blk_info( y + unitSize/2, x, curBlkH - unitSize/2, curBlkW ) | |
| } | |
| } else { | |
| if ( VertSplitAlowed( y, x, curBlkH, curBlkW, unitSize ) ) { | |
| SetSplitType( y, x, curBlkH, curBlkW, NN_VERT_SPLIT ) | |
| read_nn_blk_info( y, x, curBlkH, unitSize/2 ) | |
| read_nn_blk_info( y, x + unitSize/2, curBlkH, curBlkW - unitSize/2 ) | |
| } else { | |
| SetSplitType( y, x, curBlkH, curBlkW, NN_HORZ_SPLIT ) | |
| read_nn_blk_info( y, x, unitSize/2, curBlkW ) | |
| read_nn_blk_info( y + unitSize/2, x, curBlkH - unitSize/2, curBlkW ) | |
| } | |
| } | |
| } | |

FIG. 67

6800A

| read_nn_blk_info( y, x, curBlkH, curBlkW ) { | Type |
|---|---|
| if ( nn_pic_merge_enable && (leftNeighborMergeEnableAvailable \|\| topNeighborMergeEnableAvailable) ) { | |
| leftMergeEnableCtxt = leftNeighborMergeEnableAvailable ? (MergeEnable[y][x-1] == 1 ? 1 : 0 ) : 0 | |
| topMergeEnableCtxt = topNeighborMergeEnableAvailable ? (MergeEnable[y-1][x] == 1 ? 1 : 0 ) : 0 | |
| **nn_merge_enable** // Coded using context selected based on leftMergeEnableCtxt and topMergeEnableCtxt | S() |
| SetMergeEnable( y, x, curBlkH, curBlkW, nn_merge_enable ) | |
| } else { | |
| SetMergeEnable( y, x, curBlkH, curBlkW, 0 ) | |
| } | |
| if ( MergeEnable[y][x] ) { | |
| if ( leftNeighborMergeEnableAvailable && topNeighborMergeEnableAvailable ) { | |
| **nn_merge_direction** // example 0: MERGE_DIRECTION_LEFT, 1: MERGE_DIRECTION_TOP | f(1) |
| SetMergeDirection( y, x, curBlkH, curBlkW, nn_merge_direction ) | |
| } else { | |
| if ( leftNeighborMergeEnableAvailable ) { | |
| SetMergeDirection( y, x, curBlkH, curBlkW, MERGE_DIRECTION_LEFT ) | |
| } else { | |
| SetMergeDirection( y, x, curBlkH, curBlkW, MERGE_DIRECTION_TOP ) | |
| } | |
| } | |
| // copy from neighbor | |

*FIG. 68*

6800B

| | |
|---|---|
| enable_unit_nn_operation = (MergeDirection[y][x] == MERGE_DIRECTION_LEFT) ? NNBlkEnable[y][x-1] : NNBlkEnable[y-1][x] | |
| nn_scale_diff_val0 = (MergeDirection[y][x] == MERGE_DIRECTION_LEFT) ? NNScaleDiffVal0[y][x-1] : NNScaleDiffVal0[y-1][x] | |
| nn_scale_diff_val1 = (MergeDirection[y][x] == MERGE_DIRECTION_LEFT) ? NNScaleDiffVal1[y][x-1] : NNScaleDiffVal1[y-1][x] | |
| } else { | |
| leftBlkEnableCtxt = leftNeighborBlkEnableAvailable ? (NNBlkEnable[y][x-1] == 1 ? 1 : 0 ) : 0 | |
| topBlkEnableCtxt = topNeighborBlkEnableAvailable ? (NNBlkEnable[y-1][x] == 1 ? 1 : 0 ) : 0 | |
| **enable_unit_nn_operation** // Coded using context selected based on leftBlkEnableCtxt and topBlkEnableCtxt | |
| if ( enable_unit_operation && nn_scale_diff_bits0 > 0 ) { | |
| **nn_scale_diff_val0** | f(nn_scale_diff_bits0) |
| nn_scale_diff_val0 = nn_scale_diff_val0 - ( $2^{nn\_scale\_diff\_bits0 - 1}$ - 1) | |
| } else { | |
| nn_scale_diff_val0 = 0 | |
| } | |
| if ( enable_unit_operation && nn_scale_diff_bits1 > 0 ) { | |
| **nn_scale_diff_val1** | f(nn_scale_diff_bits1) |
| nn_scale_diff_val1 = nn_scale_diff_val1 - ( $2^{nn\_scale\_diff\_bits1 - 1}$ - 1) | |
| } else { | |
| nn_scale_diff_val1 = 0 | |
| } | |
| } | |
| SetNNBlkEnable( y, x, curBlkH, curBlkW, enable_unit_nn_operation ) | |
| SetNNScaleDiffVal0( y, x, curBlkH, curBlkW, nn_scale_diff_val0 ) | |
| SetNNScaleDiffVal1( y, x, curBlkH, curBlkW, nn_scale_diff_val1 ) | |
| } | |

FIG. 69

7000

| decode_tile() { | Type |
| --- | --- |
| .... | |
| if (UsesNN && nn_operation_block_control_enable == 0 && TileNum == 0 ) { // signaling for entire picture in first tile | |
| read_nn_blk_info( y, x, picH, picW ) | |
| } | |
| .... | |

FIG. 70

COMPUTER-IMPLEMENTED MULTI-SCALE MACHINE LEARNING MODEL FOR THE MULTIPLE CHANNEL OUTPUT ENHANCEMENT OF COMPRESSED VIDEO

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as “data centers,” may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various examples in accordance with the present disclosure will be described with reference to the following drawings.

FIG. 22 illustrates three different channel groupings for a convolution layer according to some examples.

FIG. 26 illustrates a batch norm operation according to some examples.

FIG. 33 illustrates a table of the number of output phases, stride and pixel shuffle scale factors for each super-resolution spatial resampling scale factor for both a high resolution processing path and a low resolution processing path according to some examples.

FIG. 39 illustrates a syntax structure for signaling a flag in a sequence header according to some examples.

FIG. 40 illustrates a syntax structure for signaling model parameters in a sequence header according to some examples.

FIG. 41 illustrates a syntax structure for enabling (or disabling) a machine learning (e.g., prediction) model (e.g., multi-scale convolutional neural network (MSCNN)) according to some examples.

FIG. 42 illustrates a syntax structure for selecting a set of model parameters according to some examples.

FIG. 43 illustrates a syntax structure for selecting one or more sets of model parameters according to some examples.

FIG. 44 illustrates a syntax structure for indicating scale parameters according to some examples.

FIG. 45 illustrates another syntax structure for indicating scale parameters (e.g., values for NNScale) according to some examples.

FIG. 46 illustrates yet another syntax structure for indicating scale parameters (e.g., values for NNScale) according to some examples.

FIG. 47 illustrates a syntax structure for indicating scale parameters for four output channels of a machine learning (e.g., prediction) model (e.g., multi-scale convolutional neural network (MSCNN)) according to some examples.

FIG. 48 illustrates an example assignment between set of model parameters, quantization parameter (QP) values, and picture type according to some examples.

FIG. 49 illustrates a syntax structure for indicating a set of model parameters available for selection according to some examples.

FIG. 50 illustrates a syntax structure for indicating block level control according to some examples.

FIGS. 51-52 illustrate indicating block level control according to some examples.

FIG. 53 illustrates a syntax structure for indicating if scaling is at a header or block level according to some examples.

FIG. 54 illustrates a syntax structure for indicating block level scaling according to some examples.

FIG. 55 illustrates a syntax structure for indicating if model selection is at a header or block level according to some examples.

FIG. 56 illustrates a syntax structure for indicating block level model selection according to some examples.

FIG. 57 illustrates a syntax structure for indicating if model selection and scaling are at a header or block level according to some examples.

FIG. 58 illustrates a syntax structure for indicating block level scaling and/or model selection according to some examples.

FIG. 64 illustrates a syntax structure for indicating scaled centroids (e.g., for each channel that is output from a machine learning model), the scaling differences, if scaling is indicated at a header or block level, the step sizes used to derive the scaling values, the block size, and if merging is enabled according to some examples.

FIG. 65 illustrates a syntax structure for signaling splits at a block level according to some examples.

FIG. 66 illustrates a syntax structure for signaling quadrant (quad) splits at a block level according to some examples.

FIG. 67 illustrates a syntax structure for signaling vertical or horizontal splits at a block level according to some examples.

FIG. 68 illustrates a first part of a syntax structure for signaling merge and merge direction for scale values according to some examples.

FIG. 69 illustrates a second part of the syntax structure of FIG. 68 for signaling block level enable and difference for scale values according to some examples.

FIG. 70 illustrates a syntax structure for signaling picture level scale values according to some examples.

DETAILED DESCRIPTION

Figure 1:
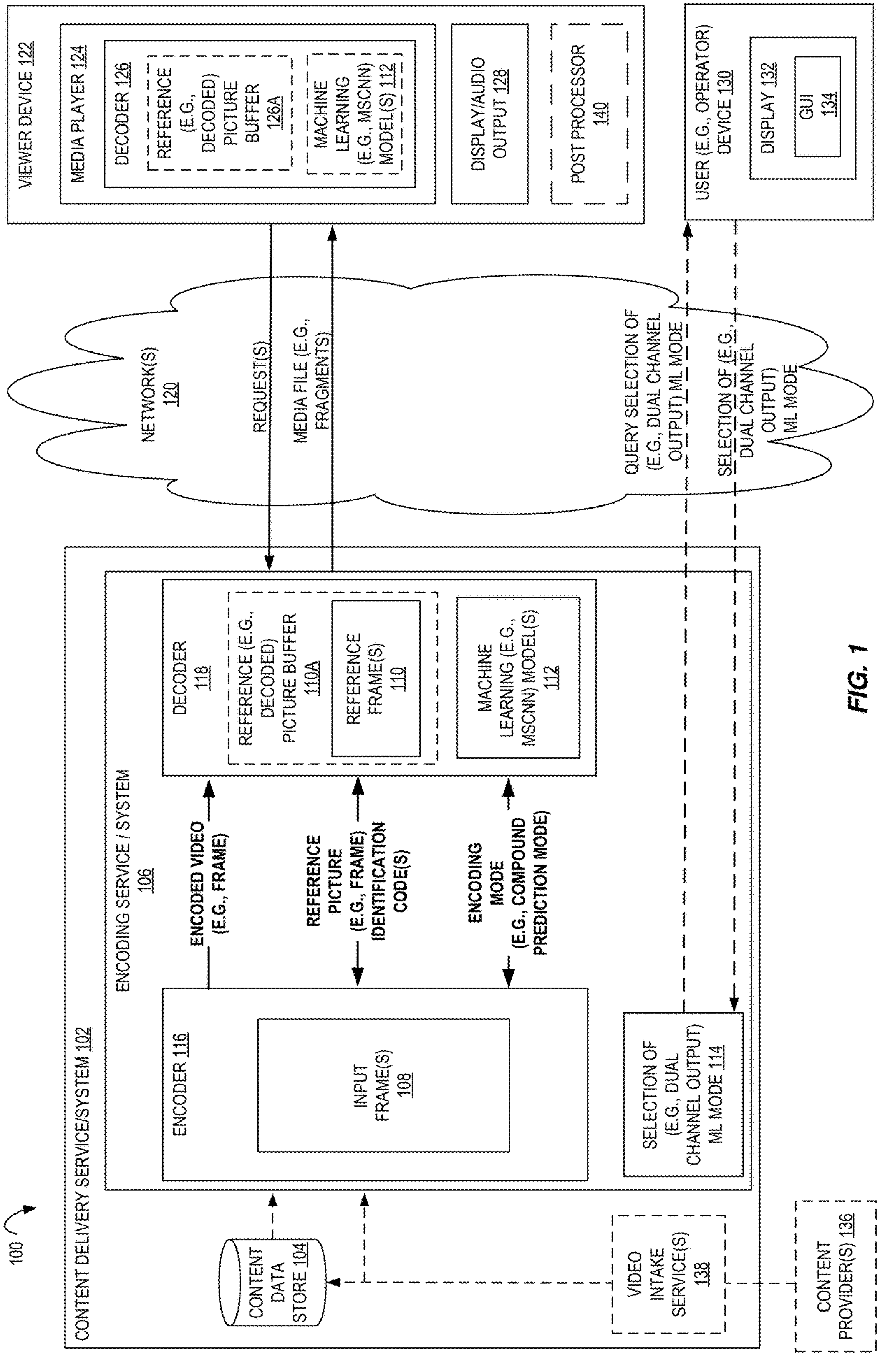
FIG. 1 is a diagram illustrating an environment including a content delivery service/system, having an encoding service/system to encode a media file using a (e.g., multi-scale) machine learning model and send the encoded media file to a viewer device according to some examples.

The present disclosure relates to methods, apparatus, systems, and non-transitory computer-readable storage media for training and using a multi-scale machine learning model for the enhancement of compressed video. Certain examples herein utilize (e.g., as part of a super-resolution operation) a machine learning model that takes as inputs (i) the (e.g., reconstructed) frame (e.g., x) (e.g., pixel (e.g., luma) values) and (ii) sample values (e.g., pixel values) based on a prediction for the frame, and then generates a multiple channel output, e.g., but does not directly take the residue as an input into the machine learning model. The benefit of this is a combination of improved coding efficiency, reduced complexity, and flexibility in managing complexity. In certain examples, the sample values are also an input to a deblocking operation (e.g., the sum of the outputs from an inverse transform and the intra/inter prediction for the image). In certain examples, (e.g., luma) sample values are utilized at two different locations within the codec as input to the machine learning network.

In certain examples, the multiple channel output of the machine learning model is scaled and (e.g., linearly) combined to form a single output used to correct the pixel (e.g., luma) values. In certain examples, the output channel scaling is signaled in the bitstream (e.g., at block-level or picture-level) with adaptive bit length and step-sizes. This allows for more content adaptivity.

Certain examples herein incorporate a neural network approach that has the benefit of reducing compression artifacts and improving visual quality. In certain examples, the network is located within the prediction loop of a video decoder or outside of the prediction loop, e.g., as a post-processing algorithm. In certain examples, the network is controlled by information received in a bit-stream, and this disclosure describes efficient methods to signal this information. Examples herein provide the benefits of: (i) the use of a multi-scale method to reduce complexity, (ii) signaling of selectors in a bit-stream to a decoder (or a post-processor) to dynamically construct larger neural-networks from smaller neural-networks, and/or (iii) specific examples of the multi-scale machine learning model (e.g., network) using a combination of group and one-dimensional convolution processes to reduce complexity. Examples herein support super-resolution via machine learning to provide more flexibility in managing complexity. Examples herein optimize machine learning (e.g., neural) network elements to reduce complexity. Examples herein allow for the signaling of model parameters at finer granularity to improve coding efficiency. These examples provide the benefits of improved coding efficiency and reduced complexity.

The present disclosure further relates to methods, apparatus, systems, and non-transitory computer-readable storage media for video coding using super-resolution restoration with residual frame coding. Certain examples herein are directed to a video coding technology (e.g., method) for coding video that incorporates an upsampling and super-resolution approach into the coding loop. Certain examples herein have the benefit of both improving coding efficiency and reducing the computational complexity of a video compression system, e.g., by allowing some coding operations to be performed at different spatial resolutions. In some examples, these different spatial resolutions may change for different frames or pictures. Examples herein provide the benefits of: (i) methods for reducing the memory consumption of the decoded picture buffer, (ii) methods to perform motion vector coding and motion compensation between pictures with different spatial resolutions, and/or (iii) methods for coding residual information at a different spatial resolution than other coding processes.

In certain examples, an encoding mode (e.g., with different encoding modes selectable for each macroblock of a frame) is selected for a video encoder, e.g., an encoding mode according to a video coding standard. In one example, the video coding standard is an Advanced Video Coding (AVC) standard, for example, a H.264 standard. In one example, the video coding standard is an Alliance for Open Media (AOM) standard, for example, an AV1, AV2, etc. standard.

FIG. 1 is a diagram illustrating an environment including a content delivery service/system 100, having an encoding service/system 106 to encode a media file (e.g., input frame(s) 108) according to a reference picture identification code format (e.g., of the one or more (e.g., compound) encoding modes), to send the encoded media file to a viewer device 122 according to some examples. In certain examples, video compression (e.g., of a content delivery service/system/service) includes an encoding mode for certain proper subset(s) of the input video. An encoding mode may be in accordance with a video coding (e.g., encoding) standard. A decoding mode may be in accordance with a video coding (e.g., decoding) standard.

Encoding (e.g., by encoder 116) may compress a video file (e.g., input frame(s) 108) into a plurality of compressed frames, for example, one or more an intra-coded picture frames (I-frames) (e.g., with each I-frame as a complete image), one or more predicted picture frames (P-frames or delta-frames) (e.g., with each P-frame having only the changes in the image from the previous frame), and/or one or more bidirectional predicted picture frames (B-frames) (e.g., that further saves space (e.g., bits) by using differences between the current frame and the preceding and/or following frames to specify its content). For example, with P-frames and B-frames being inter-coded pictures. In one example, each single I-frame corresponds to (e.g., is associated with) a plurality of inter-coded frames (e.g., P-frames and/or B-frames), e.g., as a group of pictures (GOP). In certain examples, an encoder selects one or more prediction styles for a slice (e.g., a sequence of macroblocks), for example, switching I (SI) frame (e.g., slice) that facilitates switching between coded streams (e.g., containing SI-macroblocks as a special type of intra coded macroblock and/or switching P (SP) frame (e.g., slice) that facilitates switching between coded streams (e.g., containing contains P and/or I-macroblocks). In certain examples, a slice can be a whole frame, e.g., but it is not required that a whole frame is a slice.

An encoding and/or decoding algorithm (e.g., specified by a video coding standard) may select between inter and intra coding for (e.g., block-shaped) regions of each picture (e.g., frame 108). In certain examples, inter coding (e.g., as indicated by an "inter" mode) uses motion vectors for (e.g., block-based) inter prediction from other pictures (e.g., frames), e.g., to exploit temporal statistical dependencies between different pictures. The reference pictures (e.g., reference frames) 110 may be stored in a reference picture buffer 110A. In certain examples, intra coding (e.g., as indicated by an "intra" mode) uses various spatial predictions to exploit spatial statistical dependencies in the source signal for a single picture (e.g., frame). In certain examples, motion vectors and intra prediction modes are specified for a variety of block sizes in the picture. In certain examples, the prediction residual is then further compressed using a transform to remove spatial correlation inside the transform block before it is quantized, producing an irreversible process that typically discards less important visual information while forming a close approximation to the source samples. In certain examples, the motion vectors or intra prediction modes are combined with the quantized transform coefficient information and encoded, e.g., using either variable length coding or arithmetic coding.

An encoding and/or decoding mode (e.g., to be used to encode and/or decode a particular macroblock of a frame, respectively) may include one, all, or any combination of the following: direct mode, inter mode, or intra mode. A direct mode may cause encoding with an inter prediction for a block for which no motion vector is decoded. Examples of two direct prediction modes are spatial direct prediction mode and temporal prediction mode.

In certain examples, a mode has one or more sub-modes that are to be specified. In some examples, the same (e.g., prediction) mode is used for corresponding chroma (component) and luminance (component) blocks.

For example, a direct mode may include a skip mode (e.g., sub-mode) and/or a B-frame (e.g., B-slice) direct mode (e.g., sub-mode). In one example, skip mode is for P-frames (e.g., P-slices), for example, where the (e.g., spatial direct prediction) motion is derived directly from previously encoded information (e.g., thus not having to encode any additional motion data for a macroblock). In one example, direct mode is for B-frames (e.g., B-slices), for example, where the (e.g., temporal prediction) motion is derived directly from previously encoded information (e.g., thus not having to encode any additional motion data for a macroblock). Previously encoded information may be stored in a reference picture buffer 110A, for example, list 0 (L0) references being a reference picture list used for inter prediction of a P, B, or SP slice (e.g., block). In certain examples, inter prediction used for P and SP slices uses (reference picture) list 0 (L0). Owing to the bi-predictive (e.g., before or after the current frame in video order), a certain (e.g., DIRECT) mode may utilize two motion vectors pointing to different references. In certain examples, inter prediction used for B slices uses (reference picture) list 0 and (reference picture) list 1 (L1).

For example, an inter mode (e.g., sub-mode) may include a (e.g., luminance) block partition size, e.g., 16×16, 16×8, 8×16, or 8×8 (pixels x pixels). An inter mode may use a transform, e.g., a 4×4 transform or 8×8 transform.

For example, an intra mode (e.g., sub-mode) may include a (e.g., luminance) block partition size, e.g., intra4×4, intra8×8 and intra16×16. For example, intra4×4 may include further prediction sub-modes of vertical, horizontal, DC, diagonal-down-left, diagonal-down-right, vertical-right, horizontal-down, vertical-left, and/or horizontal-up.

An encoding mode may be used to encode a particular slice of a frame, e.g., where a slice is a spatially distinct region of a frame that is encoded separately from any other region in the same frame and/or where a slice is a plurality of macroblocks (e.g., a sequence of macroblock pairs).

An encoding mode (e.g., of encoder 116) may be separate from encoder settings, e.g., separate from values setting one, all, or any combination of the following in an encoder: spatial adaptive quantization strength, temporal adaptive quantization strength, flicker reduction, dynamic group-of-pictures (GOP) on/off, number of B-frames (e.g., per GOP), direct mode (e.g., allowing B-frames to use predicted motion vectors instead of actual coding of each frame's motion) (e.g., for a scene), prefilter on/off, delta quantization parameter (QP) offsets (e.g., between I-frame and P-frames/B-frames), rate distortion optimization quantization (RDOQ), speed settings, or additional configuration (e.g., encoder) settings.

In certain examples (e.g., at the start of the video encoding process) a content delivery service/system/service is to select the encoding modes, e.g., for each macroblock (or slice) of a frame. This may include a mode selection that is to select a (e.g., optimal from a visual quality perspective) single mode by looping through all the available modes by encoding (e.g., by encoder 116) according to a mode then decoding (e.g., by decoder 118) and measuring the quality between the media (e.g., macroblock) that was encoded versus the decoded version.

In certain examples (e.g., for a compound mode), encoder 116 is to encode a frame 108 and send it to decoder 118 to decode the encoded frame. In certain examples, a version of the frame 108 is reconstructed out of the bitstream by the decoder 118. In certain examples, one or more of the decoded frames, from the encoder 116, generated by the decoder 118 is input into reference (e.g., decoded) picture buffer 110A (e.g., decoded frame buffer/list or reference frame buffer/list). In certain examples, the reference frame(s) 110 in the picture buffer 110A (e.g., which is less than all of the frames in a video) are used to encode an input frame 108, for example, via an inter prediction (e.g., prediction value) for the current frame using previously decoded reference frames 110.

Certain (e.g., AOM) coding standards (e.g., codecs) allow a maximum number of (e.g., eight frames) in its reference picture buffer 110A. In certain examples, for encoding a frame 108, encoder 116 can choose a proper subset of (e.g., seven) frames from the reference picture buffer 110A as its reference frames. In certain examples, the bitstream allows the encoding service/system 106 to explicitly assign each reference a unique reference frame index (e.g., ranging from 1 to 7). In some examples, the reference frames indices 1-4 are designated for the frames that precede the current frame in display (e.g., picture or video) order, while indices 5-7 are for reference frames coming after the current one. In certain examples of compound inter prediction, two references can be combined to form the prediction. In certain examples, if both reference frames either precede or follow the current frame, this is a unidirectional compound prediction, e.g., in contrast with a bidirectional compound prediction where there is one previous and one future reference frame in display (e.g., picture or video) order. In certain examples, the encoding service/system 106 (e.g., coding standard thereof) links a reference frame index to any frame in the decoded frame buffer, e.g., which allows it to fill all the reference frame indices when there are not enough reference frames on either side. In certain examples, when a frame coding is complete, the encoding service/system 106 decides which (if any) reference frame in the reference picture buffer 110A to replace, e.g., and explicitly signals this in the bitstream. In certain examples, encoding service/system 106 allows for bypassing of updating the reference picture buffer 110A, e.g., for high motion videos where certain frames are less relevant to neighboring frames.

In certain examples, the reference picture buffer 110A update is implemented through two syntaxes in the frame level: (1) a multiple bit (e.g., eight-bit) reference Refresh Flag, e.g., with each bit signaling whether the corresponding frame in the reference picture buffer 110A is to be refreshed or not by the newly coded frame, and/or (2) virtual index mapping where each of the reference frames is labeled by a unique virtual index, and both the encoder 116 and the decoder 118 maintain a reference frame map to associate a virtual index with the corresponding physical index that points to its location within the reference picture buffer 110A. In certain examples, both the refresh flag and the virtual indices are written into the bitstream, e.g., using such mapping mechanism is to avoid memory copying whenever reference frames are being updated.

In certain examples, encoding service/system 106 includes a field 114, that when set, causes the encoding service/system 106 (e.g., encoder 116 and/or decoder 118) to utilize the functionality discussed herein, for example, to enter a particular (e.g., multi-scale) machine learning mode. In certain example, the decoder 118 includes one or more machine learning (e.g., prediction) models 112 (e.g., multi-scale convolutional neural network (MSCNN)), e.g., used to generate a prediction according to this disclosure.

The depicted content delivery service/system 102 includes a content data store 104, which may be implemented in one or more data centers. In one example, the media file (e.g., video file that is to be viewed by the viewer device 122) is accessed (for example, from the content data store 104 or directly from a content provider 136, e.g., as a live stream) by encoder 116 (e.g., by media file (e.g., fragment) generator thereof). In certain examples, the content delivery service/system 102 includes a video intake service(s) 138 to intake a video, e.g., from content provider(s) 136.

In certain examples, the (e.g., client) viewer device 122 requesting the media file (e.g., fragment(s) of media) from content delivery service/system 102 causes the encoder 116 to encode the video file, e.g., into a compressed format for transmittal on network(s) 120 to viewer device 122. In one example, a media file generator of encoder 116 generates one or more subsets (e.g., frames, fragments, segments, scenes, etc.) of the media file (e.g., video), e.g., beginning with accessing the media file and generating the requested media (e.g., fragment(s)). In one example, each fragment includes a plurality of video frames.

In FIG. 1, content delivery service/system 102 is coupled to viewer device 122 and user device 130 via one or more networks 120, e.g., a cellular data network or a wired or wireless local area network (WLAN).

In certain examples, content delivery service/system 102 (e.g., encoding service/system 106 thereof) is to send a query asking for the selection of a mode (e.g., one or more of a plurality of different respective machine learning modes (e.g., as in FIGS. 3-47)) is desired) to user (e.g., operator) device 130, for example, and the user device 130 (e.g., in response to a command from a user of the device 130) is to send a response (e.g., an indication of that mode 114). Depicted user device 130 includes a display 132 having a graphical user interface (GUI) 134, e.g., to display a query for encoding service/system 106 to enter (or not) a particular mode 114, e.g., one or more of a plurality of different respective machine learning modes (e.g., as in FIGS. 3-47).

Depicted viewer device 122 (e.g., where the viewer is a customer of user (e.g., operator) of device 130) includes a media player 124 having a decoder 126 (e.g., separate from decoder 118 of encoding service/system 106) to decode the media file (e.g., fragment) from the content delivery service/system 102, e.g., to display video and/or audio of the media file on display and/or audio output 128, respectively. In certain example, the decoder 126 includes one or more machine learning (e.g., prediction) models 112 (e.g., multi-scale convolutional neural network (MSCNN)), e.g., used to generate a prediction according to this disclosure. In certain examples, the decoder 126 (e.g., as code and/or hardware) includes a reference (e.g., decoded) picture buffer 126A. In certain examples, the decoder 126 receives an indication (e.g., a syntax element in a bitstream) of the media file (for example, within a header thereof the media file, e.g., a sequence and/or picture header for that encoded media) of the type of identification code and/or the number of the reference slots (e.g., reference frames in the reference picture list) which may be used for compound mode. In certain examples, any encoder and/or decoder (e.g., the decoder 126) is to have knowledge of the format of the "reference picture identification code" used. In certain examples, the decoder 126 is to decode the encoded frame (e.g., picture) based on (i) the already decoded (e.g., reference) frames in its reference (e.g., decoded) picture buffer 126A and (ii) an identification code of the reference frames for use in the decoding of the current frame (e.g., and the format of the "reference picture identification code"). In certain examples, the decoded current frame is then played by the media player 124, e.g., displayed on the display 128.

In certain examples, the viewer device 122 includes a post processor, e.g., to perform a post processing operation. In certain examples, the post processing operation includes executing one or more machine learning (e.g., prediction) models 112 (e.g., multi-scale convolutional neural network (MSCNN)), e.g., used to generate a prediction according to this disclosure. In certain examples, the post processor 140 is separate from a decoder (or encoder), e.g., so support for the one or more machine learning (e.g., prediction) models 112 (e.g., multi-scale convolutional neural network (MSCNN) can be added for an encoder (e.g., standard) or decoder (e.g., standard), e.g., codec, that does not include and/or support machine learning.

Figure 2:
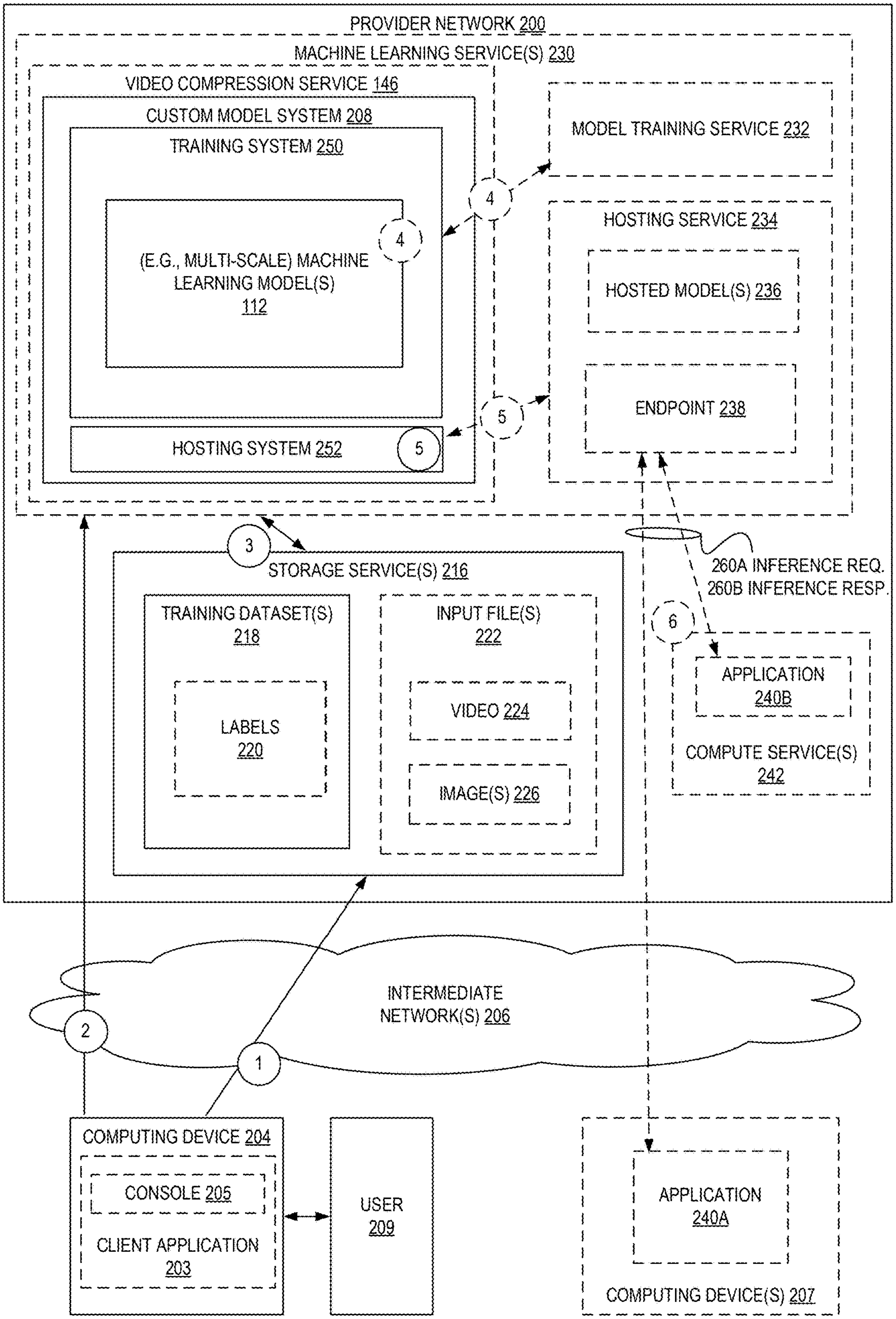
FIG. 2 is a diagram illustrating an environment for creating, training, and using a (e.g., multi-scale) machine learning model according to some examples.

FIG. 2 is a diagram illustrating an environment for creating, training, and using one or more machine learning models 112 according to some examples. FIG. 2 includes a video compression service 146, one or more storage services 216, one or more machine learning services 230, and one or more compute services 242 implemented within a multitenant provider network 200. Each of the video compression service 146, one or more storage services 216, one or more machine learning services 230, one or more model training services 232, one or more hosting services 234, and one or more compute services 242 may be implemented via software, hardware, or a combination of both, and may be implemented in a distributed manner using multiple different computing devices.

A provider network 200 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 242), a storage service 216 that can store data objects, etc. The users (or "customers") of provider networks 200 may utilize one or more user accounts that are associated with a customer account, though these terms may be used somewhat interchangeably depending upon the context of use. Users may interact with a provider network 200 across one or more intermediate networks 206 (e.g., the internet) via one or more interface(s), such as through use of application programming interface (API) calls, via a console 205 implemented as a website or application, etc. The interface(s) may be part of, or serve as a front-end to, a control plane of the provider network 200 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 200 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

For example, in various examples, a "serverless" function may include code provided by a user or other entity-such as the provider network itself-that can be executed on demand. Serverless functions may be maintained within provider network 200 by an on-demand code execution service (which may be one of compute service(s) 242) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions (e.g., as an application 240B) that can be executed on demand, without requiring the user to maintain dedicated infrastructure to execute the serverless function. Instead, the serverless functions can be executed on demand using resources maintained by the provider network 200. In some examples, these resources may be maintained in a "ready" state (e.g., having a pre-initialized runtime environment configured to execute the serverless functions), allowing the serverless functions to be executed in near real-time.

The video compression service 146, in some examples, is a machine learning powered service that generates one or more predictions for video compression, e.g., as discussed in reference to FIGS. 3-47.

The training system 250, for example, may enable users to generate one or more machine learning models (e.g., multi-scale machine learning model(s) 112).

Examples herein allow the creation of one or more machine learning models 112 by supplying a training dataset 218 (for example, including labels 220).

In some examples, the video compression service 146—via use of a custom model system 208—allows users to build and use model(s) 112.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a candidate algorithm into model(s), e.g., into machine learning model 112, and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 209 may provide or otherwise identify data 218 (e.g., with labels 220) for use in creating a custom model. For example, as shown at circle (1), the user 209 may utilize a client application 203 executed by a computing device 204 (e.g., a web-application implementing a console 205 for the provider network 200, a standalone application, another web-application of another entity that utilizes the classification service 146 as a part of its backend, a database or mixed-SQL environment, etc.) to cause the computing device 204 to upload the data 218 to a storage location (e.g., provided by a storage service 216 such as an object storage service of a provider network 200).

The data 218 may be a columnar dataset that includes rows (or entries) of data values, where the data values may be arranged according to one or more columns (or attributes) and may be of a same datatype (e.g., one storing text). In some cases, the data 218 includes headings or other metadata describing names or datatypes of the columns, though in some cases this metadata may not exist. For example, some or all of the data 218 may have been provided by a user as a plaintext file (e.g., a comma-separated values (CSV) or tab-separated values (TSV) file), an exported database table or structure, an application-specific file such as a spreadsheet, etc.

For example, when a user 209 desires to train a model 112, this file (or files) may include labels corresponding to the file (e.g., video, audio, and/or text), e.g., with a label indicating category (ies) of content in the file.

Thereafter, at circle (2) the computing device 204 may issue one or more requests (e.g., API calls) to the machine learning service 230 that indicate the user's 209 desire to train one or more algorithms into model(s), e.g., into a machine learning model 112. The request may be of a type that identifies which type of model(s) are to be created or identifies that the machine learning service 230 itself is to identify the candidate model(s), e.g., candidate machine learning model 112. The request may also include one or more of an identifier of a storage location or locations storing the data 218 (e.g., an identifier of the labels 220), which may identify a storage location (e.g., via a Uniform Resource Locator (URL), a bucket/folder identifier, etc.) within the provider network 200 (e.g., as offered by a storage service 216) or external to the provider network 200, a format identifier of the data 218, a language identifier of the language of the labels 220, etc. In some examples, the request includes an identifier (e.g., from the user 209) of the candidate algorithm(s) themselves within the request. In certain examples, the storage service 216 stores input file(s) 222, for example, video 224 and/or image(s) 226.

Responsive to receipt of the request, the custom model system 208 of the machine learning service 230 is invoked and begins operations for training the corresponding type of model. For example, the custom model system 208 may identify what type of model is to be trained (e.g., via analyzing the method call associated with the request), the storage location(s) associated with the data 218 (e.g., labels 220), etc. Thus, the custom model system 208 may retrieve any stored data 218 elements as shown at circle (3), which may be from a storage location within the provider network 200 or external to the provider network 200.

In some examples, the training (at dotted circle (4) in model(s) 112) of model(s) 112 includes performing (at optional, dotted circles (4)) by training service 232 of machine learning service 230 a particular training job (e.g., hyperparameter optimization tuning job), or the like.

In some examples, the hosting system 252 (at circle (5)) of the custom model system 208 may make use (at optional, dotted circle (5)) of a hosting service 234 of a machine learning service 230 to deploy a model as a hosted model 236 in association with an endpoint 238 that can receive inference requests from client applications 240A and/or 240B at circle (8), provide the inference requests 260A to the associated hosted model(s) 236, and provide inference results 260B (e.g., a prediction) back to applications 240A and/or 240B, which may be executed by one or more computing devices 207 outside of the provider network 200 or by one or more computing devices of a compute service 242 (e.g., hardware virtualization service, serverless code execution service, etc.) within the provider network 200. Inference results 260B may be displayed to a user and/or viewer (e.g., in a graphical user interface of the application) and/or exported as a data structure (e.g., in a selected format). In certain examples, the inference results are utilized by encoding service/system 106.

Overview

Examples herein are directed to a method for enhancing compressed video. In certain examples, the method incorporates a neural network approach that has the benefit of reducing compression artifacts and improving visual quality. The network can be located either within the prediction loop of a video decoder or outside of the prediction loop as a post-processing algorithm. In some examples, the network is controlled by information received in a bit-stream, and efficient methods to signal this information are disclosed herein. Other key benefits of the approach include: (i) use of a multi-scale method to reduce complexity, (ii) signaling of selectors in a bit-stream to a decoder or a post-processor to dynamically construct larger neural-networks from smaller neural-networks, and (iii) specific examples of the network using a combination of group and one-dimensional convolution processes to reduce complexity.

Video Compression

In certain examples, video compression systems include video encoding, video decoding, and video post-processing operations. In certain examples, a video encoder receives one or more images (or equivalently frames or pictures) with one or more color channels as input and generates a bit-stream as output. In certain examples, the video decoder receives all or part of the bit-stream as input and generates one or more images as output. These output pictures are similar to the images received by the encoder but may not be identical. A video post-processor is optional but receives the pictures generated by the decoder as input and generates enhanced pictures as output. An example video compression system is shown in FIG. 3 (e.g., an overview of a video compression system 300).

Figure 3:
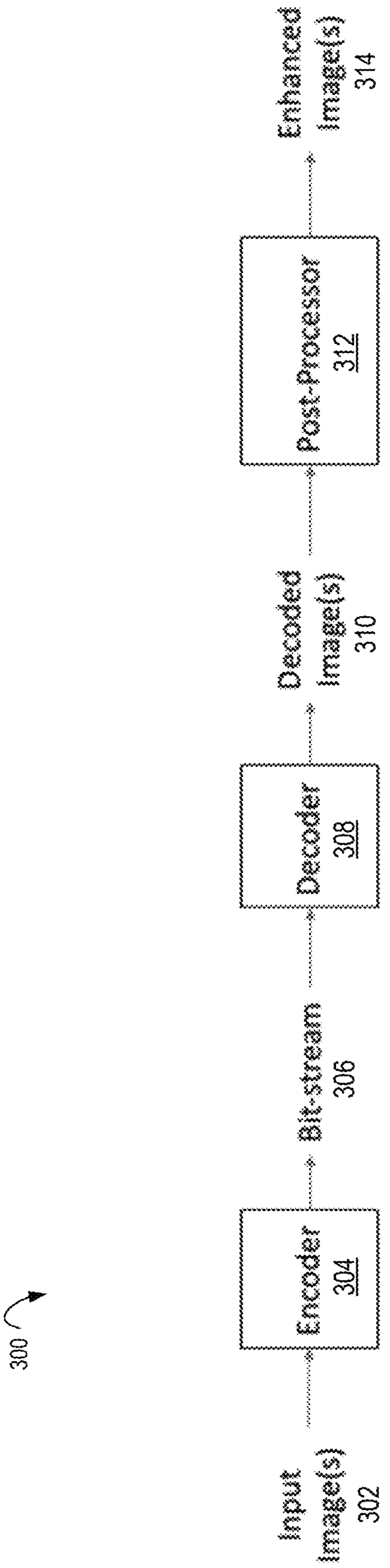
FIG. 3 is a diagram illustrating a video compression system including an encoder and a decoder according to some examples.

FIG. 3 is a diagram illustrating a video compression system 300 including an encoder 304 and a decoder 308 according to some examples. In certain examples, encoder 304 is an instance of encoder 116. In certain examples, decoder 308 is an instance of decoder 126. In certain examples, decoder 308 is an instance of decoder 118.

In certain examples, encoder 304 receives an input of image(s) (e.g., frame(s) of a video) and generates an output of a bit-stream 306 (e.g., coded bitstream of the video). In certain examples, decoder 308 receives an input of a bit-stream 306 (e.g., coded bitstream of the video) and generates an output of decoded image(s) 310 (e.g., decoded frame(s) of the video). In certain examples, video compression system 300 outputs enhanced image(s) 314. In certain examples, an (optional) post processor 312 receives an input of decoded image(s) 310 (e.g., decoded frame(s) of the video) and generates an output of enhanced image(s) 314 (e.g., enhanced decoded frame(s) of the video).

Video compression systems may use a video coding standard (e.g., the H.264, HEVC, VVC, VP9 or AV1 standards) to describe one or more of the bit-stream, decoder, encoder, or post-processor. In certain examples, the video coding standard defines the construction of the bit-stream and/or the decoding process. An example video encoder is shown in FIG. 4.

Figure 4:
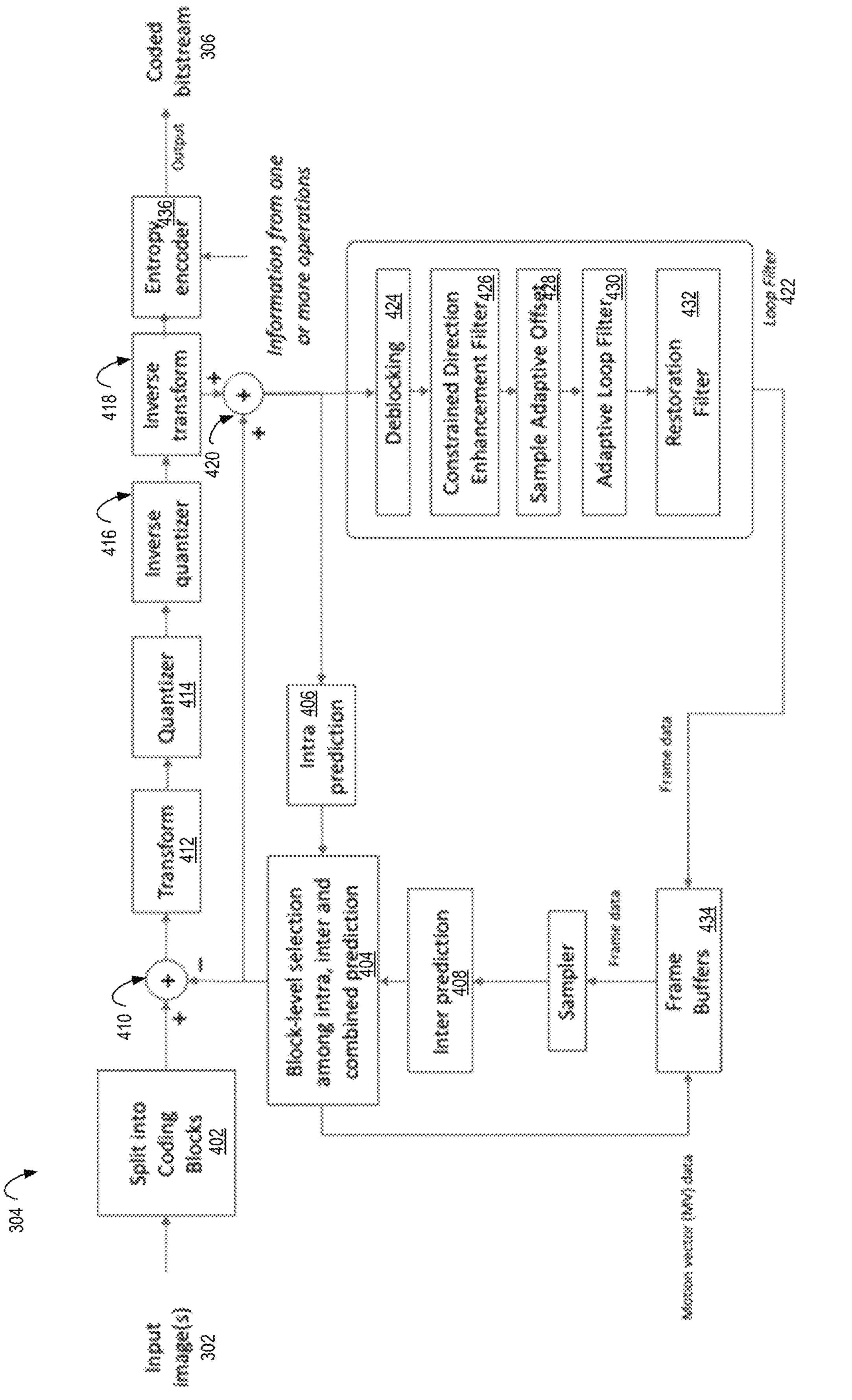
FIG. 4 is a diagram illustrating a video encoder according to some examples.

FIG. 4 is a diagram illustrating a video encoder 304 according to some examples. As can be seen in FIG. 4, the encoder 304 receives an image as input and split operation 402 divides the image into spatial regions for coding. These spatial regions may be referred to as macro-blocks, super-blocks, coding tree units, or other terms known to those skilled in the art. In certain examples, the spatial regions are then further partitioned. For example, each super-block (e.g., in AV1) may be recursively split into coding blocks ranging in size (e.g., from 128×128 samples to 4×4 samples) and/or with square and/or rectangular shapes. Furthermore, the spatial regions may also be combined into larger spatial regions referred to as tiles, slices, or other terms known to those skilled in the art.

Figure 5:
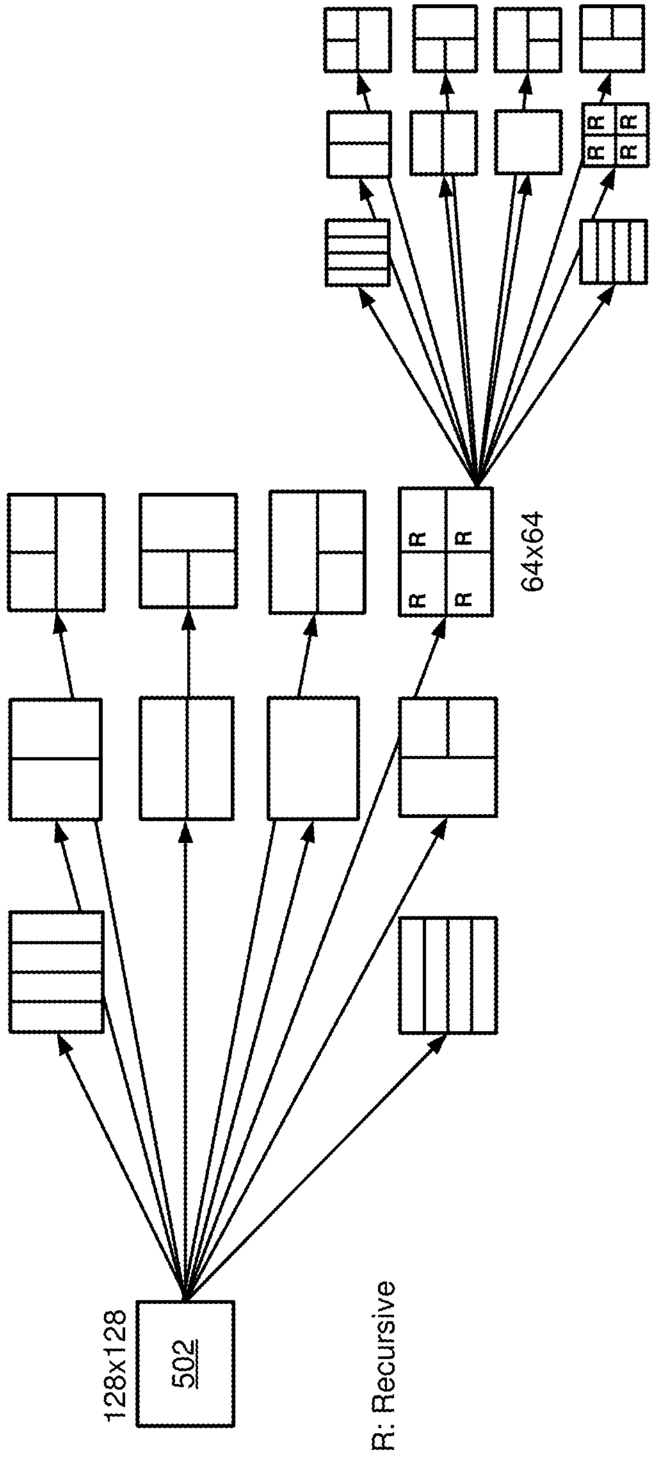
FIG. 5 is a diagram illustrating partitioning of a larger block (e.g., super-block) into smaller blocks (e.g., coding blocks) according to some examples.

Both may be done either jointly or independently for the color channels. An example of partitioning shapes (e.g., partitioning of a super-block into coding blocks) is shown in FIG. 5. FIG. 5 is a diagram illustrating partitioning of a larger block (e.g., super-block) 502 into smaller blocks (e.g., coding blocks) according to some examples. In certain examples, a sample (or pixel) corresponds to a specific location within a frame and color channel. For two-dimensional images, this specific location may be a horizontal and vertical index into the color channel of the frame, e.g., which stores the value for the image at that index.

Returning to FIG. 4, in certain examples, each coding block is first predicted using either intra frame prediction, inter frame prediction, or a combination of the predictions at 404. In certain examples, intra frame prediction 406 predicts a current coding block from previously coded and spatially neighboring blocks. This prediction may be done with directional intra prediction that predicts the sample values of the current coding block by extrapolating previously coded information along a prediction direction. The prediction may also be done with non-directional intra-prediction, such as non-directional smooth intra prediction, recursive intra-prediction, intra block copy and color palette techniques.

In certain examples, inter frame prediction 408 uses information from previously coded frames for prediction that are stored in one or more frame buffers. One method for performing this prediction uses a translational motion model. In this approach, the spatial offsets (or motion vectors) between the current coding block and a previously decoded frame are used to translate a region of the previously coded frame and use the translated version for prediction. Different precisions for the motion vectors are possible, such as ⅛ pixel motion vector accuracy. And different interpolation filters can also be selected. In addition to a translational motion approach, alternative methods (or prediction models) for performing inter frame prediction include affine motion compensation and overlapped block motion compensation. Moreover, one or more of these models may predict the current coding block from more than one previously coded locations in previously decoded frames. One example is the compound prediction mode in AV1. Strategies for combining the more than one prediction include computing a weighted average based on the temporal distance between each previously coded block and the current coded block. In the case that the previously coded frame is a different resolution than the input frame, a sampler may optionally convert the spatial resolution of a previously coded frame.

In some video coding systems, it is possible to use a combination of intra frame and inter frame prediction for a current coded block. For example, a coding block may be divided into two regions. And the first region predicted using an intra frame prediction method and the second region using an inter frame prediction region. As a second example, an intra frame prediction and an inter frame prediction may be averaged (e.g., via a weighted average) to predict the current coding block.

Following the prediction of each block, residual information may be added at 410 to the prediction. An encoder 304 may first calculate a difference between the prediction and the original frame data 302, apply an optional transform 412 to the difference, and quantize 414 the coefficients that are output by the transform. In certain examples, at both an encoder and a decoder, the residual is computed by de-quantizing 416 (e.g., an inverse quantization) the quantized coefficients computed by an encoder, applying an optional inverse transform 418 to de-quantized coefficients, and adding at 420 the result of the inverse transform to the predicted block. Note that the sequential process of quantization and de-quantization may not result in the same output as the input that was provided to the quantization process. Similarly, the sequential process of a transform followed by an inverse transform may not result in the same output as the input that was provided to the transform.

The reconstructed block corresponding to the addition of the prediction and residual information may then be processed by one or more in-loop filters 422 (or operations). In certain examples, these filters improve the fidelity of reconstructed blocks and may include processes such as deblocking filters 424, constrained directional enhancement filter (CDEF) 426, sample adaptive offset filters 428, adaptive loop filters 430, and/or loop restoration filters 432. These operations may use different partitioning than the reconstructed blocks.

In certain examples, the output of the one or more loop (e.g., in-loop) filters (e.g., improved image) 422 is stored in a frame buffer 434 (or decoded picture buffer) for use in the inter prediction of coding blocks in different frames. In certain examples, frame buffer 434 is an instance of buffer 110A in FIG. 1. Additionally, the output may be processed by out-of-loop filters (or operations) to further modify the output. Examples of these filters (or post-processing filters) include spatial resizing, color conversion, film grain synthesis, and debanding operations. In certain examples, that result is not stored in the decoded picture buffer.

Information computed during the encoding process may be signaled in a bit-stream 306. For example, the partitioning of regions for coding, intra prediction directions, motion vectors, quantized transform coefficients, and in-loop filter control information may be signaled. In certain examples, this information is sent (e.g., without loss) using an entropy coding system (e.g., entropy encoder 436). In certain examples, the encoder 436 takes as input information from one or more of the depicted operations, e.g., quantized values that are output from quantizer 414. In certain examples (e.g., AV1), the entropy coding system using a M-ary arithmetic coder. In certain examples (e.g., VVC), the entropy coding system uses a context-adaptive binary arithmetic coder. In certain examples, the information is then extracted from the bit-stream by the decoder.

Figure 6:
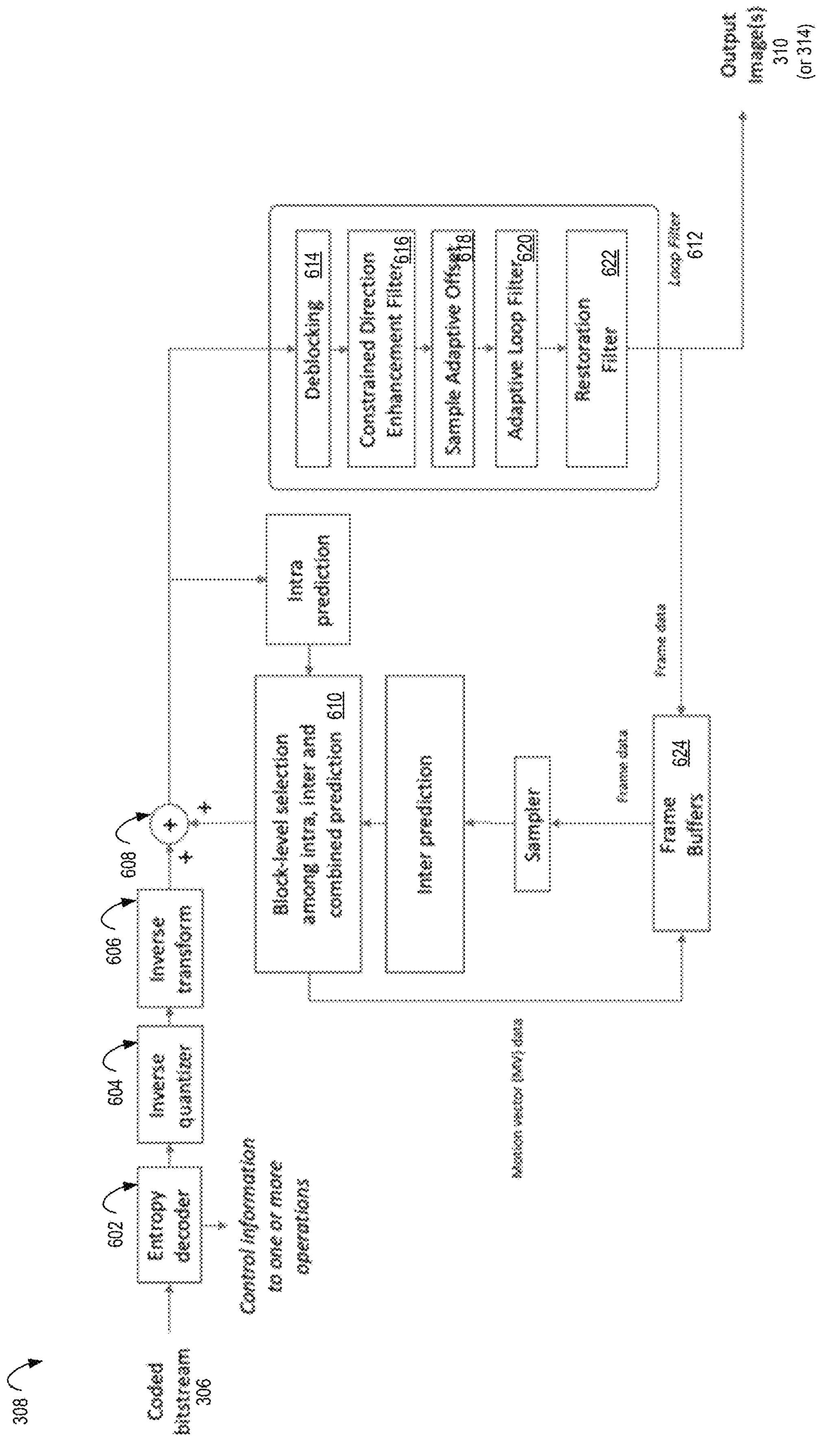
FIG. 6 is a diagram illustrating a video decoder according to some examples.

FIG. 6 is a diagram illustrating a video decoder 308 according to some examples. As described above, in certain examples the video decoder 308 takes a coded bit-stream 306 as input and decodes the bit-stream using an entropy decoder 602. In certain examples, the entropy decoder 602 generates quantized coefficients as output and also control information for other operations within the decoder. In certain examples, the quantized coefficients are inverse quantized at 604 and (optionally) inverse transformed at 606 to generate a residual. In certain examples, the residual is added at 608 to a block-level prediction that is generated by an intra prediction, inter prediction, or combined prediction process 610. In certain examples, following the addition, the resulting sample values are processed by a loop filter 612. Example loop filter 612 operations include one or any combination of deblocking 614, constrained directional enhancement filter (CDEF) 616, sample adaptive offset 618, adaptive loop filter 620, and/or restoration filter 622. In certain examples, the loop filter output is stored in one or more frame buffers 624, e.g., to be used by the inter prediction process and/or provided as output from the decoder 308. In certain examples where the data stored in the frame buffer 624 does not have the same spatial resolution as a current frame, the data stored in the frame buffer may be resampled by the inter prediction process to the same resolution as the current frame. In certain examples, frame buffer 624 is an instance of buffer 126A in FIG. 1. In certain examples, the decoder implementation takes coded bit-stream 306 as input, and then uses the bit-stream (or information based on the bit-stream) to generate the residue and reconstructed frame, e.g., to generate the inputs 701 (e.g., x' and residue).

Problem Statement

Certain video coding systems employ loop filters to improve coding efficiency. These filters increase the quality of each decoded picture and, since the filters are in-loop, propagate the improvements to subsequent frames using the motion compensation process. While certain standards (e.g., AV1 and VVC) may use sophisticated approaches, leveraging residual neural networks in a decoder and/or a post-processor can provide further coding efficiency improvements. Unfortunately, the complexity of these networks is less than desirable. Additionally, certain networks are fixed and not re-configurable in a bit-stream.

Video Enhancement Method

Figure 7:
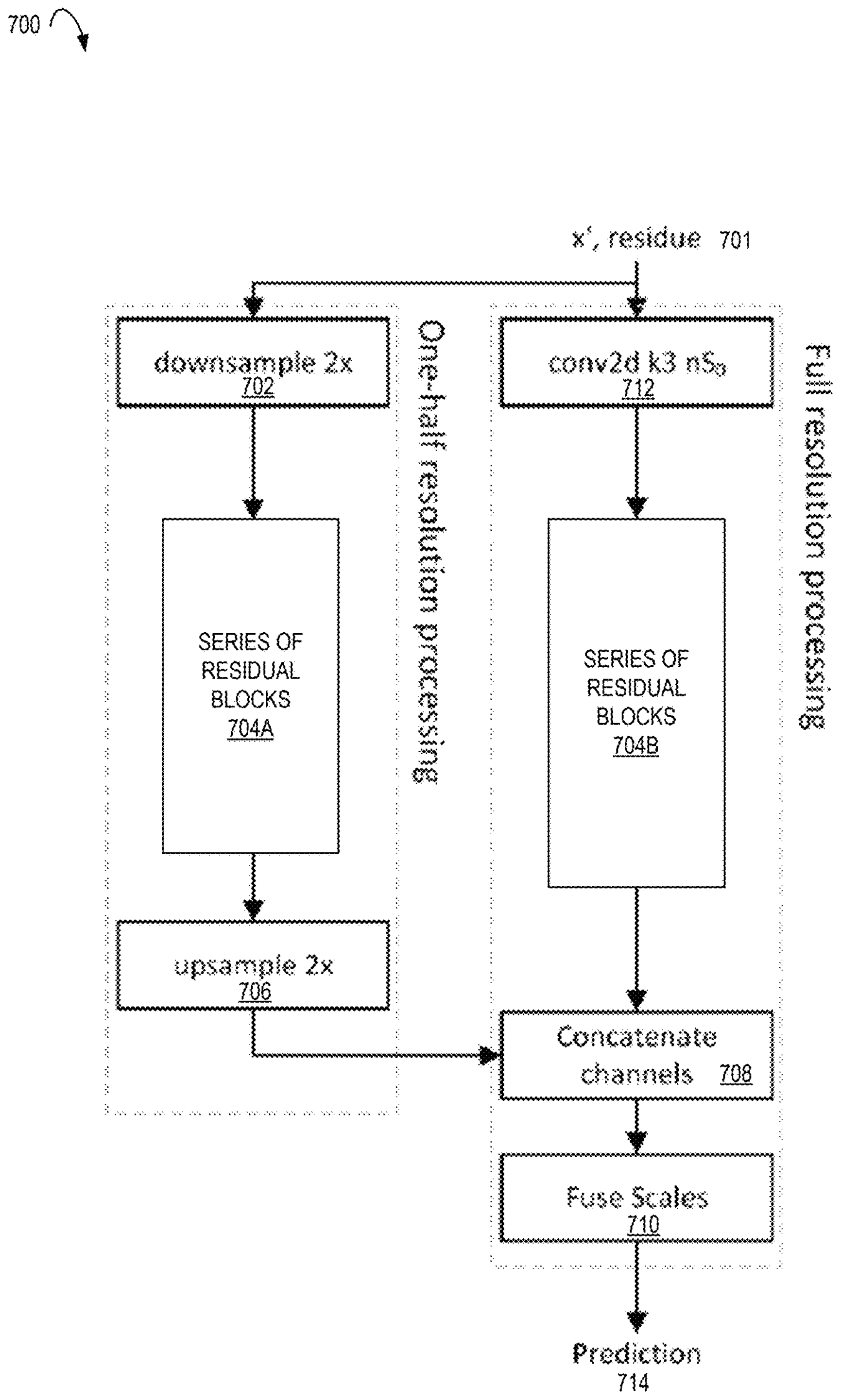
FIG. 7 is a high level architecture diagram of multi-scale (e.g., full-scale and one-half resolution) processing with a machine learning (e.g., prediction) model (e.g., multi-scale convolutional neural network (MSCNN)) according to some examples.

FIG. 7 is a high-level architecture diagram 700 of multi-scale (e.g., full-scale and one-half resolution) processing with a machine learning (e.g., prediction) model (e.g., multi-scale convolutional neural network (MSCNN)) according to some examples. FIG. 7 (high level architecture diagram of multi-scale processing) is an example of certain disclosed methods herein. In certain examples, this method operates at multiple spatial resolutions. This has the benefit of reducing the number of multiply-and-accumulate operations (MACs) per pixel since the number of samples to be processed at lower resolution is smaller. For example, processing at one-half spatial resolution reduces the number of samples by a quarter compared to full resolution processing. As can be seen in FIG. 7, certain examples herein take an image (e.g., frame or proper subset of a frame), denoted by x', and a residual signal as inputs 701. In certain examples, an input 701 (e.g., frame or proper subset of a frame) is downsampled, e.g., the same input (x', residue) is both input to the high-resolution path and lower resolution downsampler(s). In certain examples, certain parts (e.g., a block) of the inputs 701 are downsampled 702 spatially in a lower (e.g., the one-half) resolution path and processed with a series of residual blocks 704A and the certain parts (e.g., the block) of the inputs 701 (not downsampled) are processed with a series of residual blocks 704B in a full resolution path. In certain examples, the output of these residual blocks 704A is upsampled at 706 and concatenated at 708 with the output of a series of high-resolution residual blocks 704B, e.g., and a convolution (e.g., conv2d k3 nS0) operation 712. In certain examples, the concatenated result is provided to a fuse scale operation 710 that converts the low-resolution and high-resolution data to a prediction value 714 for each sample location. In certain examples, different channels (e.g., a luma channel and a chroma channel) for a same block are processed on different paths, for example, where a first channel (e.g., luma) of the block is processed on full resolution path (e.g., by series of residual blocks 704B) and a second channel (e.g., chroma) of the same block is processed on lower (e.g., ½) resolution path (e.g., by series of residual blocks 704A). In certain examples, this allows for a power and processing savings on the lower resolution path, e.g., in contrast to performing the processing of the second channel (e.g., chroma) of the same block also at the full resolution.

In certain examples, the prediction values are feature values (e.g., features for each of a red, green, and blue channel of the image). In certain examples, the prediction values are a change (e.g., delta) in pixel values, e.g., to make a desired correction. In certain examples, the features are machine learning features, e.g., determined for the particular machine learning architecture. In certain examples, each channel is a luma (e.g., brightness) value. In certain examples, each channel is a chroma (e.g., color) value. In certain examples, a set of features (e.g., feature map) is generated for each channel. In certain examples, there is a respective channel for edges, textures, blocking artifacts for motion, out of order features, etc. In certain examples, the depth of the convolution matrices in the convolution operation (e.g., network) is the total number of channels (e.g., the same number of channels as the input).

In certain examples, the convolution operation 712 applies a two-dimensional (2D) convolution to an input value that is composed of several input planes. In certain examples, the output value of the layer with input size (N, $C_{in}$, H, W) and output (N, $C_{out}$, $H_{out}$, $W_{out}$) is:

$$\text{out}(N_i, C_{out_j}) = \text{bias}(C_{out_j}) + \sum_{k=0}^{C_{in}-1} \text{weight}(C_{out_j}, k) \star \text{input}(N_i, k)$$

where * is the valid 2D cross-correlation operator, N is a batch size, C denotes a number of channels, H is a height of input planes in pixels or samples, W is width in pixels or samples, weight (Tensor) are the learnable weights (e.g., of the module of shape), and bias (tensor) is the learnable bias (e.g., of the module of shape).

In certain examples, the prediction 714 is an improved set of pixels (or codec parameters), e.g., correction (or delta) for the pixels.

In certain examples, the machine learning (e.g., prediction) model (e.g., multi-scale convolutional neural network (MSCNN)) depicted in FIG. 7 (or the other FIGS.) is included as ML model(s) 112 in FIG. 1 (e.g., in the encoding service/system 106 and/or in the decoder 126 (e.g., of viewer device 122).

Figure 8:
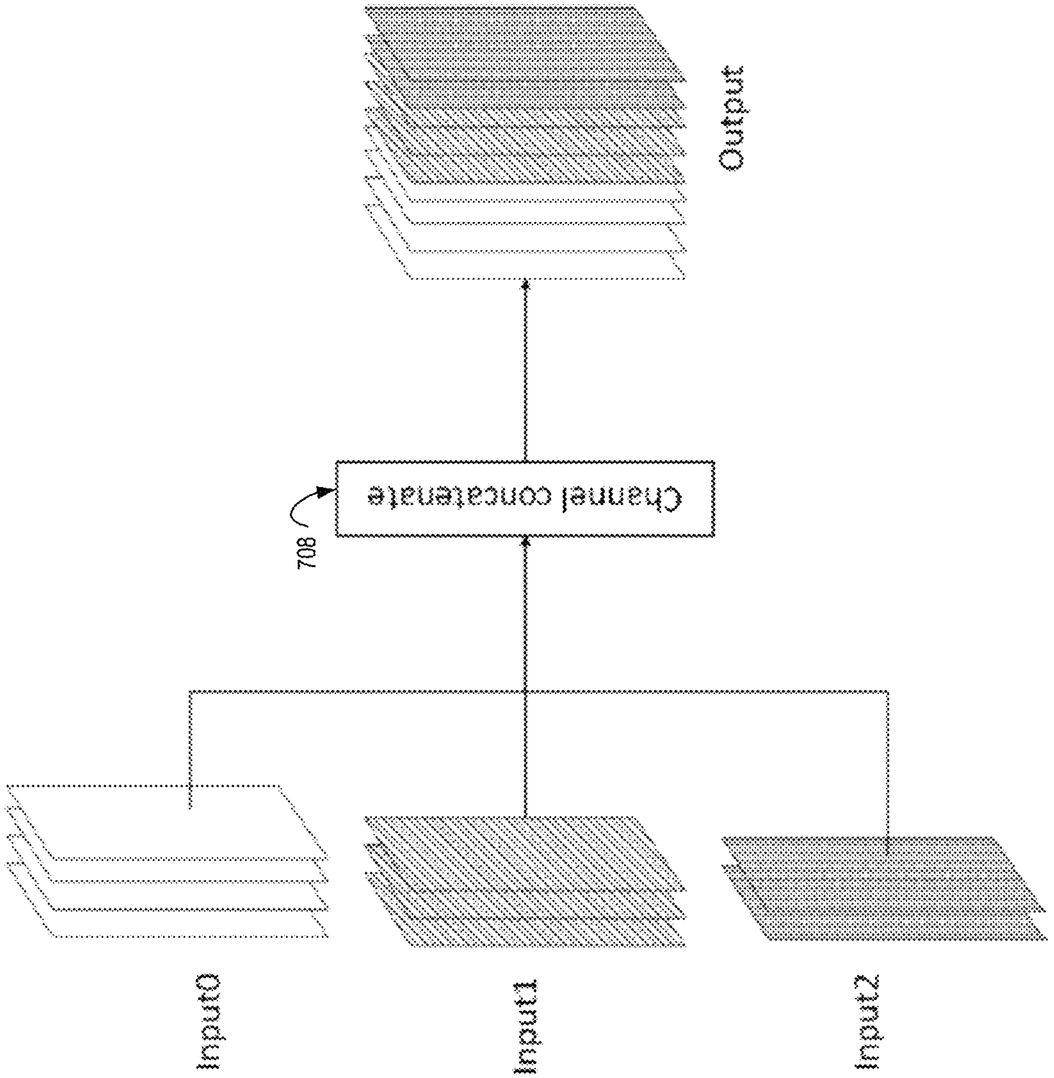
FIG. 8 is a diagram illustrating channel concatenation according to some examples.

FIG. 8 is a diagram illustrating channel concatenation according to some examples. FIG. 8 shows an example of a channel concatenation operation 708.

As can be seen in FIG. 8, multiple features (or tensors) (shown as input 0 with four channels, input 1 with three channels, and input 2 with two channels) having the same spatial resolution (e.g., width and height of pixels) are concatenated at 708 to output a feature (shown as one output with 9 channels (4+3+2) with as many channels as the sum of the channels in the input features. In certain examples of FIG. 8., each plane of data is a feature and/or different planes are channels.

Figure 9:
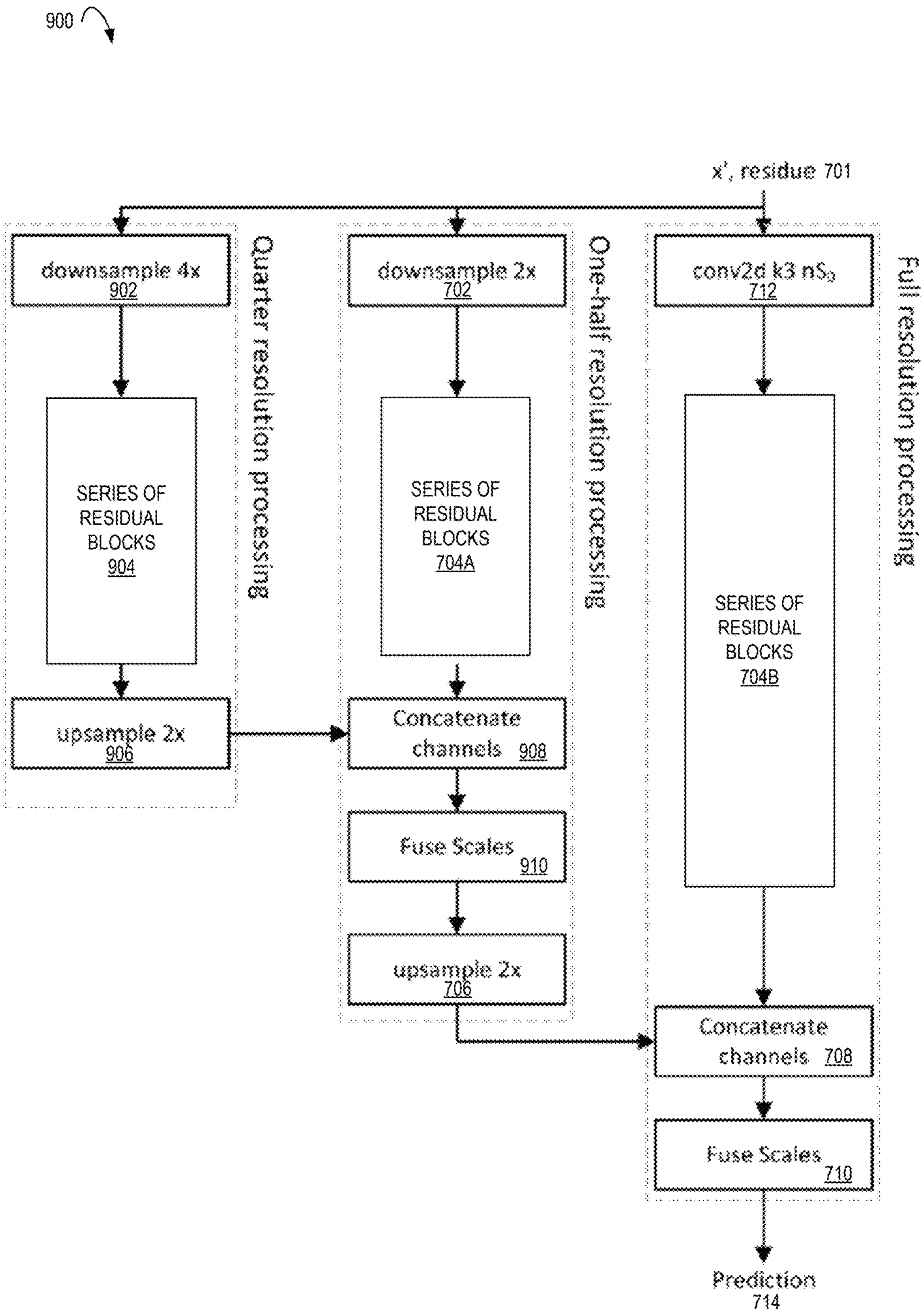
FIG. 9 is a high level architecture diagram of progressive upsampling multi-scale (e.g., full-scale, one-half, and one-quarter resolution) processing with a machine learning (e.g., prediction) model (e.g., multi-scale convolutional neural network (MSCNN)) according to some examples.

In another example, the method may use more than two scales (e.g., resolutions). FIG. 9 is a high level architecture diagram 900 of progressive upsampling multi-scale (e.g., full-scale, one-half, and one-quarter resolution) processing with a machine learning (e.g., prediction) model (e.g., multi-scale convolutional neural network (MSCNN)) according to some examples.

For example, FIG. 9 (high level architecture diagram of multi-scale processing) shows an example of using three scales (e.g., resolutions) corresponding to full resolution processing, half resolution processing, and quarter resolution processing.

Downsampling may use other downsampling factors and may differ in the horizontal and vertical (or, alternatively, a first and a second) dimensions.

In the example in FIG. 9, the architecture from FIG. 7 is modified to include a further downsampling path at a lower resolution than the lower (e.g., the one-half) resolution path.

As can be seen in FIG. 9, certain examples herein take an image (e.g., frame or proper subset of a frame), denoted by x', and a residual signal as inputs 701. In certain examples, certain parts (e.g., a block) of the inputs 701 are downsampled 702 spatially in a lower (e.g., one-half) resolution path and processed with a series of residual blocks 704A, the certain parts (e.g., the block) of the inputs 701 are downsampled 902 spatially in an even lower (e.g., one-quarter) resolution path and processed with a series of residual blocks 904, and the certain parts (e.g., the block) of the inputs 701 (not downsampled) are processed with a series of residual blocks 704B in a full resolution path. In certain examples, the output of the residual blocks 904 is upsampled (e.g., for an increase of twice the downsampled 902 resolution) at 906 and concatenated at 908 with the output of the series of residual blocks 704A at the lower (e.g., one-half) resolution. In certain examples, the output from the concatenation at 908 (lower (e.g., one-half) resolution) is provided to a fuse scale operation 910 that converts the low-resolution (e.g., one-half) data to a prediction value for each sample location. In certain examples, the prediction value from fuse scale operation 910 is upsampled at 706 and concatenated at 708 with the output of the series of high-resolution residual blocks 704B, e.g., and a convolution (e.g., conv2d k3 nS0) operation 712. In certain examples, that concatenated result (e.g., at full-resolution) is provided to a fuse scale operation 710 that converts the low-resolution and high-resolution data to a prediction value 714 for each sample location. In certain examples, the prediction values are feature values (e.g., features for each of a red, green, and blue channel of the image). In certain examples, different channels (e.g., luma channel, chroma channel, and another channel) for a same block are processed on different paths, for example, where a first channel (e.g., luma) of the block is processed on full resolution path (e.g., by series of residual blocks 704B), a second channel (e.g., chroma) of the same block is processed on lower (e.g., ½) resolution path (e.g., by series of residual blocks 704A), and a third channel (e.g., another channel) of the same block is processed on the even lower (e.g., ¼ resolution path (e.g., by series of residual blocks 904). In certain examples, this allows for a power and processing savings on each of the lower resolution paths, e.g., in contrast to performing the processing of the second channel (e.g., chroma) of the same block also at the full resolution and in contrast to performing the processing of the third channel (e.g., another channel) of the same block also at the full resolution (or the ½ resolution).

In the example in FIG. 9, the output of the quarter resolution processing residual blocks is upsampled and fused with the output of the one-half resolution processing residual blocks.

Figure 10:
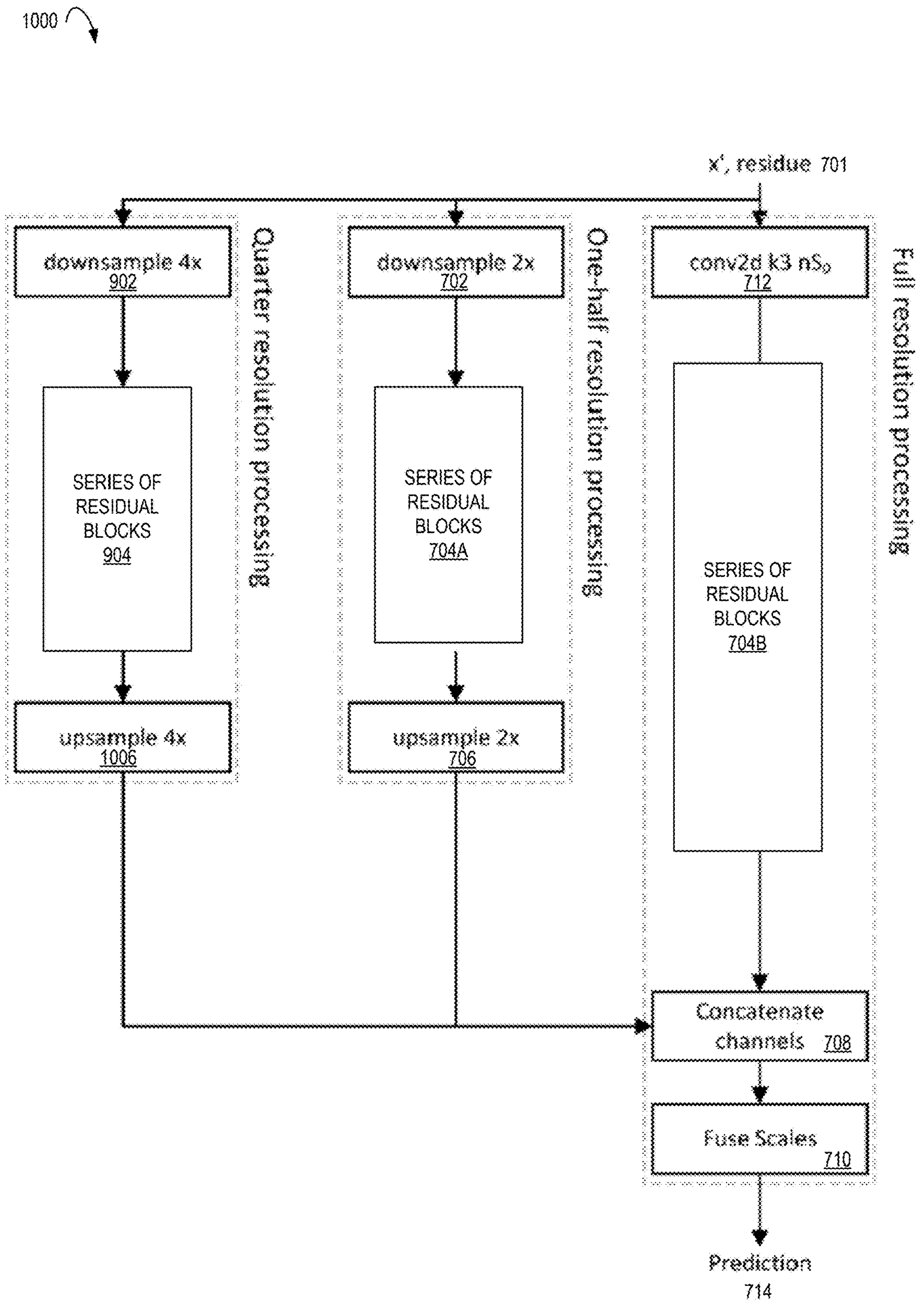
FIG. 10 is a high level architecture diagram of multi-scale (e.g., full-scale, one-half, and one-quarter resolution) processing with a machine learning (e.g., prediction) model (e.g., multi-scale convolutional neural network (MSCNN)) according to some examples.

FIG. 10 is a high level architecture diagram 1000 of multi-scale (e.g., full-scale, one-half, and one-quarter resolution) processing with a machine learning (e.g., prediction) model (e.g., multi-scale convolutional neural network (MSCNN)) according to some examples.

In an alternative example, as shown in FIG. 10 (high level architecture diagram of multi-scale processing), the output of the quarter resolution processing residual blocks 904 is upsampled at 1006 to the full resolution (e.g., in contrast to the progressive upsampling in FIG. 9) and combined with the output of the full resolution processing residual blocks.

As can be seen in FIG. 10, certain examples herein take an image (e.g., frame or proper subset of a frame), denoted by x', and a residual signal as inputs 701. In certain examples, certain parts (e.g., a block) of the inputs 701 are downsampled 702 spatially in a lower (e.g., one-half) resolution path and processed with a series of residual blocks 704A, the certain parts (e.g., the block) of the inputs 701 are downsampled 902 spatially in an even lower (e.g., one-quarter) resolution path and processed with a series of residual blocks 904, and the certain parts (e.g., the block) of the inputs 701 (not downsampled) are processed with a series of residual blocks 704B in a full resolution path. In certain examples, the output of the residual blocks 904 is upsampled (e.g., for an increase of four times the downsampled 902 resolution) at 1006, the output of the residual blocks 704A is upsampled (e.g., for an increase of two times the downsampled 702 resolution) at 706, and both of those outputs are concatenated at 708 with the output of the series of high-resolution residual blocks 704B, e.g., and a convolution (e.g., conv2d k3 nS0) operation 712. In certain examples, that concatenated result (e.g., at full-resolution) is provided to a fuse scale operation 710 that converts the low-resolution and high-resolution data to a prediction value 714 for each sample location. In certain examples, the prediction values are feature values (e.g., features for each of a red, green, and blue channel of the image).

In certain examples in FIGS. 7, 9, and 10 above, the input is downsampled directly to the lower resolution. However, in some examples, a progressive downsampling may be employed. This has the benefit of reducing complexity in certain examples.

Figure 11:
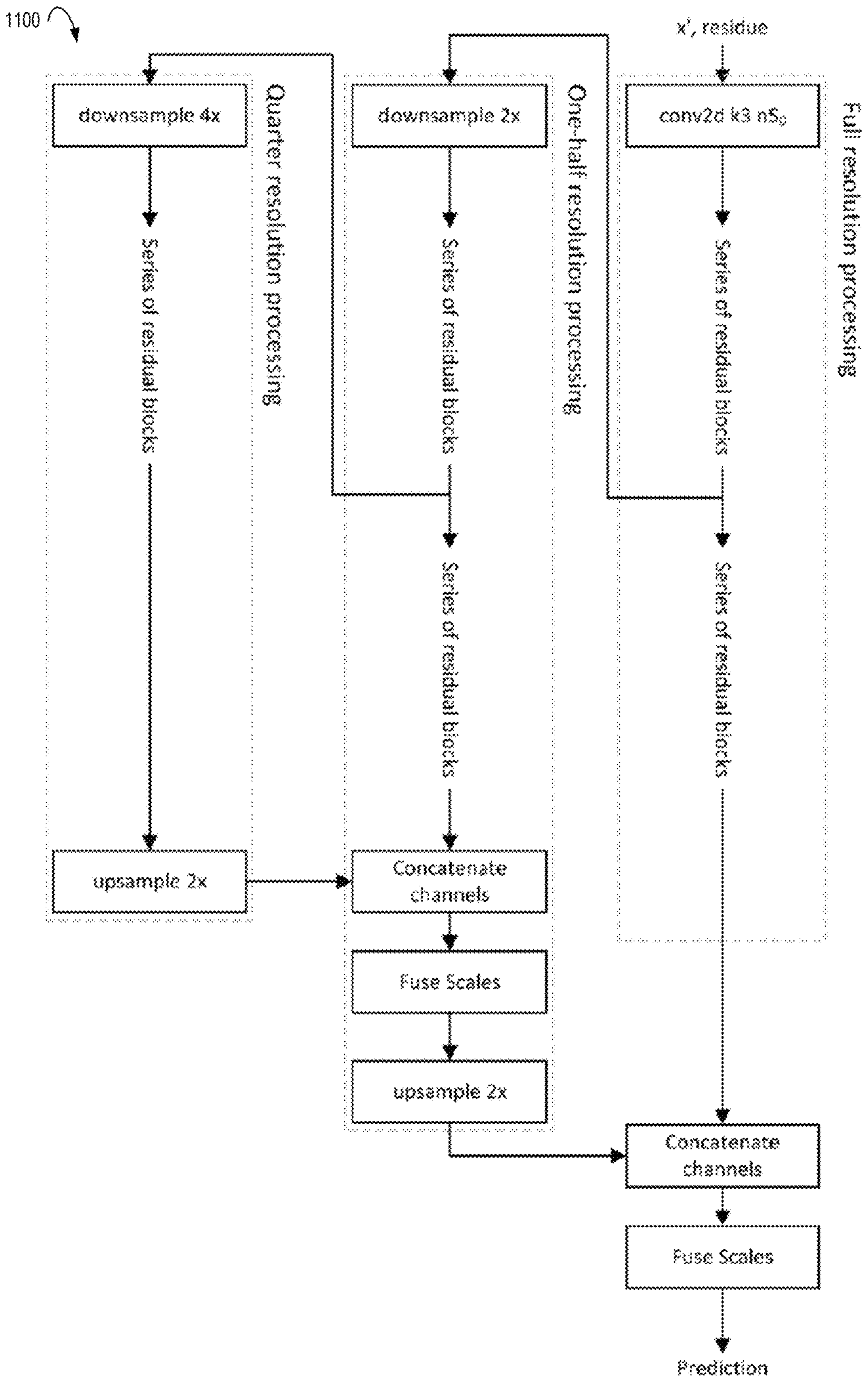
FIG. 11 is a high level architecture diagram of progressive downsampling multi-scale (e.g., full-scale, one-half, and one-quarter resolution) processing with a machine learning (e.g., prediction) model (e.g., multi-scale convolutional neural network (MSCNN)) according to some examples.

FIG. 11 is a high level architecture diagram 1100 of progressive downsampling multi-scale (e.g., full-scale, one-half, and one-quarter resolution) processing with a machine learning (e.g., prediction) model (e.g., multi-scale convolutional neural network (MSCNN)) according to some examples.

For example, FIG. 11 (high level architecture diagram of multi-scale processing) shows an example where the one-half resolution downsampling is computed from full resolution processed data, and the quarter resolution downsampling is a function of one-half resolution processed data.

Certain examples above use a residual block, a scale fusion operation, and a spatial scaling operation that are described in more detail in the below.

Residual Block

Figure 12:
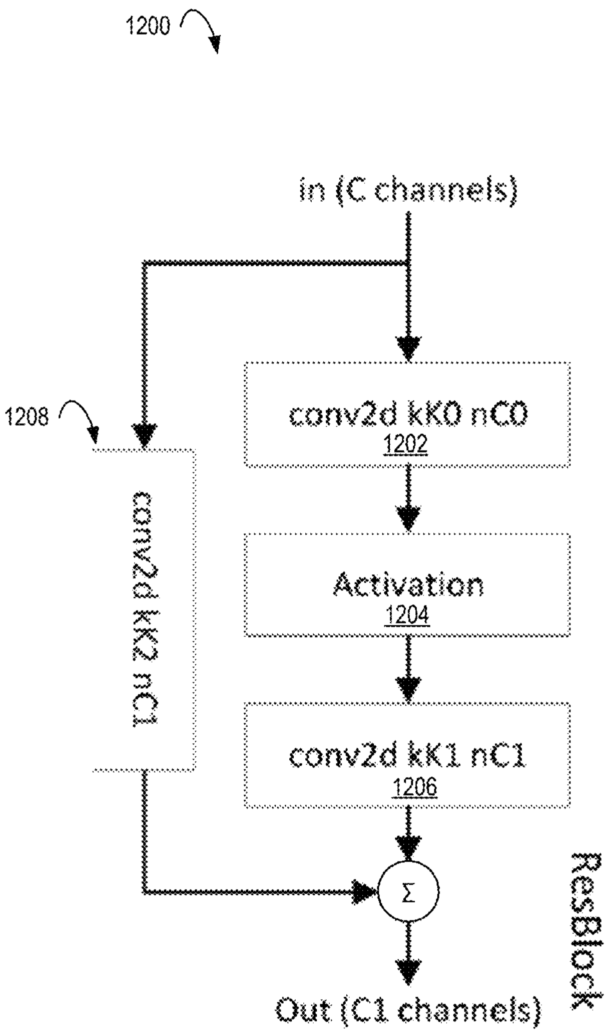
FIG. 12 is a diagram illustrating a residual block of a machine learning (e.g., prediction) model (e.g., multi-scale convolutional neural network (MSCNN)) according to some examples.

One example of a residual block is shown in FIG. 12. In certain examples, any residual block herein (e.g., any of residual blocks 704A, 704B, 904, etc.) is an instance of residual block 1200.

FIG. 12 is a diagram illustrating a residual block 1200 of a machine learning (e.g., prediction) model (e.g., multi-scale convolutional neural network (MSCNN)) according to some examples. In certain examples, the residual block 1200 takes a feature with one or more channels as input and processes it with a two-dimensional convolution (e.g., conv2d kK0 nC0) operation 1202, followed by an activation operation 1204, followed by a two-dimensional convolution (e.g., conv2d kK1 nC1) operation 1206. In certain examples, the result is added to the output of another convolution (e.g., conv2d kK2 nC1) operation 1208. In FIG. 12, a conv2d kX nC operation denotes a two-dimensional convolution with spatial support of X×X samples and C channels as output. In certain examples, this is equivalent to a conv2d kX nC sS operation when S is equal to one and sS denotes the stride of the convolution. In an alternative example, one or more of the two-dimensional convolution (conv2d) operations is replaced with an operation with different dimensions, such as one-dimensional, two-dimensional, and/or three-dimensional convolution. One description of the conv2d kK0 nC0 operation is below:

$$\text{out}(Ni, Coutj) = \sum_{k=0}^{Cin-1} \text{weight}(Coutj, k) \star \text{input}(Ni, k)$$

where star*is the valid 2D cross-correlation operator, N is a batch size, C denotes a number of channels, H is a height of input planes in pixels or samples, and W is width in pixels or samples. This may include a bias term, e.g., as discussed in reference to FIG. 7.

Figure 13:
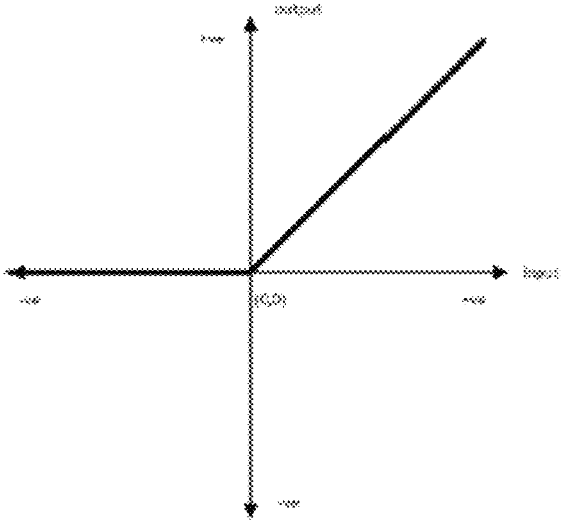
FIG. 13 illustrates an input-output relationship for a Rectified Linear Unit (ReLU) operation according to some examples.

FIG. 13 illustrates an input-output relationship for a Rectified Linear Unit (ReLU) operation according to some examples. FIG. 13 (input-output relationship for Rectified Linear Unit (ReLU) operation) shows an example of an activation function, e.g., activation function in the FIGS. (e.g., activation function 1204 in FIG. 12). This example is typically called a rectified linear unit (or ReLU). In certain examples, the operation is carried out on each element of the input. In some examples, the ReLU operation may be fused with other operation(s), such as a convolution operation.

Figure 14:
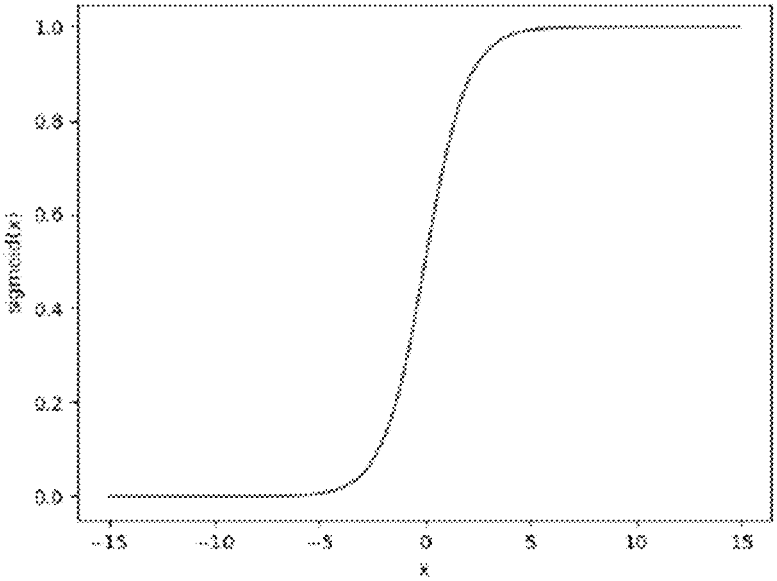
FIG. 14 illustrates an input-output relationship for a sigmoid operation according to some examples.

FIG. 14 illustrates an input-output relationship for a sigmoid operation according to some examples. FIG. 14 (Input-output relationship for sigmoid operation) shows another example of an activation function, e.g., activation function in the FIGS. (e.g., activation function 1204 in FIG. 12). This example is typically called a sigmoid. In certain examples, the operation is carried out on each element of the input. Other example activations operations include parametric rectified linear units.

Figure 15:
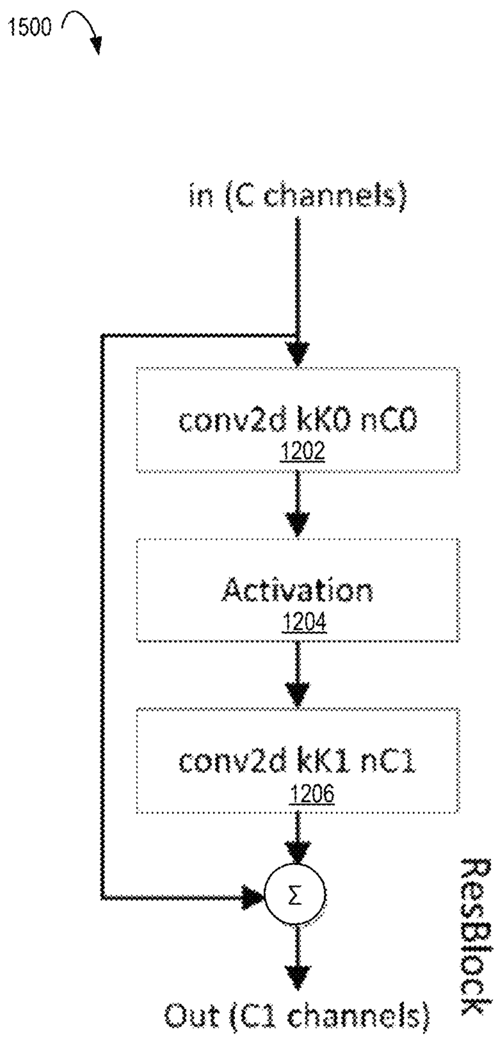
FIG. 15 is a diagram illustrating a residual block of a machine learning (e.g., prediction) model (e.g., multi-scale convolutional neural network (MSCNN)) according to some examples.

FIG. 15 shows an alternative example of a residual block. FIG. 15 is a diagram illustrating a residual block 1500 of a machine learning (e.g., prediction) model (e.g., multi-scale convolutional neural network (MSCNN)) according to some examples. In comparison to residual block 1200 in FIG. 12, residual block 1500 does not include convolution (e.g., conv2dkK2 nC1) operation 1208.

Figure 16:
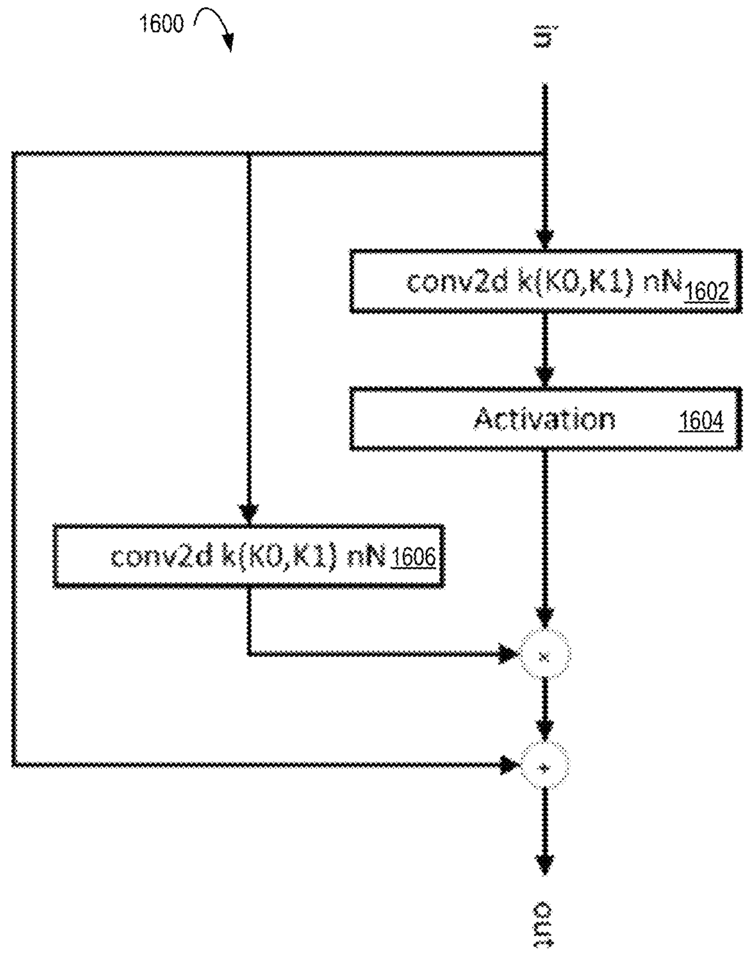
FIG. 16 is a diagram illustrating a residual block of a machine learning (e.g., prediction) model (e.g., multi-scale convolutional neural network (MSCNN)) according to some examples.

FIG. 16 shows yet another example of a residual block. FIG. 16 is a diagram illustrating a residual block 1600 of a machine learning (e.g., prediction) model (e.g., multi-scale convolutional neural network (MSCNN)) according to some examples. In certain examples, residual block 1600 has the benefit of allowing for parallel calculation of the two-dimensional convolution (conv2d) operation 1602 (e.g., followed by activation 1604) and two-dimensional convolution (conv2d) operation 1606. In certain examples, this also has the benefit of having a smaller spatial extent than certain examples above. In certain examples, this has the benefit of reducing the line buffer requirements of the residual block. In certain examples, the multiplication in residual block 1600 is an element by element multiplication. In certain examples, the multiplication ("x") is elementwise (e.g., pointwise) multiplication, and the addition "+" is elementwise (e.g., pointwise) addition.

Fuse Scales Block

Figure 17:
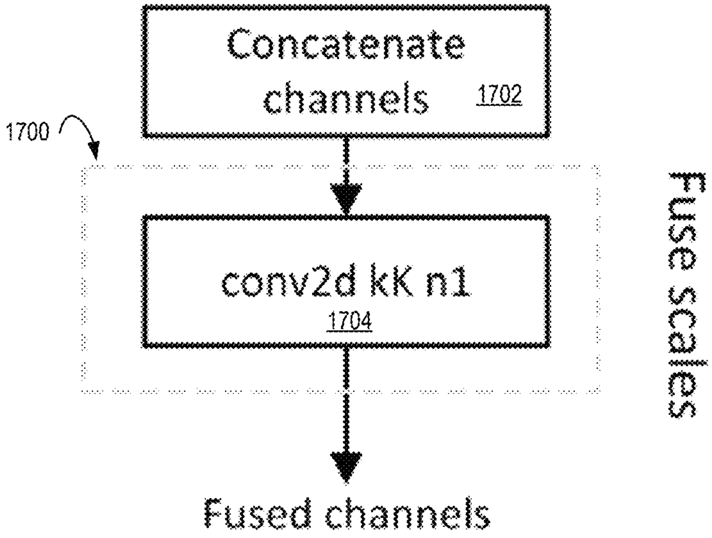
FIG. 17 is a diagram illustrating a fuse scales block (using a convolution block) of a machine learning (e.g., prediction) model (e.g., multi-scale convolutional neural network (MSCNN)) according to some examples.

In certain examples, channels from different scales are combined in fuse scales blocks, e.g., fuse scales 710 in FIGS. 7, 9, and 10 (and fuse scales in FIG. 11) and/or fuse scales 910 in FIG. 9. In one example, a fuse scales block 1700 is realized with a two-dimensional convolution (e.g., conv2d kK0 n1) operation 1704. In certain examples, this operation 1704 generates one channel as output (e.g., and takes its input from the concatenation of channels 1702), which corresponds to the fused channels. This is shown in FIG. 17 (fuse spatial resolution scales using convolution layer). In certain examples, concatenate channels 1702 is any concatenate channel operation herein, e.g., concatenate channels 708 in FIGS. 7 and 9, concatenate channels 908 in FIG. 9, and/or concatenate channels shown in FIG. 11 (e.g., where the one-half resolution processing path has a fuse scales operation with same number of output channels as input channels).

Figure 18:
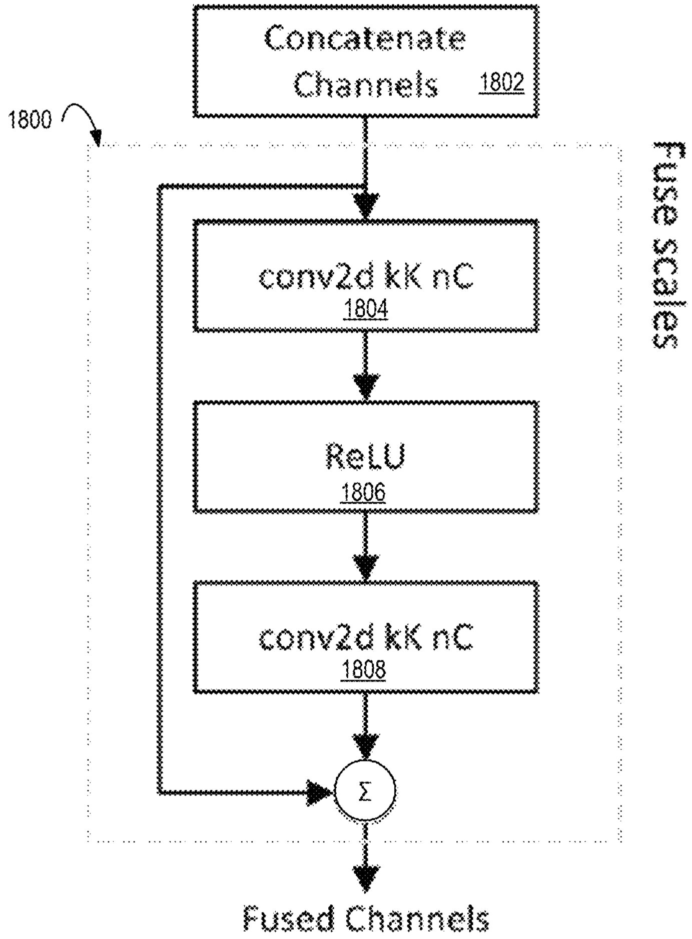
FIG. 18 is a diagram illustrating a fuse scales block (using a residual block) of a machine learning (e.g., prediction) model (e.g., multi-scale convolutional neural network (MSCNN)) according to some examples.

In another example, a fuse scales block consists of one or more residual blocks. FIG. 18 (Fuse spatial resolution scales using residual block) illustrates an example with a same number of output channels as input channels.

FIG. 18 is a diagram illustrating a fuse scales block (using a residual block) of a machine learning (e.g., prediction) model (e.g., multi-scale convolutional neural network (MSCNN)) according to some examples. In one example, a fuse scales block 1800 is realized with a first two-dimensional convolution (e.g., conv2d kK0 nC) operation 1804 that takes its input from the concatenation of channels 1802), outputs that to activation function 1806 (e.g., ReLU), and the output of activation function is provided as input to a second two-dimensional convolution (e.g., conv2d kK0 nC) operation 1808. In certain examples, concatenate channels 1802 is any concatenate channel operation herein, e.g., concatenate channels 708 in FIGS. 7 and 9, concatenate channels 908 in FIG. 9, and/or concatenate channels shown in FIG. 11. In certain examples, 1802 provides the input features (e.g., number of elements). In certain examples, the circled ">" is a summation, e.g., an element by corresponding element (e.g., elementwise) (e.g., pointwise) summation.

Figure 19:
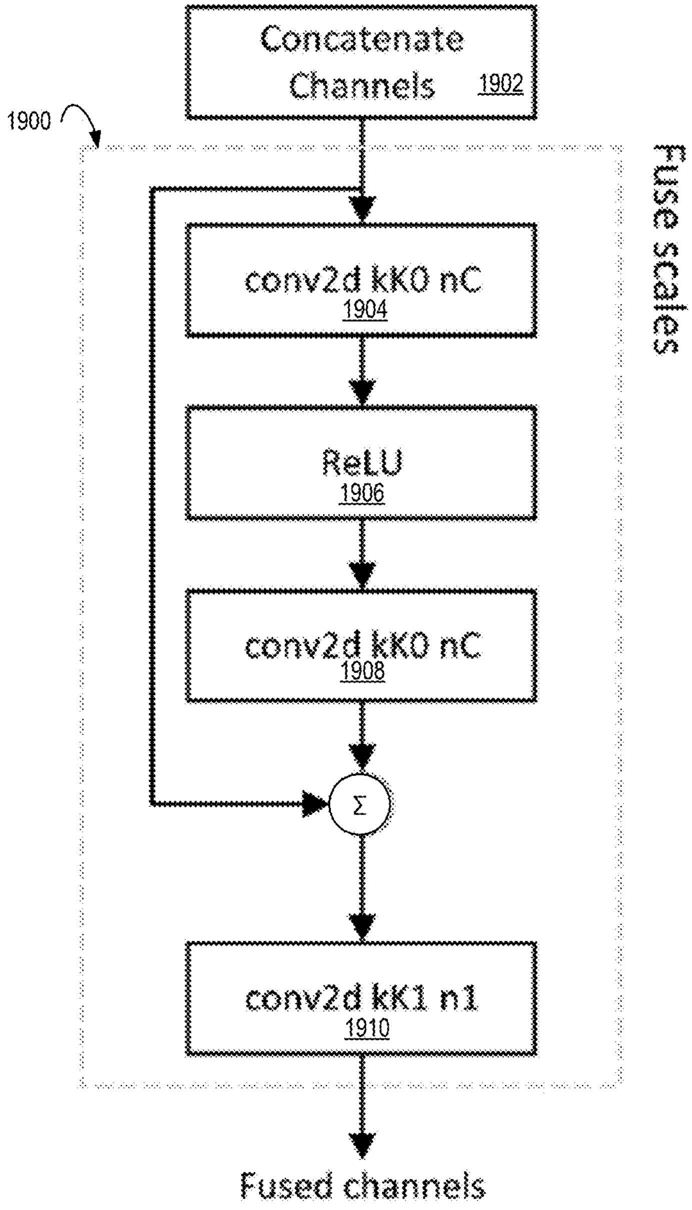
FIG. 19 is a diagram illustrating a fuse scales block (using residual and convolutional blocks) of a machine learning (e.g., prediction) model (e.g., multi-scale convolutional neural network (MSCNN)) according to some examples.

In another example, a fuse scale block may use a combination of residual blocks and convolution blocks. FIG. 19 (fuse spatial resolution scales using residual and convolutional blocks) illustrates an example with one output channel. FIG. 19 is a diagram illustrating a fuse scales block 1900 (using residual and convolutional blocks) of a machine learning (e.g., prediction) model (e.g., multi-scale convolutional neural network (MSCNN)) according to some examples. In one example, a fuse scales block 1900 is realized with a first two-dimensional convolution (e.g., conv2d kK0 nC) operation 1904 that takes its input from the concatenation of channels 1902), outputs that to activation function 1906 (e.g., ReLU), and the output of activation function is provided as input to a second two-dimensional convolution (e.g., conv2d kK0 nC) operation 1908. In certain examples, the output of the second two-dimensional convolution (e.g., conv2d kK0 nC) operation 1908 and the output of concatenate channels 1902 are used to generate a residual, and that residual is provided as input to a third two-dimensional convolution (e.g., conv2d kK0 n1) operation 1910.

In certain examples, concatenate channels 1902 is any concatenate channel operation herein, e.g., concatenate channels 708 in FIGS. 7 and 9, concatenate channels 908 in FIG. 9, and/or concatenate channels shown in FIG. 11.

Spatial Scaling

Spatial scaling operations change the spatial resolution of an input tensor. In certain examples, downsampling is an operation that reduces the spatial resolution of input features, while upsampling is an operation that increases the spatial resolution of input features. Some examples to achieve spatial scaling are described below.

Figure 20:
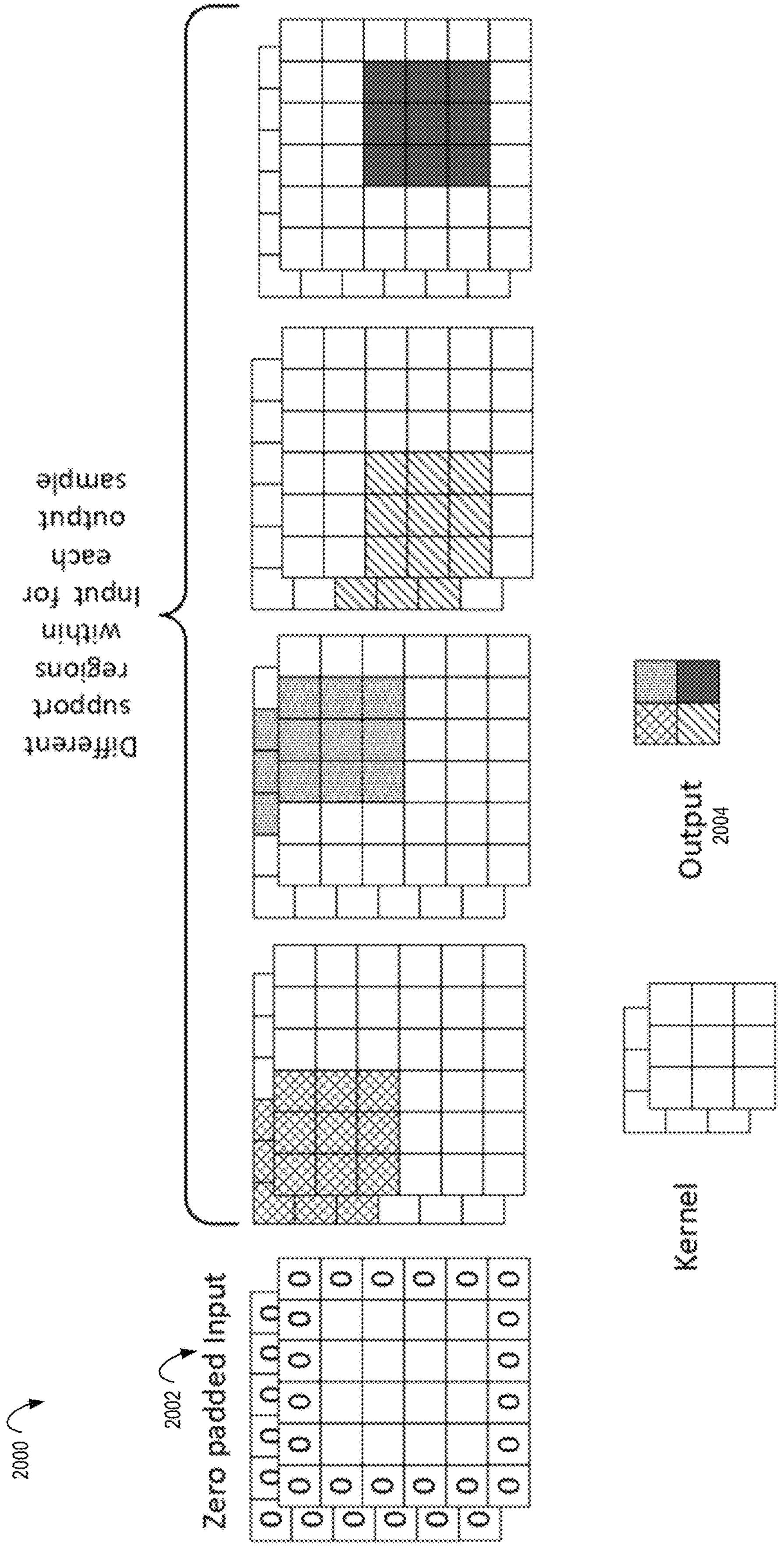
FIG. 20 illustrates downsampling using a strided convolution according to some examples.

FIG. 20 illustrates downsampling 2000 using a strided convolution according to some examples. FIG. 20 shows an example of downsampling using striding. In FIG. 20, a convolution operation takes a feature tensor with two channels as input 2002. The spatial dimension of the feature is 4×4 samples (shown as white squares in 2002), and the operation outputs 2004 one channel with a downsampling factor of two. In one example, the downsampling is achieved by first padding the input tensor with zero values as shown in input 2002 in FIG. 20. In certain examples, the stride is set to two in each spatial dimension, which determines the number of output samples. As shown in FIG. 20, the kernel in this example has a dimension of three in both spatial dimensions and a dimension of two in the channel dimension. In FIG. 20, the four shaded and/or cross-hatched samples are used to show the kernel support regions in the input. Output 2004 sample values have corresponding shading and/or cross-hatching. The convolution operation itself can be denoted as a conv2d k3 n1 s2 operation, or equivalently a conv2d k3 n1 s2 p1 operation, where p1 represents the zero padding.

Each output location (e.g., output channel) corresponds to the addition of a bias value with the sum of the 12 corresponding shaded and/or cross-hatched samples in the input multiplied by the 12 kernel weights. Multiple convolution kernels are used when outputting more than one channel (with one kernel corresponding to each output channel).

In the example in FIG. 20, the convolution operation uses all channels in the input. In other examples, it may be desirable to group the different input channels into channel groups and limit a convolution operation to a single group. In such an event, the number of groups (or alternatively a group size) is specified for the convolution layer. One example using channel groups is a downsampler that operates independently on each input channel. This is shown in FIG. 21 (downsampling using strided convolution and input channel grouping).

Figure 21:
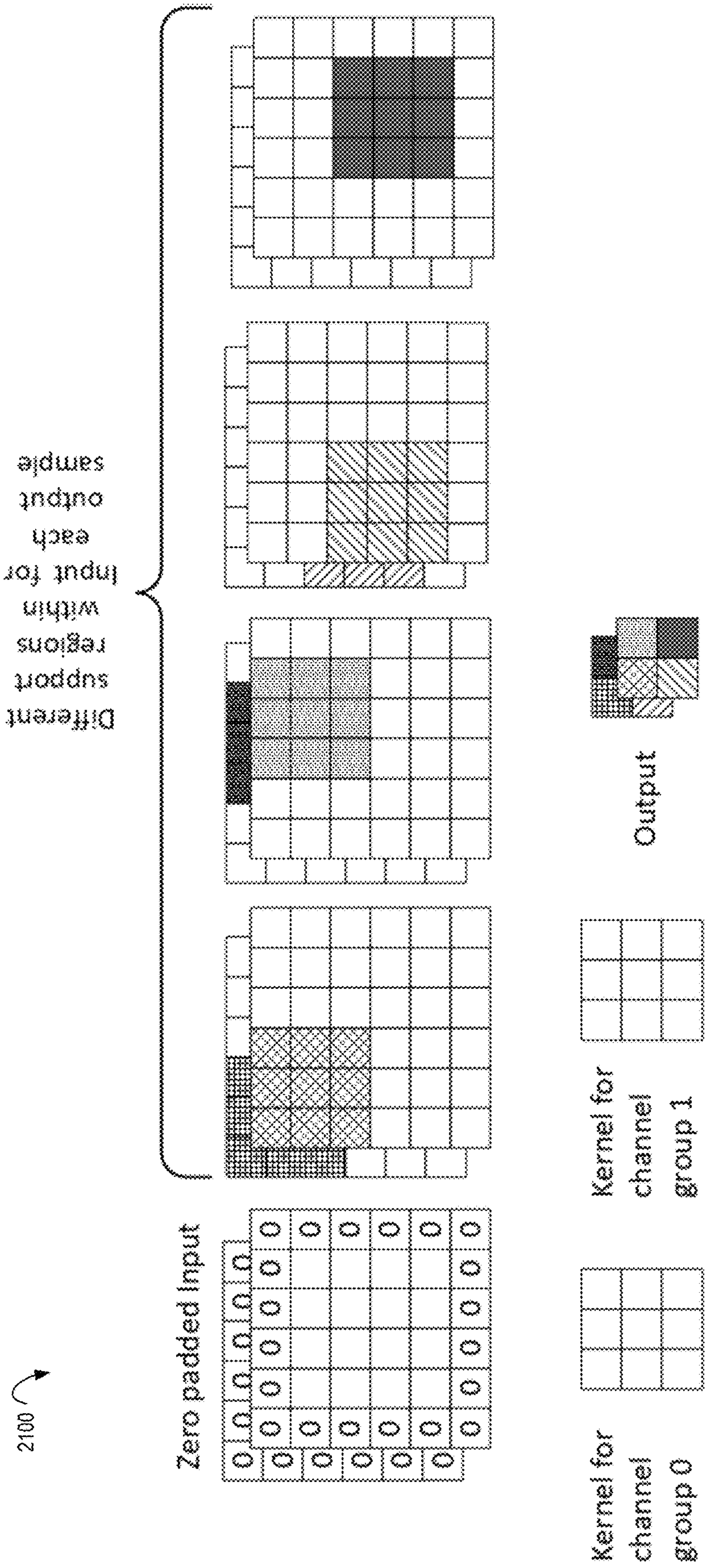
FIG. 21 illustrates downsampling using a strided convolution and input channel grouping according to some examples.

FIG. 21 illustrates downsampling 2100 using a strided convolution and input channel grouping according to some examples. In FIG. 21, there are as many channel groups as input channels. The support of each kernel spans one input channel, which corresponds to a channel group size of one.

In another example, it is desirable to have the channel group size greater than one, e.g., the convolution operation then uses kernels that span across more than one channels. In certain examples, a convolution operator with a group size of G is denoted as a conv2d kK0 nC0 sS gsG operation, where G is assumed to be equal to the number of input channels by default. In certain examples, using channel groups reduces the complexity of a two-dimensional convolution (conv2d) operation, since each convolution kernel operates over a smaller number of input channels. So, while a conv2d k3 n2 operation with two input channels performs 2×3×3 operations per output sample, a conv2d k3 n2 gs1 operation with two input channels performs 1×3×3 operations per output sample.

In some examples, channel groups are not the same size. In the same or other examples, the number of channels output by each channel group do not have to be the same. FIG. 22 (example channel groupings for a convolution layer) shows example channel groups for a conv2d operation. FIG. 22 illustrates three different channel groupings for a convolution layer according to some examples. For example, a many-to-many channel grouping 2202 (shown as an input of four channel groups 0-3 with four channels each, and each output group with three channels), a many-to-one channel grouping 2204 (shown as an input of four channel groups 0-3 with four channels each, and each output group with one channel), and a one-to-many channel grouping 2206 (shown as an input of four channel groups 0-3 with one channel each, and each output group with four channels).

Figure 23:
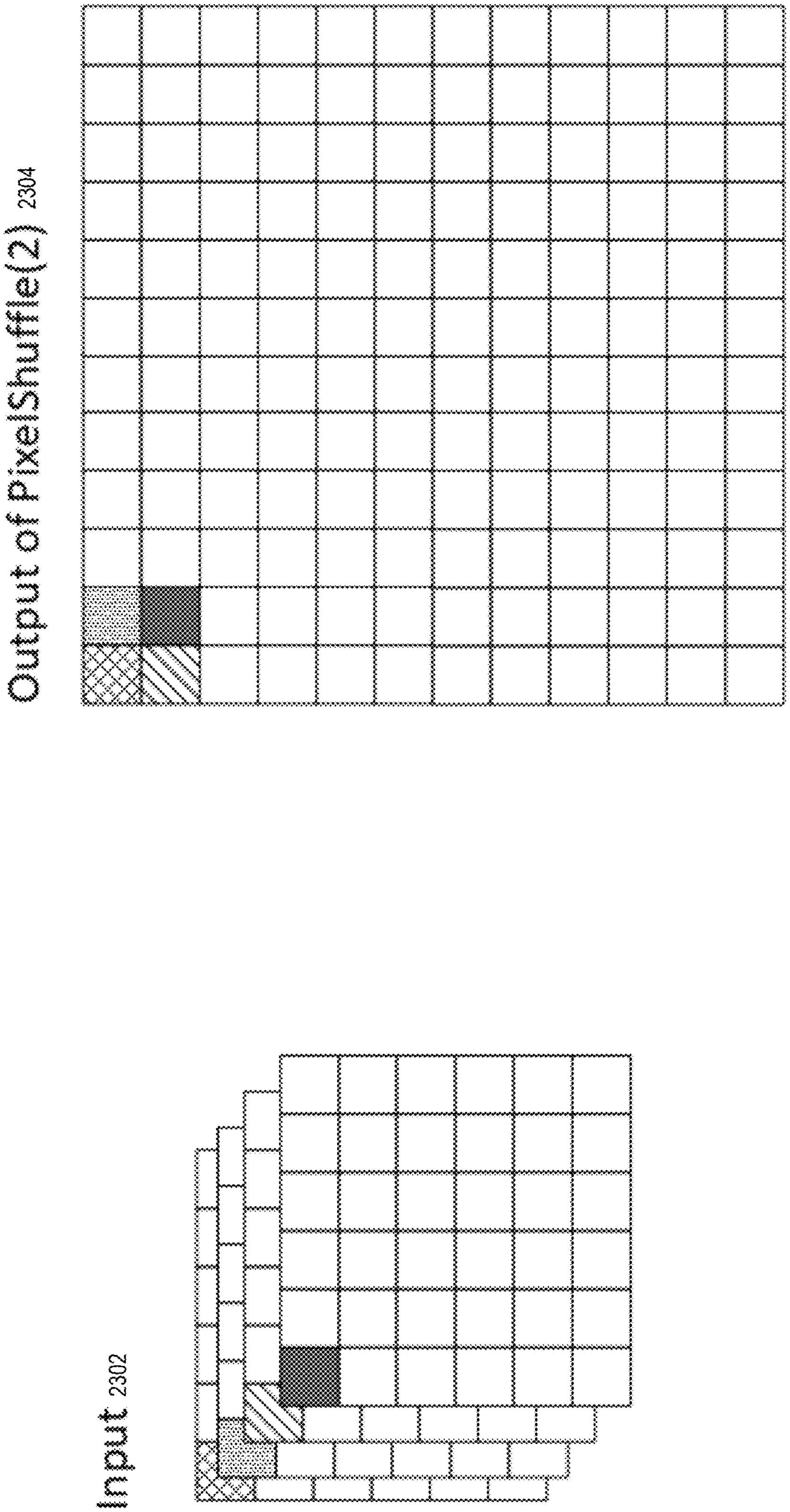
FIG. 23 illustrates upsampling by pixel shuffle according to some examples.

FIG. 23 illustrates upsampling by pixel shuffle according to some examples. FIG. 23 (upsampling using pixel shuffle) shows an example of pixel shuffling. As shown in FIG. 23, the input 2302 consists of tensors (shown as four different 6×6 2D matrices) with four channels and a horizontal and vertical dimension of six samples. The output 2304 of the pixel shuffle operation corresponds to an interleaving of the four input channels to create a tensor (shown as one 12×12 2D matrix) with one channel and horizontal and vertical dimensions of 12 samples. In certain examples, the pixel shuffle (2) operation rearranges the samples to create a single channel that is 2× the spatial size of the input channels (e.g., shown as 6×6 input channels and a 12×12 single output channel).

FIG. 23 (upsampling using pixel shuffle) shows an example of pixel shuffling. As shown in FIG. 23, the input 2302 consists of tensors (shown as four different 6×6 2D matrices) with four channels and a horizontal and vertical dimension of six samples. The output 2304 of the pixel shuffle operation corresponds to an interleaving of the four input channels to create a tensor (shown as one 12×12 2D matrix) with one channel and horizontal and vertical dimensions of 12 samples. In certain examples, the pixel shuffle (2) operation rearranges the samples to create a single channel that is 2× the spatial size of the input channels (e.g., shown as 6×6 input channels and a 12×12 single output channel). Other pixel shuffle values are possible. For example, a pixel shuffle (3) operation rearranges the samples from 9 channels to create a single channel that is 3× the spatial size of the input channels. Alternatively, a pixel shuffle (n) operation rearranges the samples from n*n channels to create a single channel that is n-times the spatial size of the input channels. In an additional example, a pixel shuffle (n1, n2) operation rearranges the samples from n1*n2 channels to create a single channel that is (n1*n2)-times the spatial size of the input channels. In additional examples, a pixel shuffle operation may apply a spatial offset to the input tensors before interleaving. In some examples, the spatial offset may not be equal for different channels in the input tenors. For example, the first channel may have a different spatial offset than the second channel.

In some examples of upsampling using pixel shuffling, the input to the pixel shuffling operation is created using a two-dimensional convolution (conv2d) operation. For example, the operation may be a conv2d kK0 cC1 gG, where Cl is equal to four times the number of input channels and G is equal to the number of input channels. In certain examples, the kernel weights used by the conv2d operation may be determined using a training algorithm. Or, alternatively, correspond to an upsampling algorithm such as, but not limited to, nearest neighbor interpolation, bilinear interpolation, and/or bicubic interpolation. Certain upsampling algorithms may have the benefit of lower complexity. Alternatively, learned weights may better preserve information.

Figure 24:
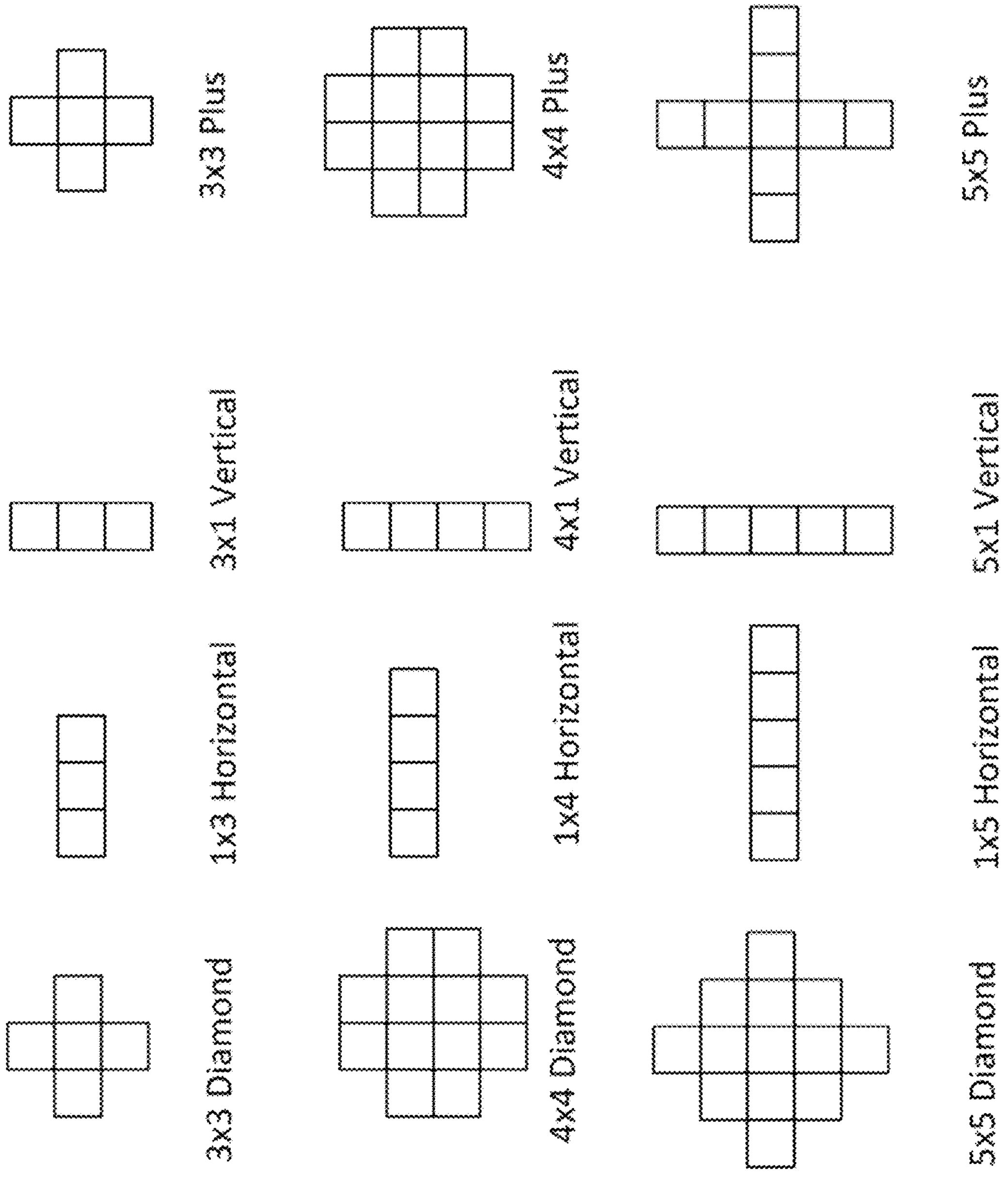
FIG. 24 illustrates convolution kernels with diamond, horizontal, vertical, and plus spatial extent shapes according to some examples.

While channel grouping reduces complexity, an alternative method to achieve complexity reduction of a conv2d operation is to reduce the spatial extent of the kernel. Some examples use convolution kernels with diamond, horizontal, vertical, or plus shapes as shown in FIG. 24. FIG. 24 illustrates twelve different convolution kernels with diamond, horizontal, vertical, and plus spatial extent shapes according to some examples.

In certain examples, using a diamond shape is denoted as the capital D in a "conv2dD" operation.

In some examples, the kernel in a conv2d operation may not be symmetric about the co-located sample in input.

Additional Examples

Figure 25:
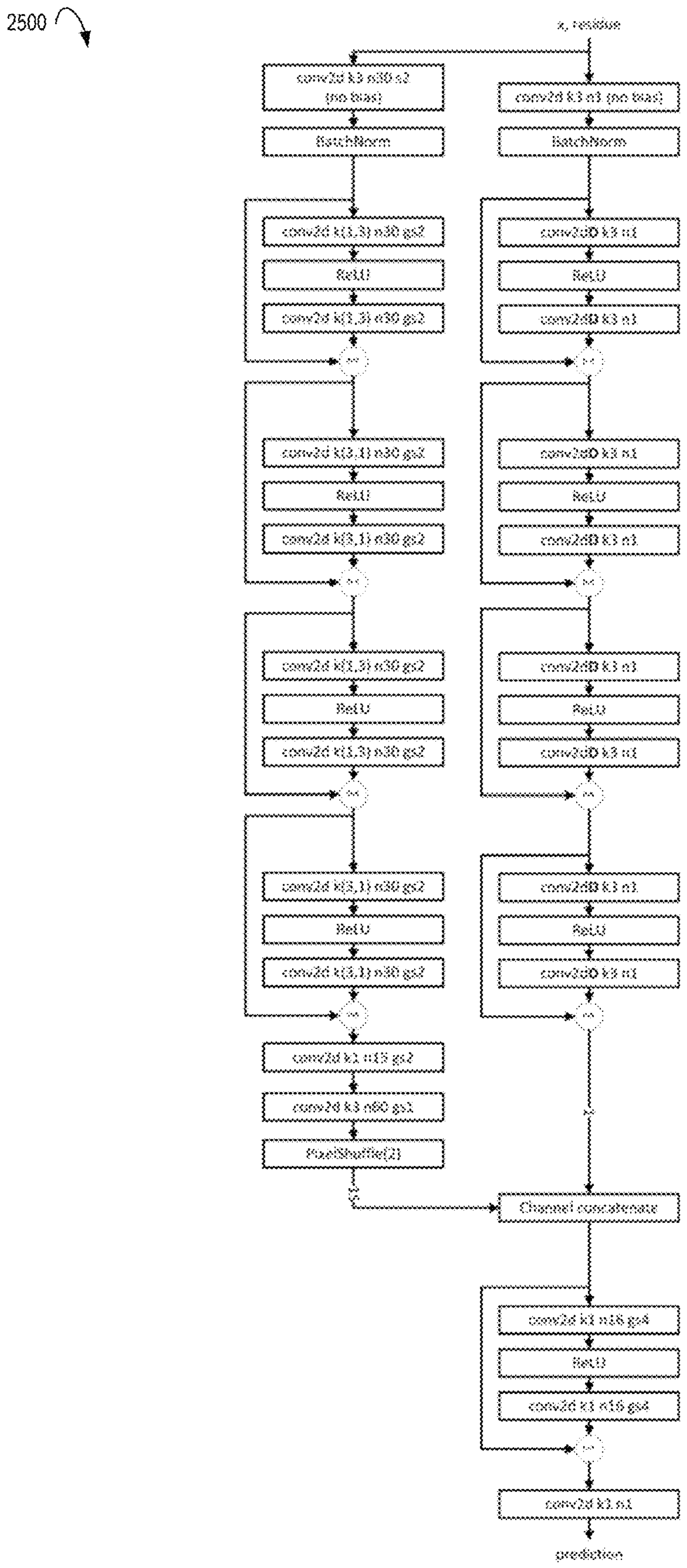
FIG. 25 illustrates full resolution and half resolution processing paths with group size of two in the half resolution path according to some examples.

FIG. 25 (example with group size two in one-half resolution) shows an example of a method that uses full resolution and half resolution processing paths. FIG. 25 illustrates full resolution and half resolution processing paths 2500 with group size of two in the half resolution path according to some examples. FIG. 25 illustrates taking an image, denoted as x', and residual data as input. The full resolution path takes the input and applies a conv2d operation followed by a batch norm operation. The output of the batch norm is provided as input to a sequence of four residual blocks that use a diamond shape for the conv2d operation. The half resolution path takes the input and downsamples it (using a strided convolution) followed by a batch norm operation. The output of the batch norm is provided as input to a sequence of four residual blocks that use a channel group size of two for the conv2d operations. Two of the residual blocks use a 3×1 kernel for the conv2d operation; another two of the residual blocks use a 1×3 kernel for the conv2d operation. The output of the fourth residual block in the half-resolution processing path is input to a convolution operation with a 1×1 kernel and a group size of two. This convolution operation outputs one channel for every channel group that has the benefit of reducing the data size. The output of this convolution layer is fed to an upsampling with pixel shuffle operation. In certain examples, the pixel shuffle operation is preceded by a conv2d operation that outputs 4 times the number of channels as input channels, e.g., a conv2d operation that has a group size of 1, results in 4 channels being output for each input channel. The output of the upsampling operation is concatenated with the one full resolution channel and input to a residual block with a 1×1 convolution and group size of four. This is followed by a convolution with 1×1 spatial extent that outputs one channel.

FIG. 26 illustrates a batch norm operation according to some examples. In certain examples, the batch norm operation applies a series of multiplication and addition operations on each sample in a tensor. In one example, the operation is expressed as shown in FIG. 26, e.g., where bn0, bn1, bn2 and bn3 are parameters of the batch norm operation, input; is the i-th element of an input tensor and out is the i-th element of an output tensor. In certain examples, the parameters (e.g., bn0, bn1, bn2, bn3) are different for different channels.

In some examples, the batch norm operation may be combined with other operation(s), e.g., convolution.

The example in FIG. 25 has multiple benefits. First, reduced spatial extent in the high-resolution processing path reduces computational complexity. Second, the use of channel groups allows for parallel calculations.

Figure 27:
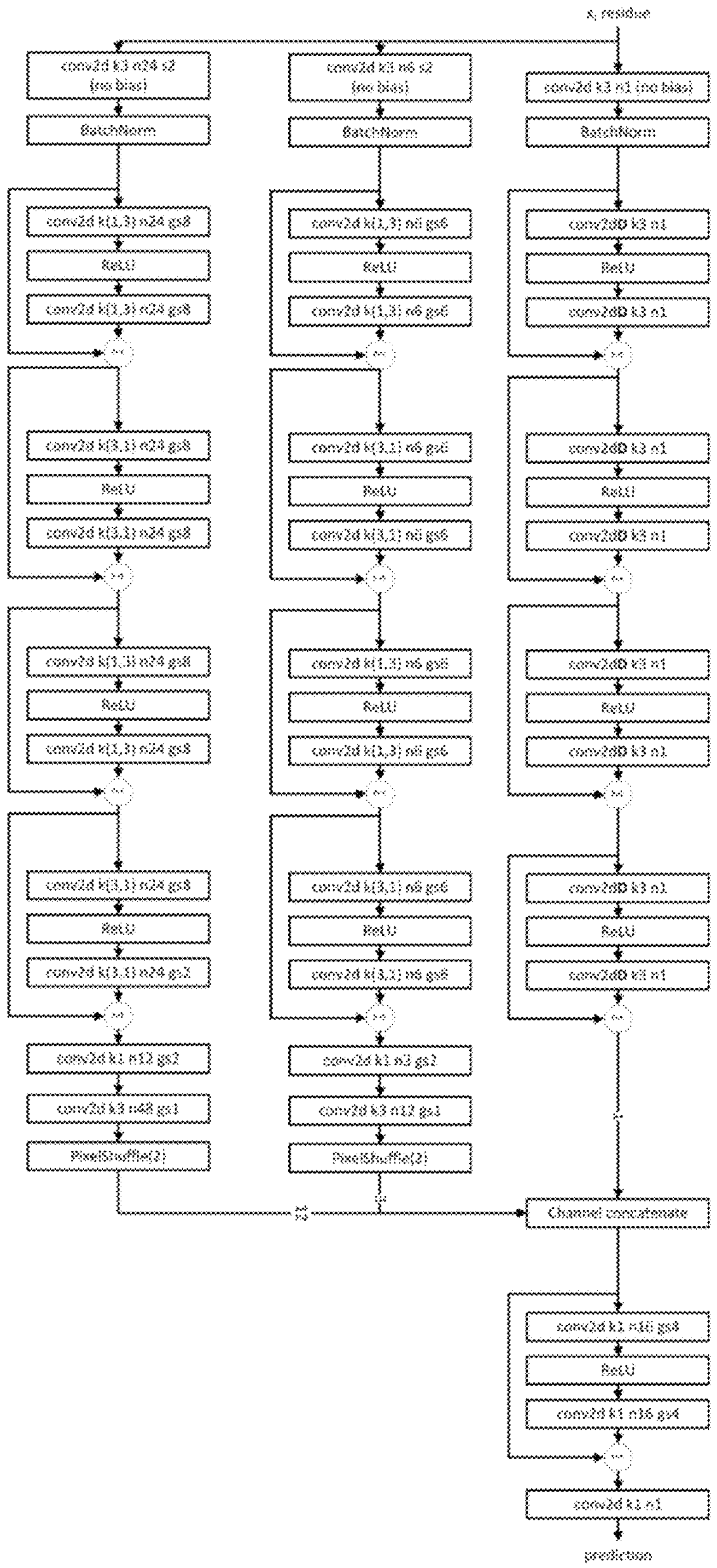
FIG. 27 illustrates full resolution and half resolution processing paths with six of the half resolution residual blocks using a group size of six, and the remaining half resolution residual blocks using a group size of eight, according to some examples.

FIG. 27 illustrates full resolution and half resolution processing paths 2700 with certain (e.g., four of) the half resolution residual blocks using a group size (e.g., of six), and the remaining (e.g., half) resolution residual blocks using a group size of eight, according to some examples. FIG. 27 (example with group size six and eight in one-half resolution) shows another example of a method that uses full resolution and half resolution processing paths. This example uses different group sizes in the half resolution processing path. As can be seen in FIG. 27, the certain (e.g., four) of the half resolution residual blocks use a group size of six, while the remaining half resolution residual blocks use a group size of eight. This has the benefit of improving the accuracy of the prediction at the expense of increasing network complexity.

Figure 28:
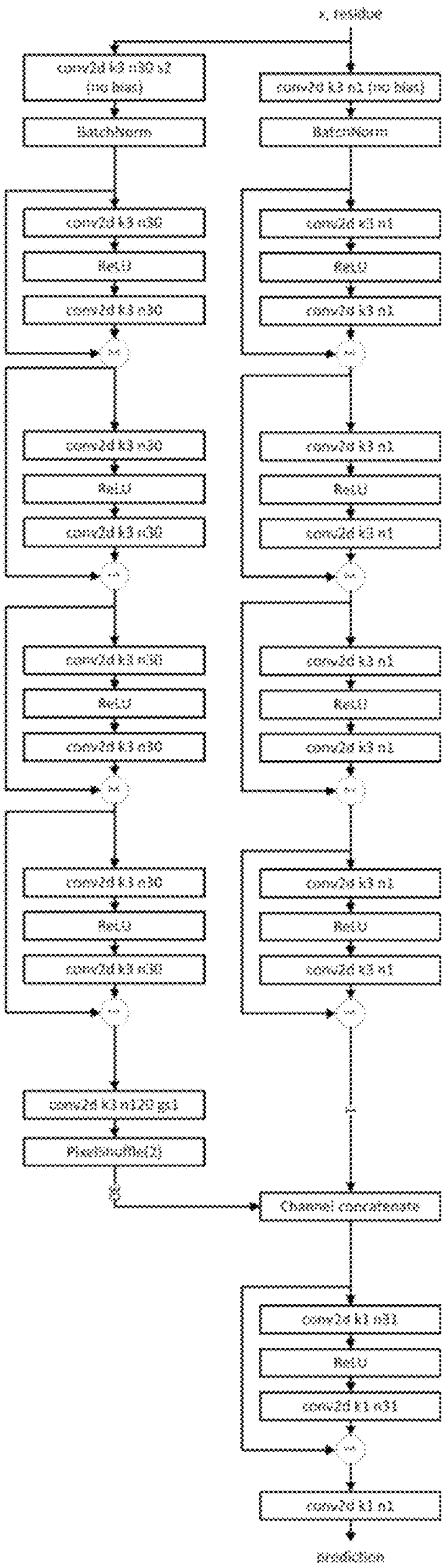
FIG. 28 illustrates full resolution and half resolution processing paths with a single channel group in the half resolution path according to some examples.

FIG. 28 illustrates full resolution and half resolution processing paths 2800 with a single channel group in the half resolution path according to some examples. FIG. 28 (example with single channel group in one-half resolution) shows another example of the method that uses full resolution and half resolution processing paths. The example uses a single group in the half resolution processing path. As can be seen in FIG. 28, all of the half resolution blocks are included in the same group in certain examples. This has the benefit of further improving the accuracy of the prediction, e.g., at the expense of further increasing network complexity.

Figure 29:
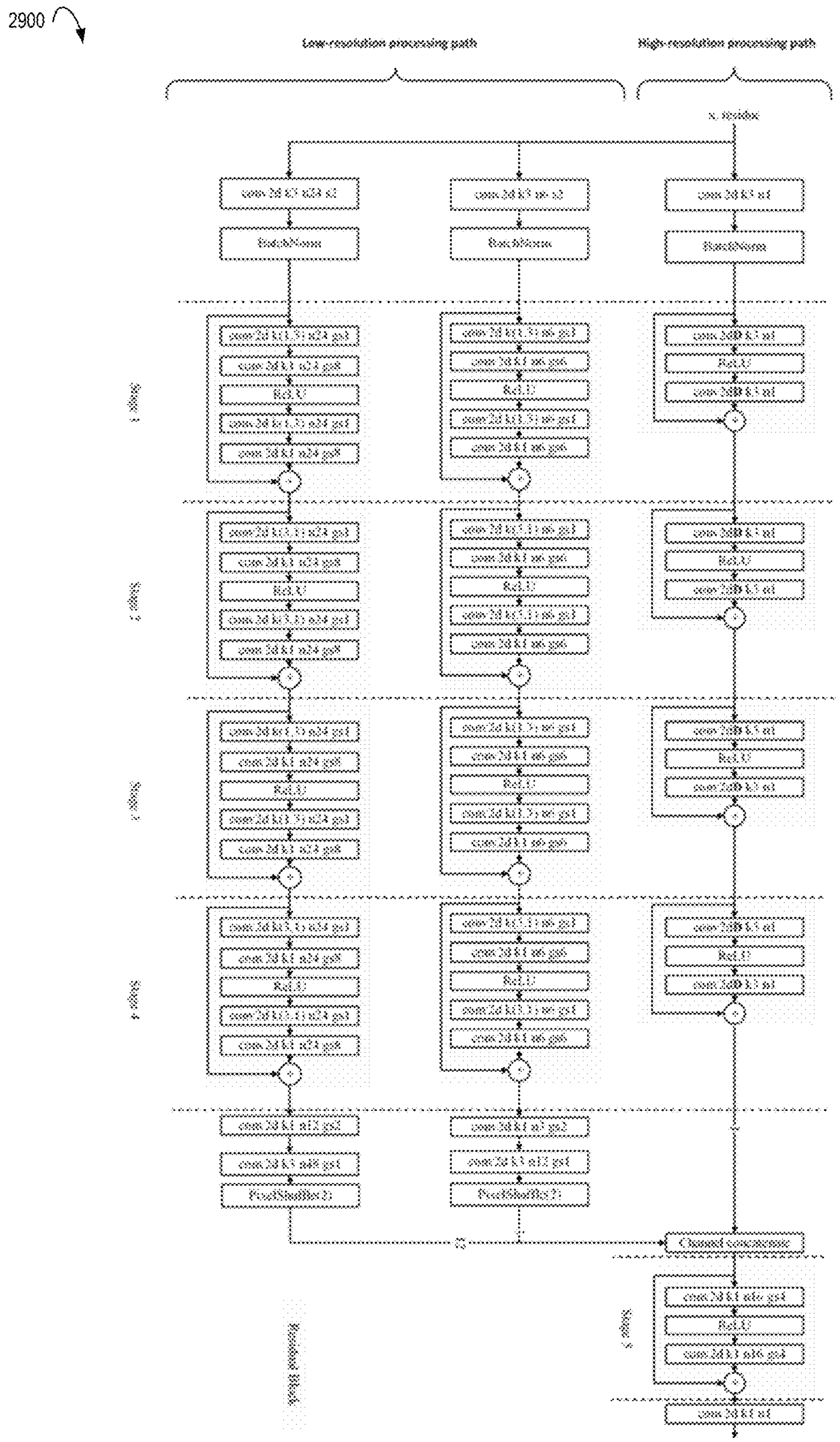
FIG. 29 illustrates the convolutional layers of FIG. 27 being replaced by the sequential application of a spatial convolution performed independently over each input channel followed by a point-wise convolution according to some examples.

FIG. 29 illustrates at 2900 the convolutional layers of FIG. 27 being replaced by the sequential application of a spatial convolution performed independently over each input channel followed by a point-wise convolution according to some examples. FIG. 29 shows another example of a method that uses full resolution and half resolution processing paths. In certain examples, one or more of the convolutional layers uses the sequential application of a spatial convolution performed independently over each input channel followed by a point-wise convolution, e.g., where a point-wise convolution is an operation that performs a convolution with 1×1 spatial support over all input channels in the input. In some examples, the residual blocks in the low-resolution processing block employ this modification. One benefit of the approach is the sequential application of a spatial convolution followed by a point-wise convolution has lower complexity than a generalized convolution operation in some examples.

Resolution Change

Figure 30:
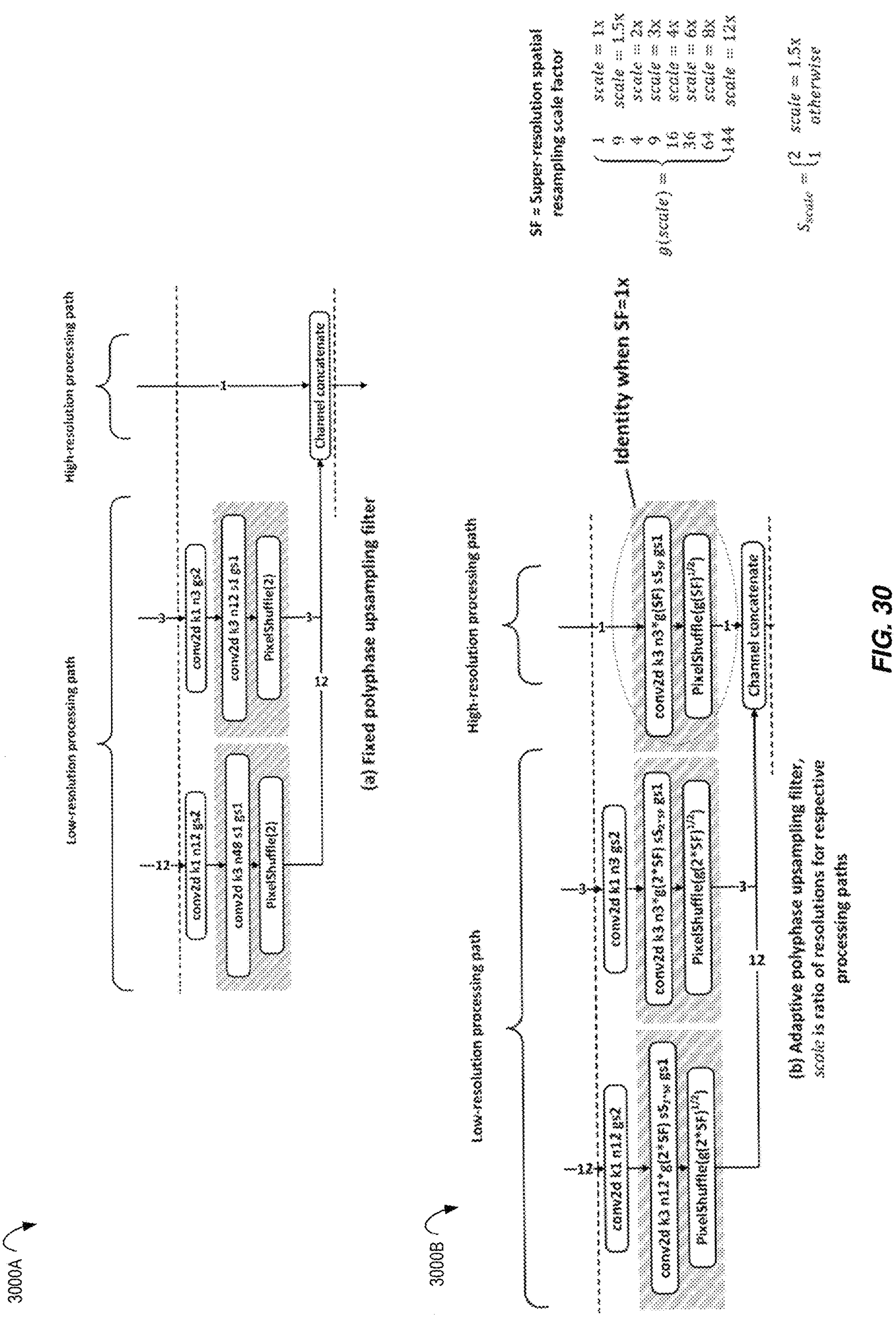
FIG. 30 illustrates a comparison of phase generation for (a) fixed polyphase upsampling and (b) an adaptive polyphase upsampling filter based on a super-resolution scale factor according to some examples.

In some examples, it is desirable for the prediction output of the network to have a different resolution than the network input (e.g., an image [denoted as x'] and residual data). One method for supporting a resolution change is shown in FIG. 30(*b*). In the example, one or more of the disclosed methods incorporates an adaptive polyphase upsampling filter in both the high resolution and lower resolution processing paths, e.g., in contrast to not using an adaptive polyphase upsampling filter in the high resolution processing path as shown in FIG. 30(*a*). In some examples, the change in resolution between the network input and prediction output may be limited to one or more (e.g., preselected) values. For example, the spatial scale factor may be one of (e.g., only) a 1×, 1.5×, 2×, 3×, 4×, and 6×scale factor change. In another example, the spatial scale factor may be one of (e.g., only) a 1×, 1.5×, 2×, 3×, 4×, 6×, 8×, and 12× scale factor change.

FIG. 30 illustrates a comparison of phase generation for (a) fixed polyphase upsampling 3000A and (b) an adaptive polyphase upsampling filter based on a super-resolution scale factor 3000B according to some examples. In certain examples, the super-resolution spatial resampling scale factor (SF) indicates the number of channels to be output from the convolution (e.g., conv2d k3 n3*g (SF) $sS_{SF}$ gs1) operation, e.g., and then the plurality of channels are interleaved (e.g., via PixelShuffle) into a channel. For example, if a downsampled source frame (e.g., used as the source for the low-resolution and high-resolution processing paths) is at a first resolution (e.g., 540p) and it is desired to perform a super-resolution scaling to a second (e.g., target) resolution (e.g., 1080p) that is twice the resolution of the first resolution, a 2× scaling factor (SF) is indicated and thus (e.g., as shown in FIG. 30(*b*)), four channels (e.g., 2 horizontal×2 vertical) are to be output from the convolution, for example, and then those four channels are interleaved to generate the single channel output, e.g., as shown in FIG. 23. In certain examples, the output of the single channel (but upsampled) from the pixel shuffle in the high-resolution processing path is concatenated with the other output channels from the pixel shuffle(s) in the low-resolution processing path. In certain examples, the stride factor (SSSF) indicates the stride for the super-resolution spatial resampling scale factor (SF) (e.g., the stride in the horizontal and/or vertical direction for that SF), see. e.g., FIG. 33.

Figure 31:
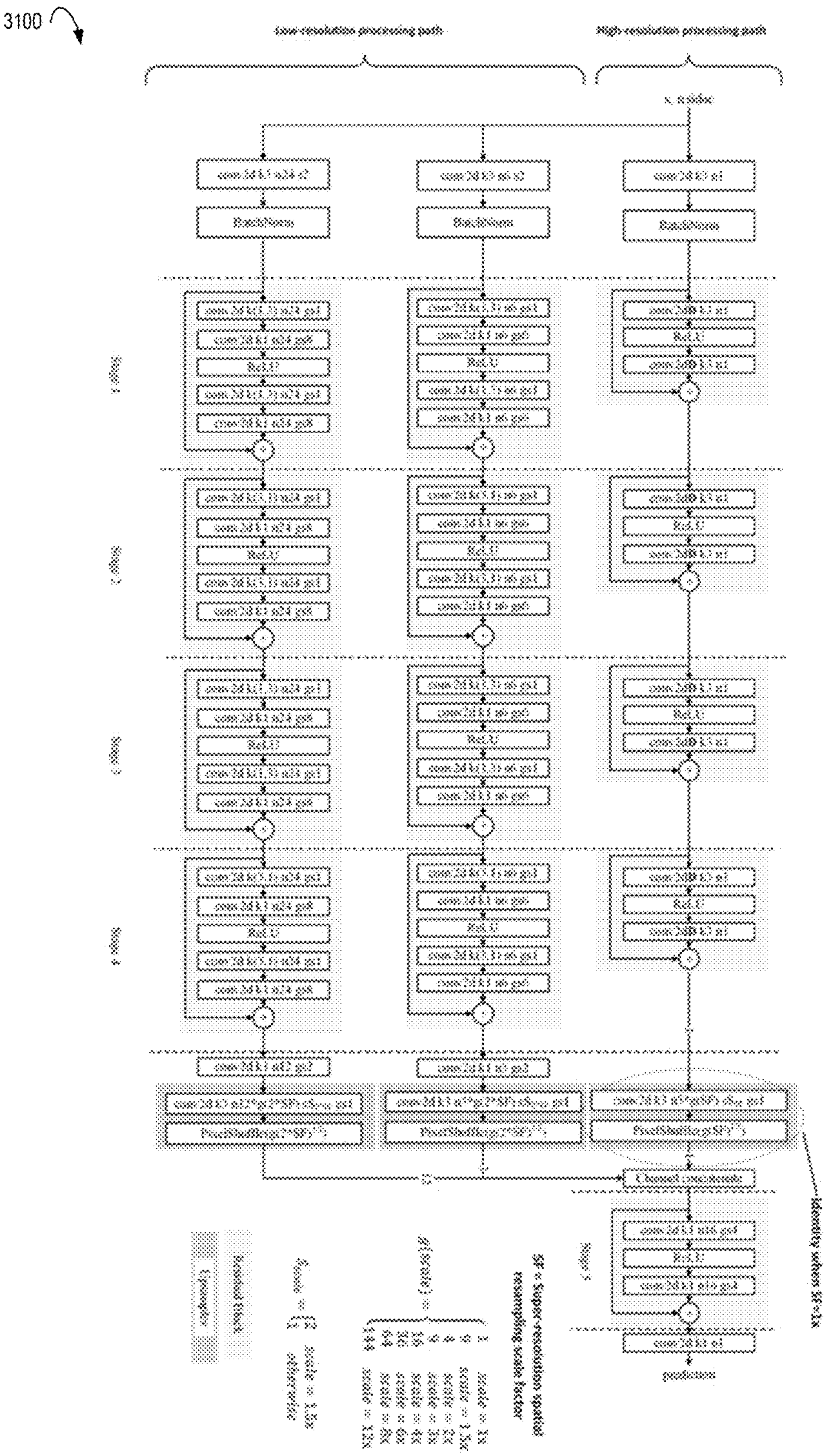
FIG. 31 illustrates an adaptive polyphase upsampling filter combined with the example shown in FIG. 29 according to some examples.

In certain examples, an adaptive polyphase upsampling filter is combined with certain examples herein. FIG. 31 illustrates at 3100 an adaptive polyphase upsampling filter combined with the example shown in FIG. 29 according to some examples. In certain examples, a machine learning model (e.g., MSCNN) performs convolution operations in a first layer to generate a first feature tensor at a first resolution (e.g., convolution operations in a first layer in the high-resolution processing path in FIG. 31) and a second feature tensor at a second resolution that is lower than the first resolution (e.g., convolution operations in a first layer in the low-resolution processing path in FIG. 31).

Figure 32:
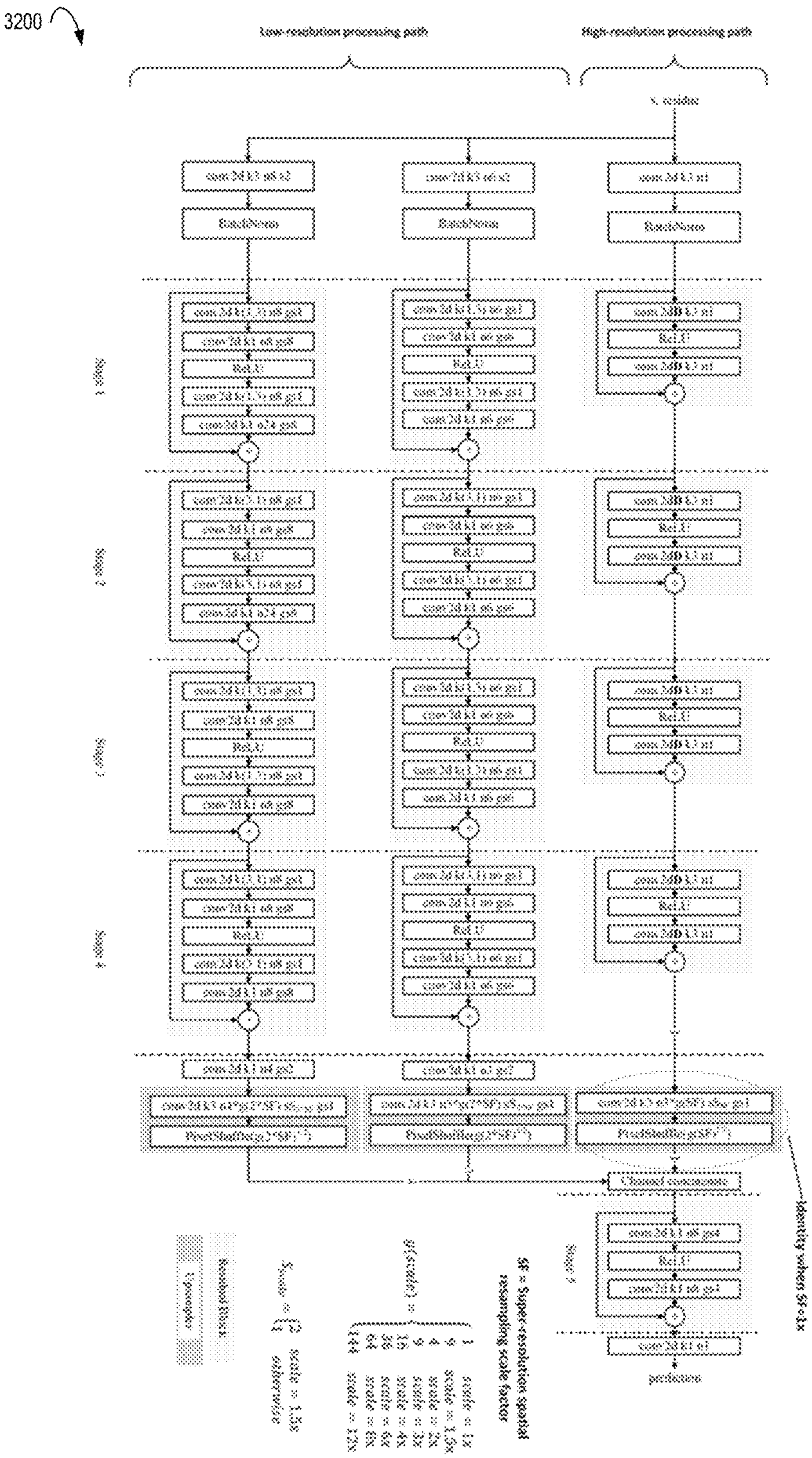
FIG. 32 illustrates a reduction of the channel counts for the second low-resolution processing path from twenty-four in FIG. 31 to eight in FIG. 32 according to some examples.

In other examples, different numbers of channels are used in the processing paths. For example, FIG. 32 shows the reduction of the channel counts for the second low-resolution processing path from 24 to 8. As shown in FIG. 32, this may change the number of input channels for the upsampler and/or the number of channels processed by subsequent residual blocks (e.g., Stage 5 residual blocks).

FIG. 32 illustrates at 3200 a reduction of the channel counts for the second low-resolution processing path from twenty-four in FIG. 31 to eight in FIG. 32 according to some examples.

In some examples, the parameters for the adaptive polyphase upsampling filter are determined based on a super-resolution spatial resampling scale factor, e.g., as discussed in reference to FIG. 30(*b*). Table 3300 in FIG. 33 shows an example of the corresponding parameters (e.g., output phases, stride, and pixel shuffle scale factor for each super-resolution spatial resampling scale factor and processing path) for different super-resolution spatial resampling scale factors. In other examples, different super-resolution spatial resampling scale factors may be used for the horizontal and vertical dimension.

FIG. 33 illustrates a table 3300 of the number of output phases, stride, and pixel shuffle scale factors for each super-resolution spatial resampling scale factor for both a high resolution processing path and a low resolution processing path according to some examples, e.g., where g (scale) ^½ is the square-root of g (scale).

In some examples, a super-resolution spatial resampling scale factor may be achieved by first performing a polyphase upsampling to a higher resolution and then downsampling the results to achieve the desired scale factor. In one example, this is achieved by expressing the upsampling factor as a ratio of two integer values, e.g., where the numerator corresponds to the upsampling part, and the denominator correspond to the downsampling part. For example, an upsampling scale factor of 4.5 can be expressed as 9/2. So, in certain examples the network can upsample by a factor of 9, and then downsample by a factor of 2. In some examples, the network would generate 81 (e.g., 9*9) output channels for each input channel and use a stride of 2 for the convolutional layer when generating the output tensor with 81 channels. The values in the output tensor can then be rearranged using PixelShuffle (9).

In other examples, the adaptive polyphase upsampling approach may use more than one channel as input. For example, it may use all the channels of the input tensor when generating a phase. This has the benefit of improved compression performance in some examples.

In another example, the adaptive polyphase upsampling approach uses different scale factors for the horizontal and vertical directions. In one example, this corresponds to upsampling by a "uw" width scale factor in a first dimension and a "uh" height scale factor in a second dimension. In an example, the adaptive polyphase upsampling filter generate uh×uw phases (output channels for each input channel) and a pixel shuffle (uh, uw) operation.

In another example, if the uh scale factor can be expressed as a ratio of two integer values, then the resampling in this first dimension may be achieved by performing a polyphase upsampling to a higher resolution and then downsampling the result to achieve the desired scale factor. In a similar example, if the uw scale factor can be expressed as a ratio of two integer values, then the resampling for this second dimension may be achieved by performing a polyphase upsampling to a higher resolution and then downsampling the results to achieve the desired scale factor. In another example, if both the uh scale factor and the uw scale factor can be expressed as a ratio of two integer values, then the resampling may be achieved by performing a polyphase upsampling to a higher resolution with a dimension of the numerator of the uh scale factor multiplied by the numerator of the uw scale factor followed by a pixel shuffle (uh denominator, uw denominator) operation.

Location of Method

The examples herein can be located where desired, e.g., either within the prediction loop of a video codec or outside the prediction loop as a post-processor. In one example, one or more examples herein are included as a loop filter of an encoder and/or decoder.

Figure 34:
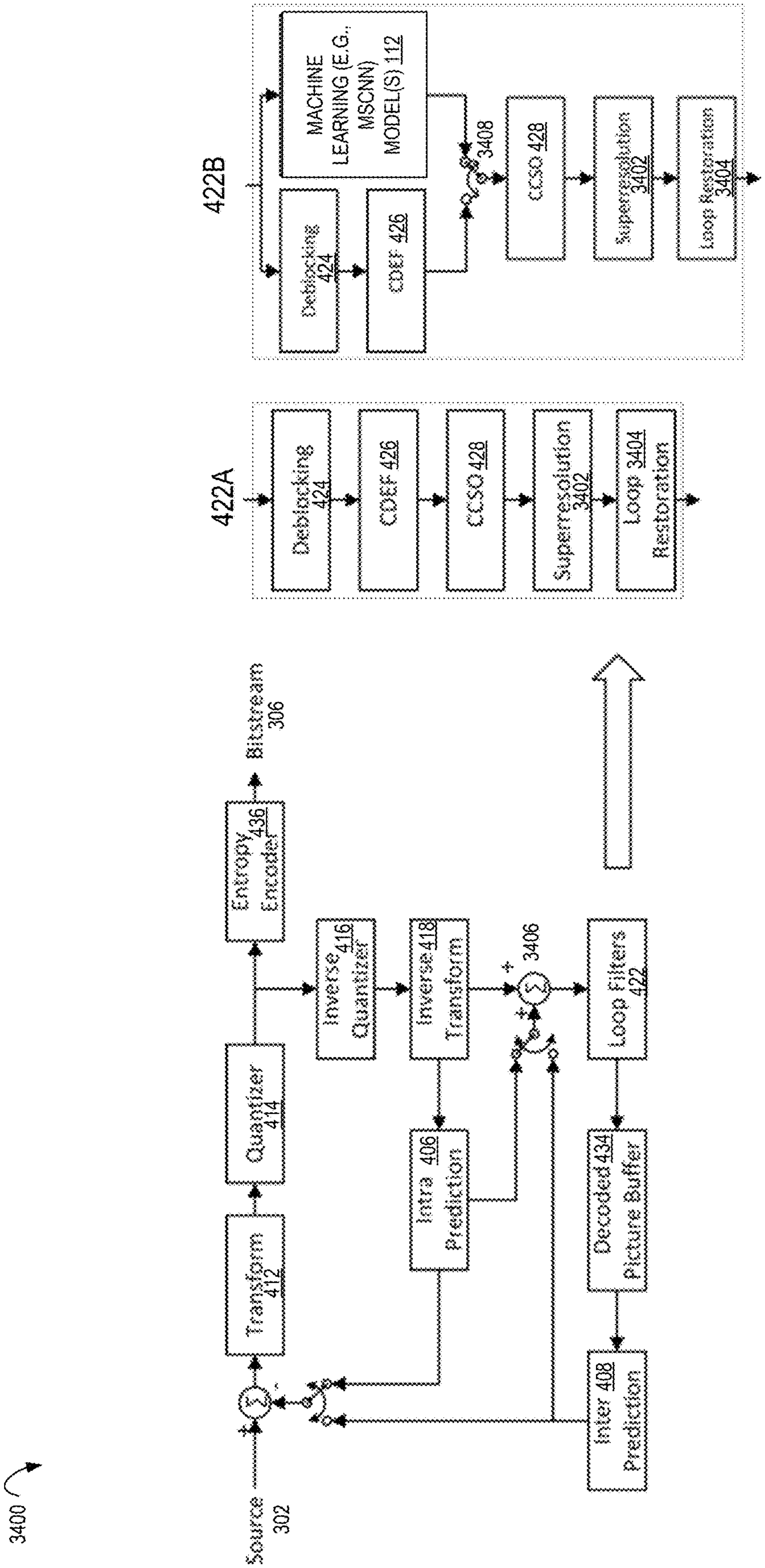
FIG. 34 is a diagram illustrating a video coding that includes a machine learning (e.g., prediction) model (e.g., multi-scale convolutional neural network (MSCNN)) and is switchable between the output of the machine learning model and the output of a constrained directional enhancement filter (CDEF) according to some examples.

FIG. 34 is a diagram illustrating a video coding 3400 that includes a machine learning (e.g., prediction) model 112 (e.g., multi-scale convolutional neural network (MSCNN)) and is switchable between the output of the machine learning model and the output of a constrained directional enhancement filter (CDEF) 426 according to some examples.

In comparison to FIG. 4, video coding 3400 includes a first instance 422A of loop filters 422 and a second instance 422B of loop filters 422. In certain examples, ML model(s) 112 are included to process the output from summation 3406, e.g., to produce a better quality of pixel values (e.g., as an image or frame of a video). FIG. 34 (codec switchable between a proposed method and/or ML model herein and deblocking/constrained directional enhancement filter (CDEF)) shows an example, where the ML model 112 (e.g., MSCNN) takes the output of the inverse transform operation 418 (e.g., the image and/or residual as discussed herein). As shown in loop filter 422B, a deblocking operation 424 also takes the output of the inverse transform operation 418 (e.g., the image and/or residual as discussed herein) as input, and the deblocking operation 424 output is provided as input to a constrained directional enhancement filter (CDEF) 426. In certain examples, (e.g., only) one of the outputs of the ML model 112 or a CDEF is selected (e.g., by switch 3408) and provided as input to cross-component sample offset (CCSO) 428, super-resolution 3402, and loop restoration 3404 operations. In certain examples, the one of the outputs of the ML model 112 or a CDEF is selected (e.g., via switch 3408) based on ML model performance, for example, via generating both of the outputs of the ML model 112 and the CDEF and selecting the one that is more efficient for coding (e.g., lowest cost metric). In one or another example, line buffers are shared between the ML model 112 and one or both of the deblocking and CDEF operations. In another one or another example, the selection is determined by information received in a bit-stream.

Figure 35:
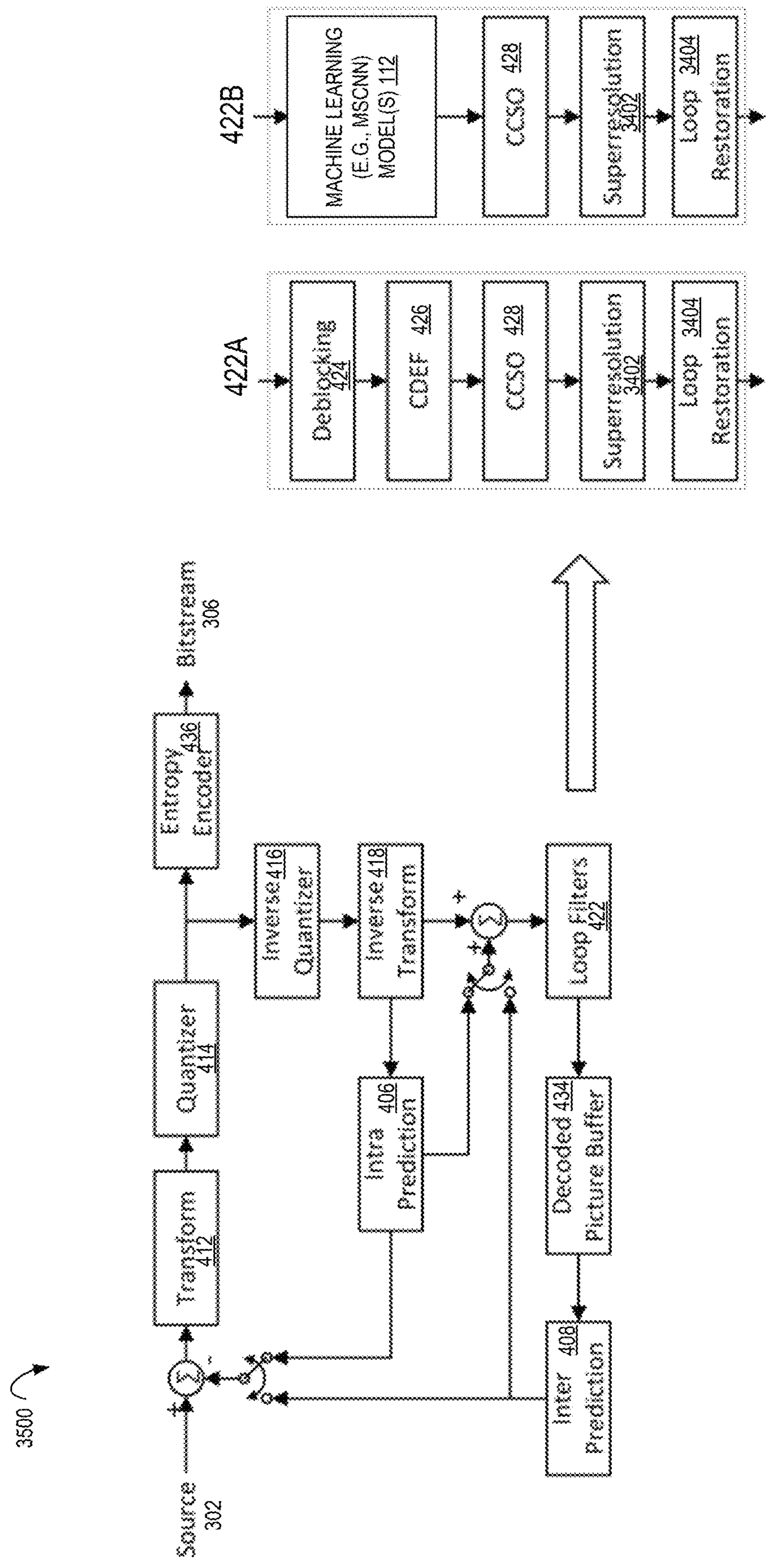
FIG. 35 is a diagram illustrating a video coding that includes a machine learning (e.g., prediction) model (e.g., multi-scale convolutional neural network (MSCNN)) that replaces a deblocking and constrained directional enhancement filter (CDEF) with a machine learning (e.g., prediction) model (e.g., multi-scale convolutional neural network (MSCNN)) according to some examples.

FIG. 35 is a diagram illustrating a video coding 3500 that includes a machine learning (e.g., prediction) model 112 (e.g., multi-scale convolutional neural network (MSCNN)) that replaces a deblocking and constrained directional enhancement filter (CDEF) 426 with a machine learning (e.g., prediction) model (e.g., multi-scale convolutional neural network (MSCNN)) according to some examples. FIG. 35 (proposed method herein replaces deblocking and constrained directional enhancement filter (CDEF)) shows another example where the ML model 112 is located within the prediction loop (e.g., loop filters 422) of a video codec. In the example, the ML model replaces the deblocking and constrained directional enhancement filter (CDEF) 426.

Figure 36:
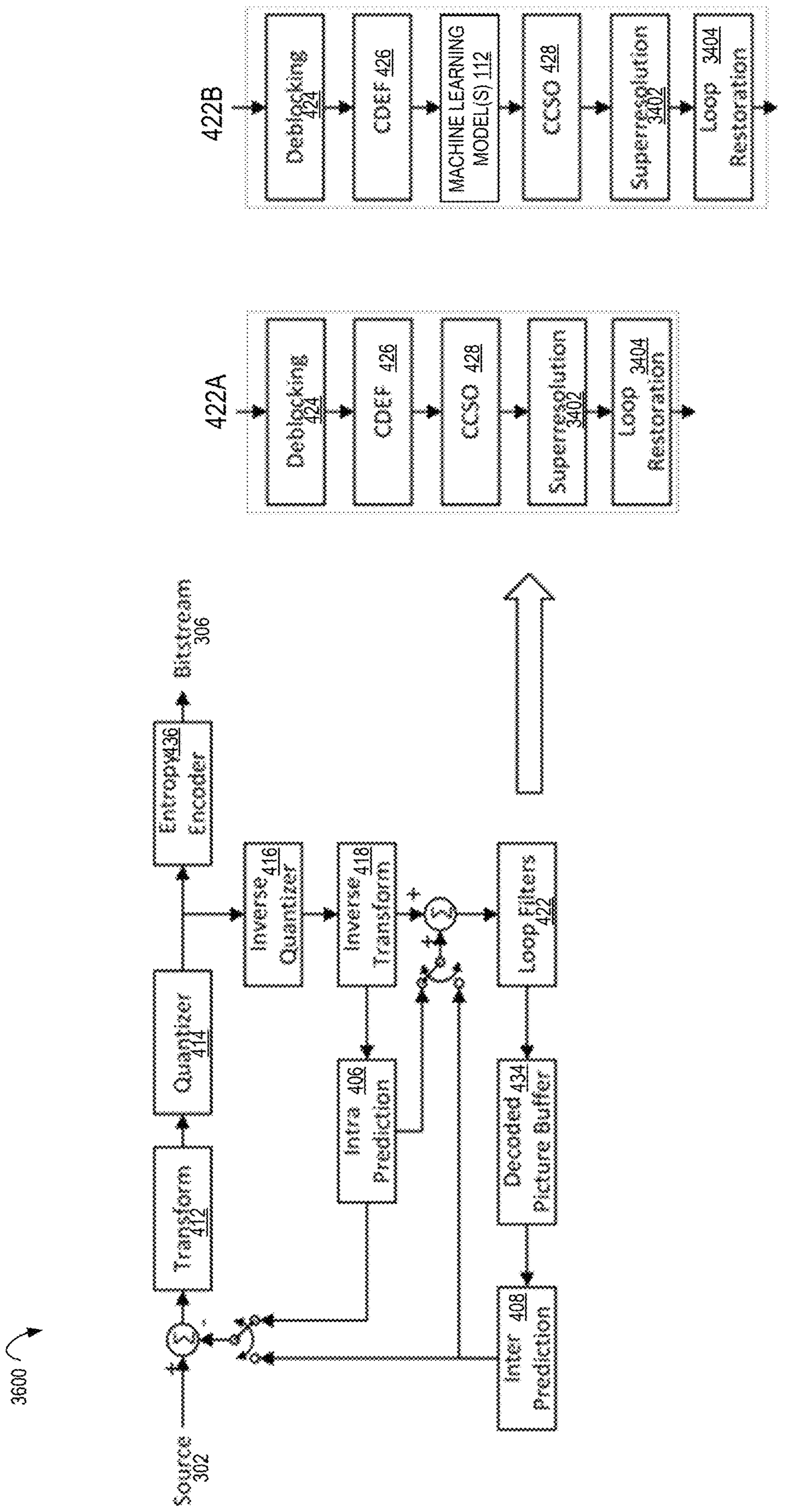
FIG. 36 is a diagram illustrating a video coding that includes a machine learning (e.g., prediction) model (e.g., multi-scale convolutional neural network (MSCNN)) where the machine learning model takes, as input, the output of a constrained directional enhancement filter (CDEF) according to some examples.

FIG. 36 is a diagram illustrating a video coding 3600 that includes a machine learning (e.g., prediction) model (e.g., multi-scale convolutional neural network (MSCNN)) where the machine learning model takes, as input, the output of a constrained directional enhancement filter (CDEF) according to some examples. FIG. 36 shows yet another example, where the ML model 112 takes the output of the CDEF operation 426 as input, e.g., and the ML model 112 sends its output to cross-component sample offset (CCSO) 428.

Different configurations of the proposed methods and/or ML models herein (e.g., and other loop operations) have benefits. In one example, a proposed method and/or ML model replaces a super-resolution operation. In another example, the codec switches between a proposed method (and/or ML model) and a super-resolution operation. In another example, a proposed method and/or ML model replaces a loop restoration operation. While in another example, a codec switches between a proposed method and/or ML model and a loop restoration operation.

In yet another example, the output of a proposed method and/or ML model is provided to a deblocking operation, for example, where the deblocking determines frame location(s) where discontinuities may appear, e.g., at the boundaries of a block. This has the benefit of attenuating block boundaries.

Figure 37:
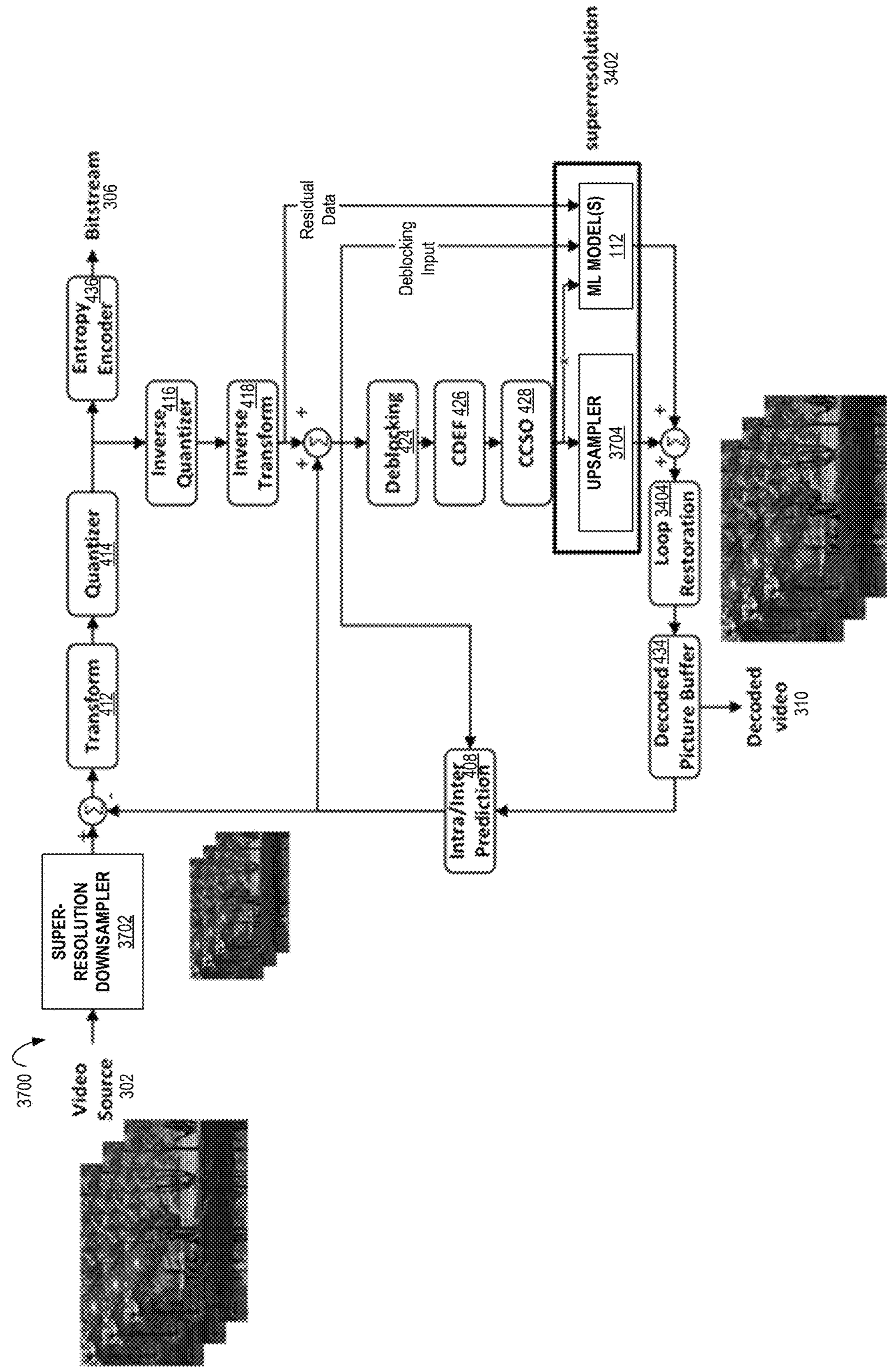
FIG. 37 is a diagram illustrating a video coding that includes (i) an upsampling operation and (ii) a machine learning (e.g., prediction) model (e.g., multi-scale convolutional neural network (MSCNN)) replacing a super-resolution operation according to some examples.

One example of replacing a super-resolution operation of a video coding is shown in FIG. 37. As shown in FIG. 37, the replaced super-resolution operation consists of an upsampling operation (e.g., in the pixel domain) and an ML model (e.g., MSCNN). In some examples, the upsampling operation is a linear upsampling operation. In a specific example, the linear upsampling operation is a Lanczos-5 filter. In another specific example, the linear upsampling operation is a 10-tap separable filter.

FIG. 37 is a diagram illustrating a video coding 3700 that includes (i) an upsampling operation and (ii) a machine learning (e.g., prediction) model (e.g., multi-scale convolutional neural network (MSCNN)) replacing a super-resolution operation (e.g., a normative linear upscaling followed by a loop restoration to restore high frequencies) according to some examples. In certain examples, a codec (e.g., encoder) supports super-resolution mode, for example, a coding mode that allows a frame to be coded at lower spatial resolution and then super-resolved normatively in-loop to full (e.g., target) resolution, e.g., before updating a reference buffer(s) with that full resolution frame. In FIG. 37, super-resolution downsampler 3702 downsamples the video source 302 (e.g., frame), e.g., downsamples in the pixel domain. In certain examples, a deblocking operation 424 takes the output of the inverse transform operation 418 (e.g., the image and/or residual as discussed herein) as input, and the deblocking operation 424 output is provided as input to a constrained directional enhancement filter (CDEF) 426. In certain examples, the output of the constrained directional enhancement filter (CDEF) 426 is provided as input to cross-component sample offset (CCSO) 428, and the output of that is provided to super-resolution 3402 operations. In certain examples, the super-resolution operations 3402 includes an upsampler 3704 (e.g., in the pixel domain) and one or more machine learning models 112 (e.g., MSCNN), e.g., as shown in FIG. 31 or FIG. 32. In certain examples, the operations performed by the one or more machine learning models 112 are in the feature domain, e.g., not the pixel domain and/or not the transform domain. In certain examples, the upsampling by the adaptive polyphase upsampling filter shown in FIG. 30(*b*) is in the feature domain, e.g., not the pixel domain and/or not the transform domain. In certain examples, the feature domain is the n-dimensional space (e.g., where n is a positive integer greater than 1) where the feature tensor generated by layers within the machine learning model (e.g., neural network) reside. One example is a feature domain (e.g., space) used to represent edge strength, e.g., and different ways to compute edge strength are dimensions of the feature domain (e.g., space). Another example is a feature domain (e.g., space) used to represent activity within the receptive field, e.g., and different sizes of the receptive field are dimensions of the feature domain (e.g., space). In certain examples, a feature domain includes a plurality of such subspaces. In certain examples, the feature domain itself is learned by the machine learning model, e.g., the space may not have a meaningful equivalence to analytical (or human understandable) spaces.

In certain examples, the upsampler 3704 upsamples the downscaled frame in the pixel domain generated by the inverse transform, for example, and the one or more machine learning models 112 (e.g., MSCNN), e.g., as shown in FIG. 31 or FIG. 32, are utilized to correct any issues that were determined (e.g., by the deblocking) with the upsampled frame (or upsampled block if on a block granularity). In certain examples, the one or more machine learning models 112 (e.g., MSCNN) utilize the high resolution processing path and low resolution processing path(s) shown in FIG. 31 or FIG. 32 (e.g., the adaptive polyphase upsampling filter thereof) to generate an improved version of the block (or frame) that has an issue, e.g., incorrect texture, etc. As one example, an edge or smoothed region may have an issue, and the one or more machine learning models 112 (e.g., MSCNN) are used to correct that issue.

In certain examples, (e.g., only) one of the outputs of the ML model 112 or upsampler 3704 is selected and provided as input to loop restoration 3404 operations, e.g., and the frame (or block) output therefrom is sent to the decoder picture buffer 434 (e.g., and decoded video 310 is generated based on the frame(s) in the decoder picture buffer 434).

Figure 38:
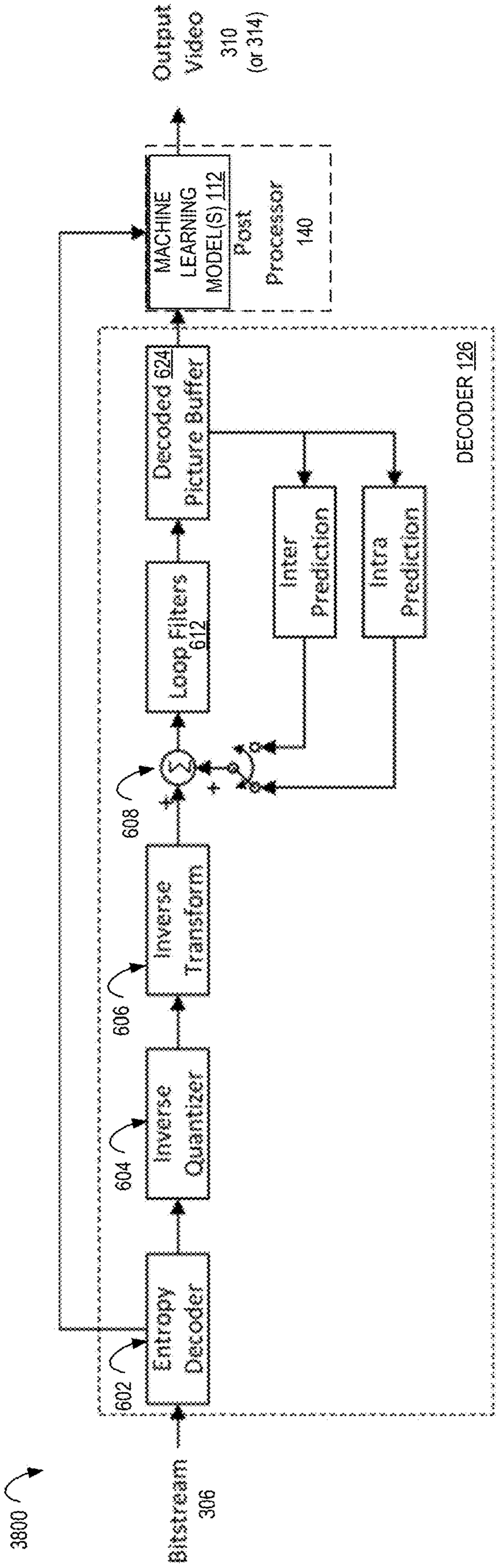
FIG. 38 is a diagram illustrating a video coding that includes a machine learning (e.g., prediction) model (e.g., multi-scale convolutional neural network (MSCNN)) implemented as a post processor according to some examples.

A proposed method and/or ML model may also be configured as a post-processor (e.g., post-processing operation). An example is shown in FIG. 38. FIG. 38 is a diagram illustrating a video coding 3800 that includes a machine learning (e.g., prediction) model 112 (e.g., multi-scale convolutional neural network (MSCNN)) implemented as a post processor 140 according to some examples. As can be seen from FIG. 38, a proposed method and/or ML model takes the output images of a video decoder 602 (e.g., from decoded picture buffer 624) as input and provides enhanced images as output 310 (or 314). In some examples, the method and/or ML model also receives information from the bit-stream and an entropy decoder 602. Note that in some examples, the information in the bit-stream does not require entropy decoding and is provided to the method directly. In certain examples, the post-processor has multiple function blocks, and the ML method is not the first block, for example, where the input to the post-processor is the output of the video decoder, this input may be modified by one or more post-processing operations prior to being input to the ML model.

Inputs

Certain examples herein have included an image and residual data as input. These examples are not meant to express a limitation on the input, and certain examples take other data in. For example, the method may depend on luma sample values, chroma sample values, dequantized inverse transform coefficients, slice type values, prediction information, chroma format information, relative location of luma and chroma sample information, luma quantization parameter(s), chroma quantization parameter(s), temporal layer values, super-resolution scale factor values, and/or other information. This data may correspond to a current processing location in an image, a previous processing location in an image, or a processing location in another image. This data may be scaled, clipped, and/or otherwise processed prior to being input to the method.

In an example, the parameters of the operations within the method may be selected based on a quantization parameter. For example, a conv2d operation includes kernel parameters and bias parameters that are used to compute the output of a convolution operation. Alternatively, a batch norm operation includes scaling parameters and offset parameters that are used to compute the output of a batch norm operation. Such parameters may be referred to as method parameters. In one example, a first set of method parameters is associated with a first range of quantization values and a second set of method parameters is associated with a second range of quantization values. In another example, the selection of method parameters is determined by both a slice type and a quantization parameter. For example, a first set of method parameters is associated with a first range of quantization values and a first slice type, a second set of method parameters is associated with a second range of quantization values and a first slice type, and a third set of method parameters is associated with a first range of quantization values and a second slice type. For example, where a slice is a region of a frame within an (e.g., AVC or HEVC) encoded video that is encoded relative to only that region as opposed to the entirety of the frame. Other examples that are associated with sets of method parameters may include, but are not limited to, prediction type values, temporal layer values, super-resolution scale factor values, and/or block level indicator values.

Signaling

A method may be controlled by information in a bit-stream. In a first example, the method is enabled or disabled by signaling a flag from an encoder, receiving a flag at a decoder, and/or receiving a flag at a post-processor.

FIG. 39 illustrates a syntax structure 3900 for signaling a flag in a sequence header according to some examples. FIG. 39 shows a syntax structure 3900 for signaling the flag in a sequence header. Without loss of generality, certain syntax and semantics from an AV1 specification are used herein, although other syntax and semantics (e.g., from other standards) may be used.

Semantics for structure 3900 include:

enable_nn_operation_seq equal to 1 specifies that a neural network filtering operation may be enabled.

enable_nn_operation_seq equal to 0 specifies that a neural network filter operation in disabled.

In some examples, enable_nn_operation_seq may be equal to 1 but a proposed method and/or ML model could subsequently be disabled on a frame and/or block basis.

Additional parameters for a proposed ML model may be indicated in a syntax structure.

FIG. 40 illustrates a syntax structure 4000 for signaling model parameters in a sequence header according to some examples. Syntax structure 4000 in FIG. 40 shows an example of including the parameters in an uncompressed_header syntax structure. In the example, nn_operation_params( ) denotes a syntax structure containing model parameters.

In certain examples, when a proposed method and/or ML model is enabled at a sequence level it may be further enabled or disabled at a block, frame, tile, or slice level. FIG. 41 illustrates a syntax structure 4100 for enabling (or disabling) a machine learning (e.g., prediction) model (e.g., multi-scale convolutional neural network (MSCNN)) according to some examples.

FIG. 41 shows an example of a nn_operation_params syntax structure 4100 that enables (or disables) a proposed method and/or ML model. Semantics for syntax structure 4100 include:

enable_nn_operation equal to 1 specifies that a proposed method and/or ML model may be enabled for the picture.

enable_nn_operation equal to 0 specifies that a proposed method and/or ML model is disabled for the picture.

A model_selector syntax structure may be used to indicate the model parameters used by the method and/or ML model. An example is shown in FIG. 42. FIG. 42 illustrates a syntax structure 4200 for selecting a set of model parameters according to some examples. Although the number of models shown is four in certain FIGS., one of ordinary skill in the art should understand that a single model or any plurality of models may be utilized.

In this example, multiple sets of model parameters are defined and the model_selector syntax structure 4200 indicates which set of the multiple sets of model parameters to use. For example, when four candidate sets of model parameters are available, a two-bit index identifying the selected set of model parameters may be signaled and/or received as shown in FIG. 42.

Semantics for syntax structure 4200 include:

model_idc equal to 0 indicates a first set of model parameters is selected for the frame. model_idc equal to 1 indicates a second set of model parameters is selected for the frame. model_idc equal to 2 indicates a third set of model parameters is selected for the frame. model_idc equal to 3 indicates a fourth set of model parameters is selected for the frame.

A second example of the model_selector syntax structure is shown in FIG. 43. FIG. 43 illustrates a syntax structure 4300 for selecting one or more sets of model parameters according to some examples.

In this example, an ordered list of the model parameter sets is constructed, and one or more model sets are indicated from the list using a bit mask. Each bit in the mask corresponds to a set of model parameters at a position in the ordered list. In some examples, the number of sets to be selected is pre-defined. In these cases, once a requisite number of model sets have been selected, the remainder of the mask need not be indicated. FIG. 43 shows a syntax structure for indicating three sets of model parameters from 12 candidate sets by using a truncated mask. Note that although there are 12 models the mask length never exceeds 11 bits, as the last bit can be inferred based on how many selections have been previously indicated.

Semantics for syntax structure 4300 include:

ModelSelected[model_idx] equal to 1 indicates that the model_idx set of model parameters is selected.

ModelSelected[model_idx] equal to 0 indicates that the model_idx set of model parameters is not selected.

In additional examples, the correspondence between a list position and a set of model parameters is pre-defined. In other examples, the correspondence between a list position and a set of model parameters may be derived. In one example, frequently used sets of model parameters are assigned to earlier positions in the list.

An example of a nn_operation_scale syntax structure is shown in in FIG. 44. FIG. 44 illustrates a syntax structure 4400 for indicating scale parameters according to some examples. In the example, a value for NNScale is indicated and takes one of three values (e.g., 1.00, 0.75, 0.50). This value is used to scale the output of a proposed method and/or ML model by multiplying the output of the method and/or ML model by the NNScale value.

Semantics for syntax structure 4400 include:

nn_operation_scale_indicator0 equal to one specifies that a nn_operation_scale_indicator1 is present in the bitstream.

nn_operation_scale_indicator1 equal to one specifies that NNScale parameter is equal to 0.75.

nn_operation_scale_indicator1 equal to zero specifies that NNScale parameter is equal to 0.50.

In other examples, different values for NNScale are indicated. For example, the nn_operation_scale syntax structure in Table 4500 in FIG. 45 demonstrates a different syntax of indicating one of three values (e.g., 1.00, 0.75, or 0.50).

FIG. 45 illustrates another syntax structure for indicating scale parameters (e.g., values for NNScale) according to some examples.

Semantics for Table 4500 include:

nn_operation_scale_indicator0 equal to 1 specifies that the scale factor is a first value.

nn_operation_scale_indicator0 equal to 0 specifies that the scale factor is one of a second or third value.

nn_operation_scale_indicator1 equal to 1 specifies that the scale factor is a second value.

nn_operation_scale_indicator1 equal to 0 specifies that the scale factor is a third value.

In other examples, different values for NNScale are indicated. For example, the nn_operation_scale syntax structure in Table 4500 demonstrates a different syntax of indicating one of N values.

FIG. 46 illustrates yet another syntax structure for indicating scale parameters (e.g., values for NNScale) according to some examples.

Semantics for Table 4600 include:

nn_operation_scale_indicator equal to 1 specifies that an index_value should be incremented by 1.

nn_operation_scale_indicator equal to 0 specifies that an index_value should not be incremented by 1.

ValueTable is a list of scale factors.

Additionally, while the examples consider the indication of values on a frame basis, other granularities may be implemented. For example, the nn_operation_scale syntax structure may be indicated at the block, super-block, tile, slice, or sequence level. In some examples, the scale factor values are responsive to the granularity used to indicate the nn_operation_scale syntax structure.

Scaling values may be indicated for different channels in the method. For example, a scaling value could be applied to each channel prior to a channel concatenation operation. Alternatively, a scaling factor could be applied to each channel prior to a fuse layer operation. An example syntax structure for indicating the scaling factors is shown in FIG. 47. FIG. 47 illustrates a syntax structure 4700 for indicating scale parameters for four output channels of a machine learning (e.g., prediction) model (e.g., multi-scale convolutional neural network (MSCNN)) according to some examples. In FIG. 47, a model has four output channels. The corresponding four scaling values are stored in array NNScale[ ], and each channel c is modified by the NNScale [c] value.

Examples of the nn_operation_scale syntax structure have shown the indication of one or more scaling values. However, it should be understood that other values could be indicated. For example, a bias value could be indicated. Additionally, while the examples consider the indication of values on a frame basis, other granularities are possible. For example, the nn_operation_scale syntax structure may be indicated at the block, super-block, tile, slice, or sequence level.

As described above, a set of model parameters may be associated with a quantization parameter and a slice type value. In an example, multiple sets of model parameters are associated with a quantization parameter and a slice type value. A model selector in the bitstream then indicates which set of model parameters is to be used from the multiple sets.

FIG. 48 illustrates an example assignment 4800 between set of model parameters, quantization parameter (QP) values, and picture type according to some examples. FIG. 48 illustrates a case where four sets of model parameters are assigned to six ranges of quantization parameters (QP) and two slice type values (e.g., an intra picture value and an inter picture value). While there are a total of 48 sets of model parameters, only four are available for selection for each combination of QP and slice type value in certain examples. As a result, a 2-bit indicator (e.g., as shown in syntax structure 4200 in FIG. 42) can indicate the model to be selected. In an example assignment, for each combination of QP and slice type value, the model parameters in an adjacent higher QP range are also available for selection. As a result, each combination of QP and slice type value, e.g., except for combinations with QP's belonging to the highest QP range, would have eight models available for selection (i.e., its 4 models and the 4 models from the adjacent higher QP range). As a result, a 3-bit indicator can indicate the model to be selected for a combination of QP and slice type value, e.g., except for combinations with QP's belonging to the highest QP range. In certain examples, for the combination with QP's belonging to the highest QP range only four model parameters are available, and 2-bits suffice.

In another example, a set of model parameters available for selection is indicated in a syntax structure. In one example, the list of available models may be indicated by a count of available models followed by corresponding model identifiers. FIG. 49 illustrates a syntax structure 4900 for indicating a set of model parameters available for selection according to some examples. In certain examples, the syntax structure 4900 may be used to indicate the availability shown in FIG. 48, since certain model_identifier syntax element can be used to identify up to a threshold (e.g., 64) unique models for each QP parameters and slice type value.

Semantics for syntax structure 4900 include:

model_available_count_minus1 plus one defines the number of sets of model parameters available.

Model_identifier identifies the set of model parameters to be assigned to the index model_available_idx in the list of available models.

As described above, a proposed method and/or ML model may be enabled or disabled at a block level. FIG. 50 illustrates a syntax structure 5000 for indicating block level control according to some examples. In one example, the presence of block level control is indicated in the nn_operation_params syntax structure 5000 as shown in FIG. 50.

Semantics for syntax structure 5000 include:

nn_operation_block_control_enable equal to 0 specifies the method is not enabled or disabled on a block basis.

nn_operation_block_control_enable equal to 1 specifies the method may be enabled or disabled on a block basis.

nn_operation_block_size_idc equal to 0 indicates the method is controlled at a 16×16 block granularity.

nn_operation_block_size_idc equal to 1 indicates the method is controlled at 32×32 granularity.

nn_operation_block_size_idc equal to 2 indicates the method is controlled at 64×64 granularity.

nn_operation_block_size_idc equal to 3 indicates the method is controlled at 128×128 granularity.

FIGS. 51-52 illustrate indicating block level control 5100, 5200 according to some examples.

In these tables, an array NNOperationUnitSize[ ]={16, 32, 64, 128} is defined to map block size indicators to block sizes.

Semantics for FIG. 52 include:

ApplyNNOperationToUnit[unitRow][unitCol] equal to 1 specifies the method is applied to a block located at unitRow, unitCol in the picture.

ApplyNNOperationToUnit[unitRow][unitCol] equal to 0 specifies the method is not applied to a block located at unitRow, unitCol in the picture.

In some examples, scale values may be signaled at either a block or frame level. This is shown in Table 5300 in FIG. 53. In other examples, scale values may be signaled at a tile, slice, or other granularity.

FIG. 53 illustrates a syntax structure for indicating if scaling is at a header or block level according to some examples.

Semantics for Table 5300 include:

nn_signal_scale_at_pic_level equal to 1 specifies that scale factors for the method are not provided on a block basis.

nn_signal_scale_at_pic_level equal to 0 specifies that scale factors for the method are provided on a block basis.

When not present nn_signal_scale_at_pic_level is equal to 1.

In some examples, when scale factors for the method are provided on a block basis, the scale factors may be determined after determining if the method is enabled for the block. This is shown in Table 5400 in FIG. 54.

FIG. 54 illustrates a syntax structure for indicating block level scaling according to some examples. When block level scaling is enabled, ScaleNNOperationToUnit[unitRow][unitCol] indicates the scaling used for the block corresponding to the unitRow, unitCol index.

Other examples determine the model selection at a header, tile, slice, block, or other granularity. Table 5500 in FIG. 55 shows an example of determining the model selection at one of a header or block granularity.

FIG. 55 illustrates a syntax structure for indicating if model selection is at a header or block level according to some examples.

Semantics for Table 5500 include:

nn_signal_model_at_pic_level equal to 1 specifies that model selection for the method are not provided on a block basis.

nn_signal_scale_at_pic_level equal to 0 specifies that model selection for the method are provided on a block basis.

When not present nn_signal_scale_at_pic_level is equal to 1.

In some examples when model selection for the method is provided on a block basis, the model selection may be determined after determining if the method is enabled for the block. This is shown in Table 5600 in FIG. 56.

FIG. 56 illustrates a syntax structure for indicating block level model selection according to some examples. When block level model selection is enabled, ModelNNOperationToUnit[unitRow][unitCol] indicates the model selected for the block corresponding to unitRow, unitCol index.

Other examples determine the scaling value and model selection at a header, tile, slice, block, or other granularity. Table 5700 in FIG. 57 shows an example of determining the scaling value and model selection at one of a header or block granularity.

FIG. 57 illustrates a syntax structure for indicating if model selection and scaling are at a header or block level according to some examples.

In some examples when scale factors for the method and/or model selection for the method are provided on a block basis, the scale factors and/or model selection may be determined after determining if the method is enabled for the block. This is shown in Table 5800 in FIG. 58.

FIG. 58 illustrates a syntax structure for indicating block level scaling and/or model selection according to some examples. When block level scaling is enabled, ScaleNNOperationToUnit[unitRow][unitCol] indicates the scaling used for the block corresponding to the unitRow, unitCol index. When block level model selection is enabled, ModelNNOperationToUnit[unitRow][unitCol] indicates the model selected for the block corresponding to the unitRow, unitCol index.

Network Assembly

Certain examples consider the selection of a set of model parameters for use in a method. In certain examples, this has the benefit of improving coding efficiency since only an indicator of the set is needed and all of the model parameters do not have to be indicated directly. However, as the number of sets of model parameters increases, indicating the selected model may become burdensome. Certain examples herein use a network assembly method for signaling the selection, which has the benefit of improving coding efficiency in these cases.

In certain examples, a network assembly method selects subsets of model parameters for different operations in the method. For example, the method and/or architecture diagram shown in FIG. 9 includes two sub-models: a high-resolution processing path and a one half resolution processing path. With the network assembly method, the model parameters for the high resolution processing path are selected from a set of high resolution processing path parameters. And the model parameters for the low resolution processing path are selected from a set of low resolution processing path parameters. Without loss of generality, the selection of each sub-set may be indicated using one of the previous examples for indicating a set of model parameters.

In a second example of the network assembly method, scaling factors for the output of the sub-models are indicated. For example, again referring to FIG. 9, the model parameters for a high-resolution processing path are selected from a set of high resolution processing path parameters. And the model parameters for a low resolution processing path are selected from a set of low resolution processing path parameters. Additionally, scale factors are indicated and applied to the channels output by the two processing paths and prior to the concatenate channel operation. Or, alternatively, the scale factors are applied prior to the fuse scales operation. Without loss of generality, the selection and scale factors may be indicated using one of the previous examples.

Figure 59:
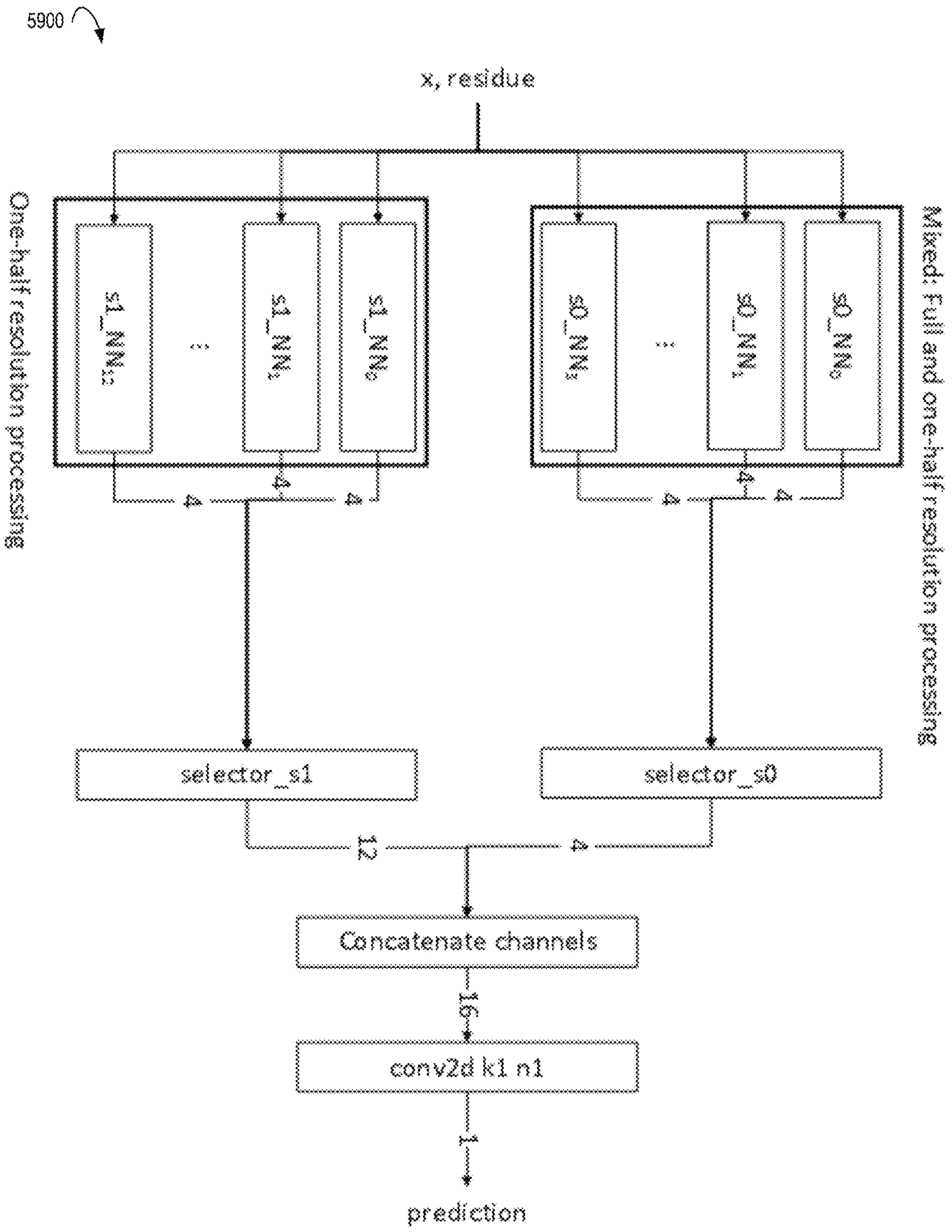
FIG. 59 illustrates a network assembly method according to some examples.

FIG. 59 illustrates a network assembly method 5900 according to some examples. In FIGS. 59, s0 and s1 denote a first and a second processing path, respectively. And NNi denotes an i-th set of model parameters, respectively. Thus, s0_NNO indicates the first set of model parameters for the first processing path. The selector_s0 and selector_s1 operations select one or more of the outputs from the sets of model parameters and provide the output to the channel concatenation operation. As can be seen in FIG. 59, selector_s0 selects the output from one of the four sets of model parameters for the first processing path; selector_s1 selects the output from three of the 12 sets of model parameters for the second processing path. These selected channels are input to a concatenate channel operation followed by a conv2d operation. In this example, the parameters of the conv2d operation are fixed. However, in other examples, the parameters may depend on the selected model parameters, indicated in a bit-stream, or selected from a set of model parameters.

In some realizations of FIG. 59, the output for sub-models that are not selected by a selector are not computed. Furthermore, the concatenate channel and conv2d operations may be replaced by other operations.

Machine Learning Model Taking Inputs of (I) a Frame and (II) Sample Values Based on a Prediction for the Frame, and Having Dual Output Channels Certain examples herein utilize (e.g., as part of a super-resolution operation) a machine learning model that takes as inputs (i) the (e.g., reconstructed) frame (e.g., x) (e.g., pixel values) and (ii) sample values (e.g., pixel values) based on a prediction for the frame, and then generates a multiple channel output, e.g., but does not directly take the residue as an input into the machine learning model. The benefit of this is a combination of improved coding efficiency, reduced complexity, and flexibility in managing complexity. In certain examples, this is performed for luma values (e.g., Y' of Y'CbCr pixel values) of a frame and chroma values of a frame separately (e.g., blue difference Cb of Y'CbCr pixel values and red difference Cr of Y'CbCr pixel values). In certain examples, the sample values are also an input to a deblocking operation (e.g., the sum of the outputs from an inverse transform and the intra/inter prediction for the image). In certain examples, (e.g., luma) sample values are utilized at two different locations within the codec as input to the machine learning network.

In certain examples, the multiple channel output of the machine learning model is scaled and (e.g., linearly) combined to form a single output used to correct the pixel (e.g., luma) values. In certain examples, the output channel scaling is signaled in the bitstream (e.g., at block-level or picture-level) with adaptive bit length and step-sizes. This allows for more content adaptivity. In certain examples, each channel of the multiple channel output is for a different dimension of correction, e.g., a correction applied to a decoded frame from a bitstream. In certain examples, a first channel for the multiple channel output is used for edge contrast (e.g., to increase (or decrease) the edge contrast for a block/frame) and/or a second channel for the multiple channel output is used to control blocking (e.g., the generation of "blocking artifacts") (e.g., to decrease (or increase) the blocking in a block/frame).

Figure 60:
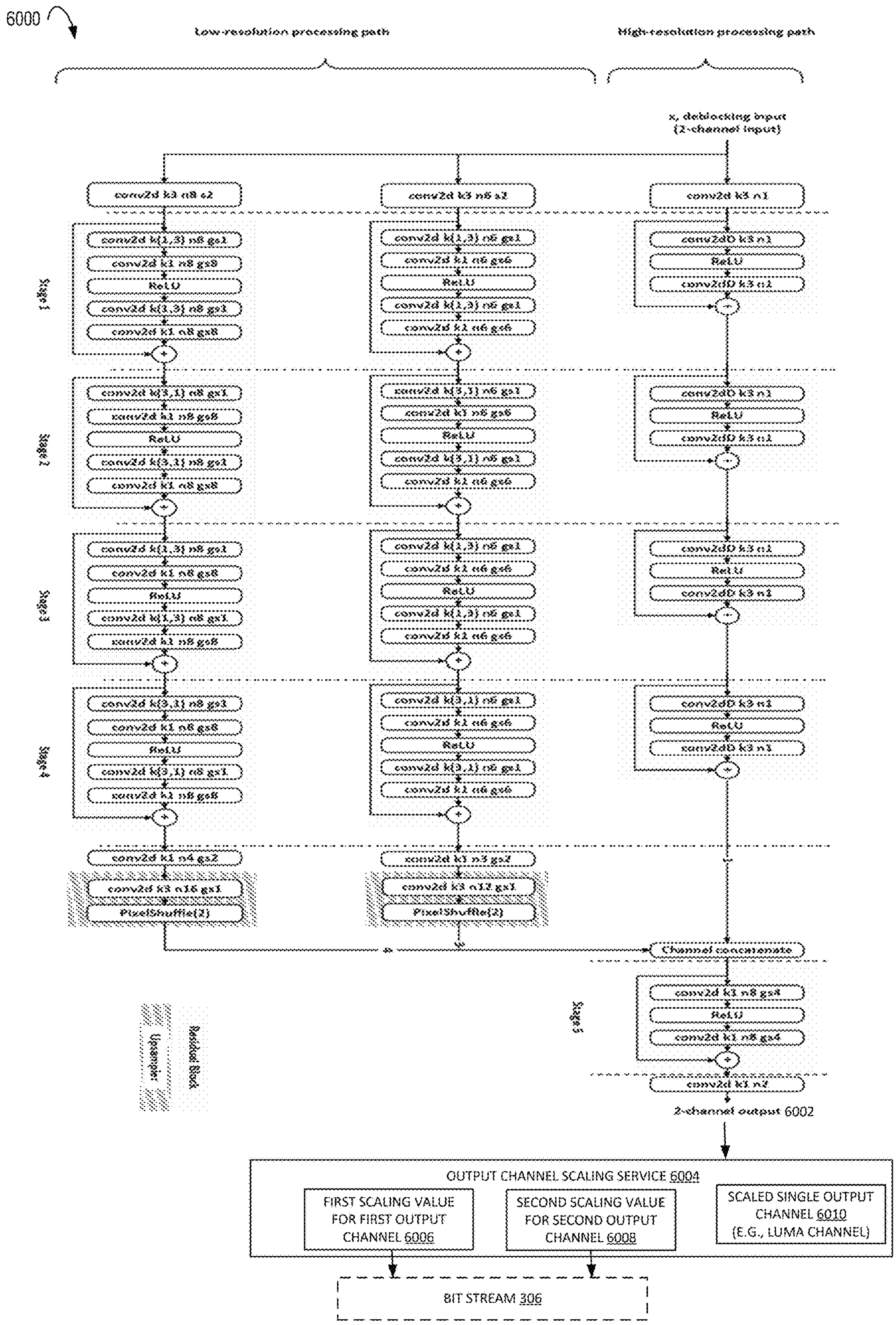
FIG. 60 illustrates full resolution and lower resolution processing paths, with the first lower resolution processing path using a group size of eight and the second lower resolution processing path using a group size of six, generating a two channel output that is sent to an output channel scaling service for generation of scaling values that generate a scaled single output channel according to some examples.

FIG. 60 illustrates full resolution and lower resolution processing paths 6000 (e.g., in parallel), with the first lower resolution processing path using a group size of eight and the second lower resolution processing path using a group size of six, generating a two channel output 6002 that is sent to an output channel scaling service 6004 for generation of scaling values (e.g., first scaling values 6006 for first output channel and second scaling values 6008 for second output channel) that generate a scaled single output channel 6010 according to some examples. Although two lower resolution (e.g., parallel) processing paths of the machine learning network are shown, it should be understood that a single lower resolution processing path may be utilized in certain examples. In comparison to other machine learning processing paths (e.g., machine learning processing paths 2700 in FIG. 27) that take as an input a frame (e.g., x in FIG. 27) and the reside (e.g., the sum of the outputs from inverse transform 418 and the intra/inter prediction 408 in FIG. 4), the example machine learning processing paths 6000 in FIG. 60 take as input the frame (e.g., the output x from the cross-component sample offset (CCSO) 428 in FIG. 62) and the deblocking input (e.g., as a two channel input) (e.g., the deblocking input being the sum of the outputs from inverse transform 418 and the intra/inter prediction 408 in FIG. 62). In certain examples, the two channel output 6002 is formed from the (e.g., eight) channel concatenation of output values from the machine learning processing paths 6000. In certain examples, the output values from the lower processing path(s) are upsampled (e.g., based on their downsampling), e.g., to the same resolution as the output of the high-resolution processing path.

Figure 63:
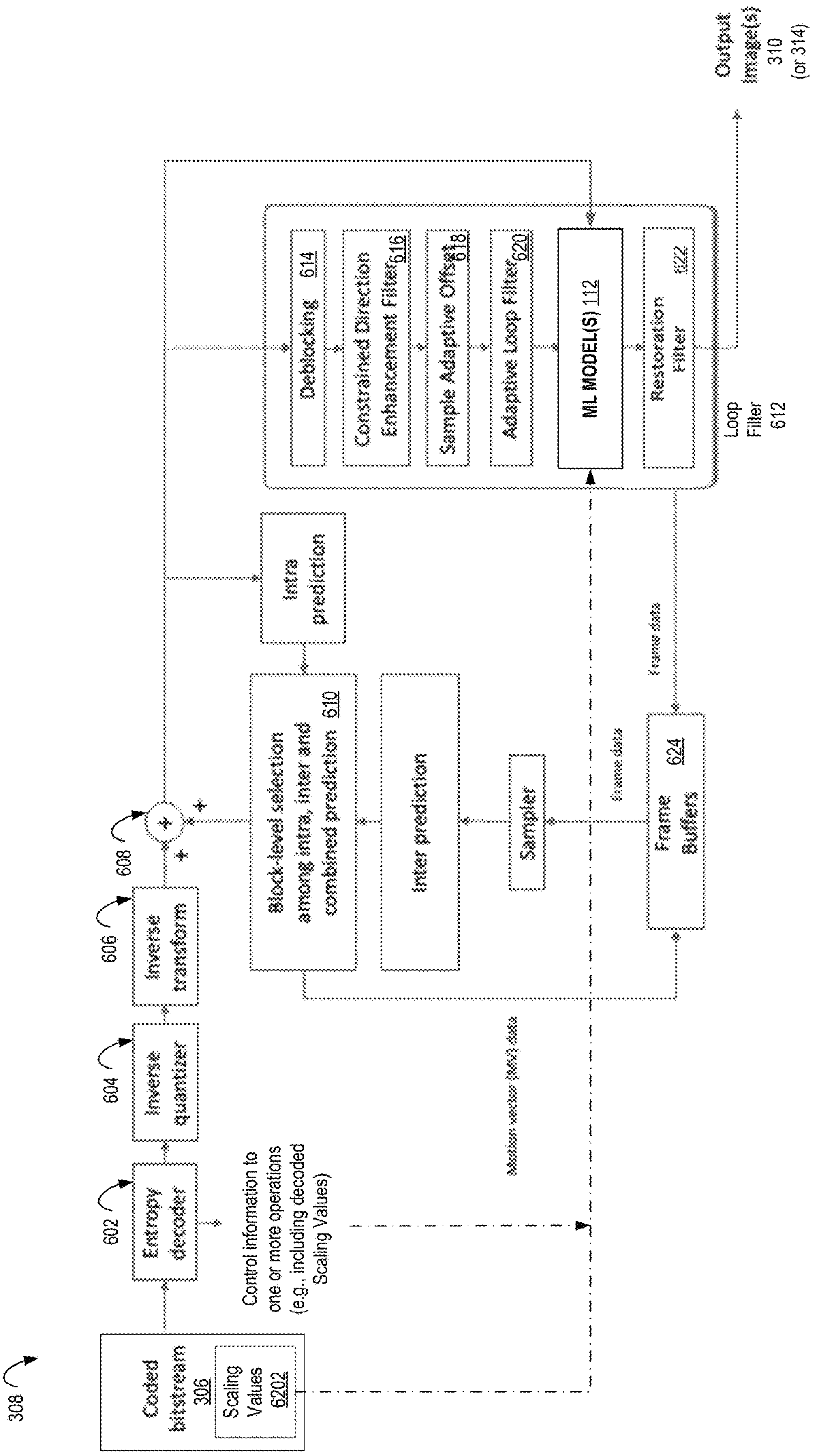
FIG. 63 is a diagram illustrating a video decoder that includes a machine learning model that takes scaling values as input according to some examples.

In certain examples, the output channel scaling service 6004 (e.g., linearly) scales the two output channels 6002 and combines the scaled outputs to provide a single output channel 6010 that is to be used as correction values for the pixel (e.g., luma) channel of the frame (e.g., x). In certain examples, the output channel scaling service 6004 determines the first scaling values 6006 for first output channel and second scaling values 6008 for second output channel that generate a scaled single output channel 6010 that causes a decoder to decode a frame as desired, e.g., such that the scaling values modify the output of the ML model instead of retraining the model itself, e.g., owing to the time and processing resources to do so. In certain examples, the scaling values (e.g., scale values) are transmitted in the bitstream 306 (e.g., via the syntax discussed herein), e.g., for use by a decoder as shown in FIG. 63.

In certain examples, the machine learning model outputs two channels which are combined (e.g., linearly) using two scale values to determine a single output channel that is used as correction for (e.g., luma) sample values. In certain examples, the two scale values are signaled either at a block-level of a plurality of blocks for each frame or frame-level. In certain examples (e.g., to save room in the bitstream 306 being output to a decoder of a viewer), the scale values are differentially coded. In certain examples, for each output channel, a centroid used for the differential coding is signaled (e.g., at the frame-level) in the bitstream.

Figure 61:
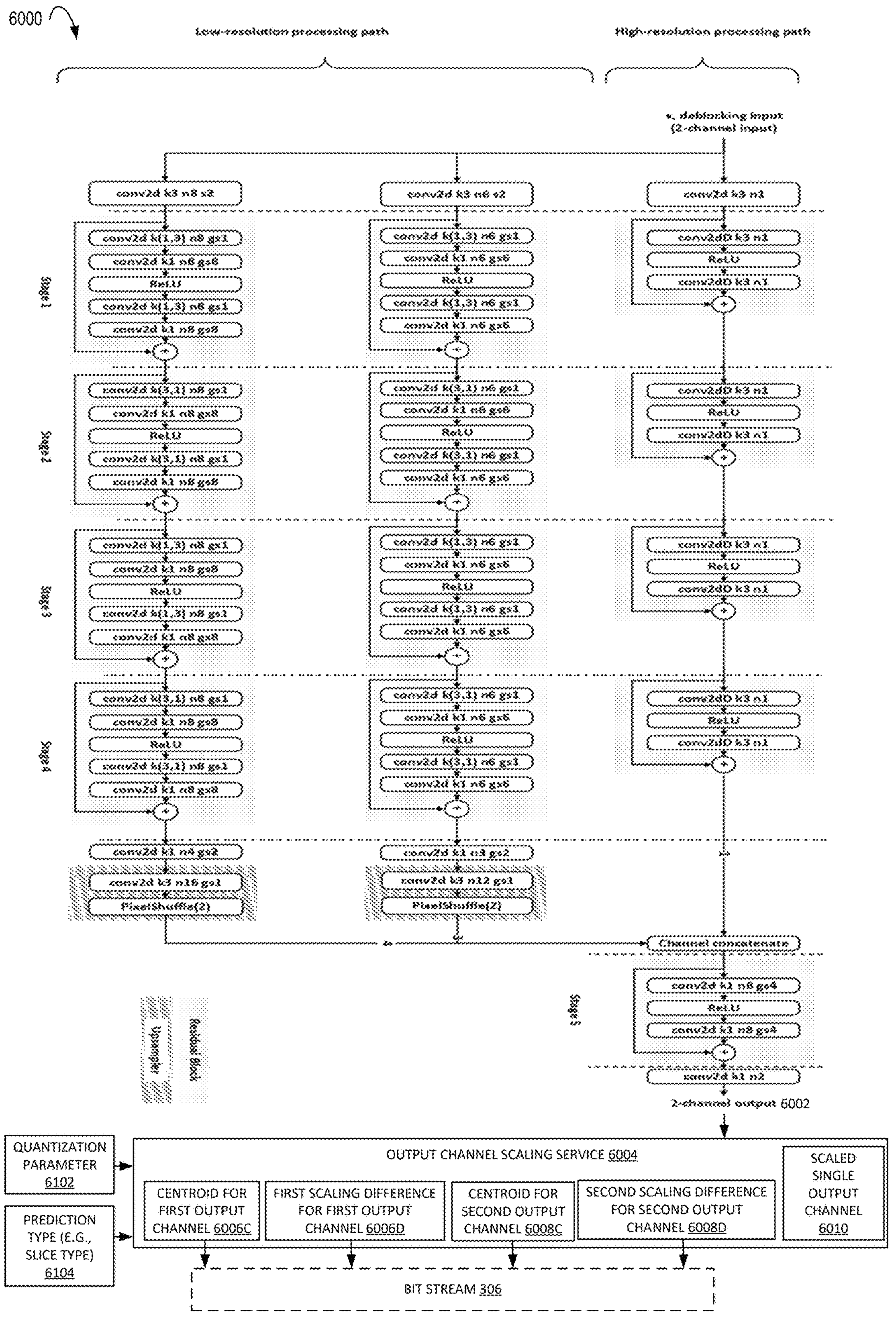
FIG. 61 illustrates the full resolution and lower resolution processing paths of FIG. 60 generating a two channel output that is sent to an output channel scaling service for generation of scaling values of respective centroids and scaling differences that generate a scaled single output channel from the two channel output according to some examples.

FIG. 61 illustrates the full resolution and lower resolution processing paths 6000 of FIG. 60 generating a two channel output 6002 that is sent to an output channel scaling service 6004 for generation of scaling values of respective centroids (e.g., first centroid 6006C for the first output channel and second centroid 6008C for the second output channel) and scaling differences (e.g., first scaling difference 6006D for the first output channel and second scaling difference 6008D for the first output channel) that generate a scaled single output channel 6010 from the two channel output 6002 according to some examples. In certain examples, the output channel scaling service 6004 also takes as input the quantization parameter (QP) 6102 and prediction type 6104 (e.g., slice type) (e.g., intra prediction or inter prediction) for the encoding.

In certain examples, the difference of scaling values (e.g., the delta (e.g., plus or minus) from the respective centroids for each output channel) is signaled either at the block level or at the picture (e.g., frame) level.

In certain examples, the scaling values (e.g., first centroid 6006C and first scaling difference 6006D for the first output channel, and second centroid 6008C and second scaling difference 6008D for the second output channel) are transmitted in the bitstream 306 (e.g., via the syntax discussed herein), e.g., for use by a decoder as shown in FIG. 63.

In certain examples, a block can take on one of the following eight sizes (e.g., dimensions of pixels), e.g., 16×16, 32×32, 64×64, 128×128, 256×256, 512×512, 1024×1024, or 2048×2048. In certain examples, the difference of scaling values is coded using fixed-length coding. In certain examples, the number of bits that are used for the fixed length coding (e.g., including zero length) is indicated at the picture-level.

In certain examples, where the range of the two scale values differ based on the utilized (e.g., slice) quantization parameter (QP) and prediction type (e.g., slice type) (e.g., intra prediction or inter prediction), the received fixed-length centroid and difference values are multiplied by respective step-sizes. For example (where x, y are the coordinates for a block):

$$\begin{aligned}LumaCorrectionOutput_{x,y} = {} & \mathrm{Output0}_{x,y} * (\mathrm{centroid}_0 * stepSizeCentroid + {} \\ & \mathrm{difference}_{0(x,y)} * stepSizeDifference_0) + \mathrm{Output1}_{x,y} * {} \\ & (\mathrm{centroid}_1 * stepSizeCentroid + \mathrm{difference}_{1(x,y)} * stepSizeDifference_1)\end{aligned}$$

In certain examples, the centroids are the average correction value for a set of blocks, frame, tile, slice, etc. For example, each block of a plurality of blocks may have a scale value of 0.8, 0.6, and 0.4 for three blocks, and instead of signaling those values, examples herein use differential coding with a single centroid of 0.6 and corresponding scaling differences of +0.2, 0, and −0.2 (e.g., for each output channel).

In certain examples, the centroids and step sizes are signaled at the frame-level, and the scaling difference is signaled at the frame or block-level. In certain examples, the use of step sizes enables representing a smaller or larger range of values using the same range of fixed length coded values.

In certain examples, the step-size for a centroid is derived using the (e.g., slice) QP and (e.g., slice) prediction type, and the step-size for the difference is selected for each channel from a set dependent on the (e.g., slice) QP and (e.g., slice) prediction type. In certain examples, the selected step-sizes are received at the picture-level for each output channel of the machine learning model (e.g., MSCNN). In certain examples, the step sizes are limited to powers-of-two. In certain examples, a lower QP means a higher quality so there will be smaller corrections and thus smaller scale values (e.g., scale factors). In certain examples intra coding has larger errors than inter coding, and thus higher scale values are used for intra coding.

In certain examples, the (e.g., luma) correction output is added to current (e.g., luma) values to obtain the refined (e.g., luma) estimate, for example:

$$LumaValues_{x,y} = LumaValues_{x,y} = LumaCorrectionOutput_{x,y}$$

In certain examples, chrominance is similarly obtained, e.g., (i) for the entire chrominance or (ii) once for each of the blue chroma difference Cb and red chroma difference Cr.

Figure 62:
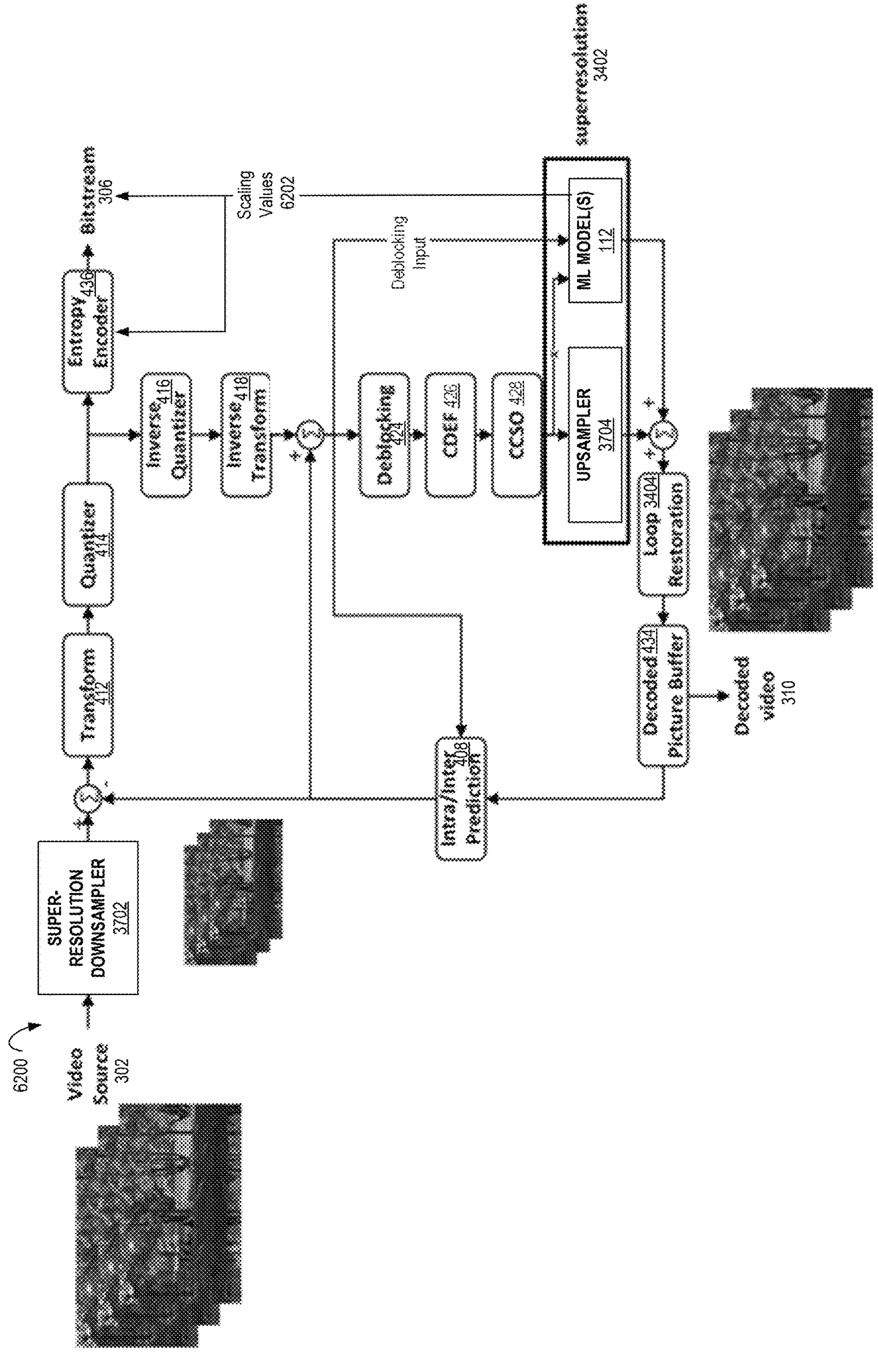
FIG. 62 is a diagram illustrating a video coding that includes a machine learning (e.g., prediction) model that takes as input the frame (e.g., x) and the input to the deblocking (e.g., the sum of the outputs from inverse transform and the intra/inter prediction) according to some examples.

FIG. 62 is a diagram illustrating a video coding 6200 that includes a machine learning (e.g., prediction) model 112 (for example, a MSCNN, e.g., as shown in FIG. 60 or 61) that takes as input the frame (e.g., x from CCSO 428) and the input to the deblocking (e.g., the sum of the outputs from inverse transform 418 and the intra/inter prediction 408) according to some examples. In certain examples, the machine learning (e.g., prediction) model 112 (for example, a MSCNN, e.g., as shown in FIG. 60 or 61) generates the scaling values 6202 (e.g., that scale the ML model's dual outputs to generate a desired correction for the block, frame, tile, slice, etc.), e.g., which are then transmitted within the bitstream 306 (e.g., transmitted directly in the form that is output from the ML model 112 (e.g., the right most path for scaling values 6202) or transmitted in an encoded form generated by entropy encoder 436 (e.g., the left most path for scaling values 6202)). In certain examples, the ML model 112 is implemented as part of super-resolution operations 3402, e.g., as discussed in reference to FIG. 37.

FIG. 63 is a diagram illustrating a video decoder 308 that includes a machine learning (e.g., prediction) model 112 (for example, a MSCNN, e.g., as shown in FIG. 60 or 61) that takes scaling values 6202 as input according to some examples. In certain examples, the machine learning model 112 generates an output (e.g., a multiple channel output) and modifies that output based on the scaling values 6202 (e.g., uses the scaling values 6202 to generate a scaled single output channel 6010 that is used to modify the output). In certain examples, the scaling values 6202 are received in the form that is input into the ML model 112 (e.g., the left most path for scaling values 6202) or received in an encoded form (e.g., within the coded bitstream 306) that is decoded by entropy decoder 602 (e.g., the right most path for scaling values 6202). In certain examples, the modified output is then used (e.g., after going through restoration filter 622) as output image 310 (or 314). In certain examples, the output of the machine learning model 112 is based on the input of (i) a reconstructed and filtered frame (e.g., output from the adaptive loop filter 620) and (ii) the input also sent to deblocking 614 (e.g., the sum of the outputs from inverse transform 606 and the intra/inter prediction 610)).

Merging

Certain syntax elements are modified to allow the signaling of the scaling values, e.g., at a block level or frame level of granularity. To reduce signaling cost (e.g., the number of bits used in the bitstream), certain examples herein allow for merging information from (e.g., left or top) neighboring portions of a frame (e.g., neighboring blocks). In certain examples, when merging is used, the merged block copies whether the machine learning model (e.g., MSCNN) is applied and, if applied, the difference values used to compute the two scale values from neighboring blocks. FIGS. 64-66 show example signaling used for this approach. Certain syntax elements indicate a merge that reuses one or more scaling values from an adjacent block or blocks.

In certain examples, the number in the parenthesis after f indicates the number of bits used in that example field, e.g., f (2) is a two-bit wide field.

FIG. 64 illustrates a syntax structure 6400 for indicating scaled centroids (e.g., nn_scale_centroid0 and nn_scale_centroid1) (e.g., for each channel that is output from a machine learning model), the scaling differences (e.g., nn_scale_diff_bits_idc0 and nn_scale_diff_bits_idc1), if scaling is indicated at a header or block level (e.g., nn_operation_block_control_enable), the step sizes used to derive the scaling values (e.g., nn_scale_diff_step_size_idc0 and nn_scale_diff_step_size_idc1), the block size (e.g., nn_operation_block_size_idc), and if merging is enabled (e.g., nn_pic_merge_enable) according to some examples, e.g., where "idc" is an indicator (e.g., index).

FIG. 65 illustrates a syntax structure 6500 for signaling splits at a block level (for example, where a slice does not align with a block boundary, e.g., a super block) according to some examples. In certain examples, the use of sub-blocks allows different corrections (e.g., different scale values) for those sub-blocks.

FIG. 66 illustrates a syntax structure 6600 for signaling quadrant (quad) splits (e.g., nn_quad_split) at a block level according to some examples.

FIG. 67 illustrates a syntax structure 6700 for signaling vertical or horizontal splits (e.g., nn_vert_split) at a block level according to some examples.

FIG. 68 illustrates a first part of syntax structure 6800A for signaling merge (e.g., nn_merge_enable) and merge direction (e.g., nn_merge_direction) (e.g., which adjacent frame are the scale values copied from) for scale values according to some examples.

FIG. 69 illustrates a second part of syntax structure 6800B for signaling block level enable and difference for scale values according to some examples.

In certain examples, single syntax structure 6800A-B is cumulatively used to signal merge, block-level enable, and differences for scale values.

FIG. 70 illustrates a syntax structure 7000 for signaling picture level scale values according to some examples.

For "merge", in one example an array NNOperationUnitSize[ ]={16, 32, 64, 128, 256, 512, 1024, 2048} is defined to map block size indicators to block sizes.

In certain examples, the following functions and variables are used in the syntaxes in FIGS. 64-70.

```
int scale_diff_bits[ ]={0,1,2,3};

double scale_diff_step_sizes_set_intra[ ]={1.0/
    1024.0, 1.0/512.0, 1.0/256.0, 1.0/128.0, 1.0/
    64.0, 1.0/32.0, 1.0/16.0, 1.0/8.0, 1.0/4.0, 1.0/2.0,
    1.0, 2.0, 4.0, 8.0};

double centroid_step_size_set_intra[ ]={1.0/128.0,
    1/64.0, 1/32.0, 1.0/16.0, 1.0/8.0, 1.0/4.0};

double scale_diff_step_sizes_set_inter[ ]={1.0/
    8192.0, 1.0/4096.0, 1.0/2048.0, 1.0/1024.0, 1.0/
    512.0, 1.0/256.0, 1.0/128.0, 1.0/64.0, 1.0/32.0,
    1.0/16.0, 1.0/8.0, 1.0/4.0, 1.0/2.0, 1.0};

double centroid_step_size_set_inter[ ]={1.0/1024.0,
    1.0/512.0, 1.0/256.0, 1.0/128.0, 1/64.0, 1.0/
    32.0};
```

variable is_intra indicates if slice is intra or not.

In certain examples, the centroid step-size and the array of valid step-sizes used for signaling difference (with respect to a corresponding centroid) values for scales is derived using the (e.g., slice) QP, bit depth, and (e.g., slice) prediction type as follows (e.g., where qindex is the QP):

```
DeriveCentroidStepSizes(base qp, bit depth, is_intra) {
   const int qindex_adjust = base qp − 24 * (bit depth − 8);
   if (is_intra) { // intra
   if (qindex_adjust <= 99) {
   diff_step_size_array = {scale_diff_step_sizes_set_intra[0], scale_diff_step_sizes_set_intra
[1],
... , scale_diff_step_sizes_set_intra[7]};
     stepSizeCentroid = centroid_step_size_set_intra[0];
   }
```

-continued

```
else if (qindex_adjust <= 124) {
        diff_step_size_array = { scale_diff_step_sizes_set_intra[1],
        scale_diff_step_sizes_set_intra[2], ... , scale_diff_step_sizes_set_intra[8]};
    stepSizeCentroid = centroid_step_size_set_intra[1];
    }
    else if (qindex_adjust <= 149) {
        diff_step_size_array = { scale_diff_step_sizes_set_intra[2],
        scale_diff_step_sizes_set_intra[3], ... , scale_diff_step_sizes_set_intra[9]};
      stepSizeCentroid = centroid_step_size_set_intra[2];
    }
    else if (qindex_adjust <= 174) {
        diff_step_size_array = { scale_diff_step_sizes_set_intra[3],
scale_diff_step_sizes_set_intra[5], ... , scale_diff_step_sizes_set_intra[10]};
        stepSizeCentroid = centroid_step_size_set_intra[3];
    }
    else if (qindex_adjust <= 199) {
        diff_step_size_array = { scale_diff_step_sizes_set_intra[4],
        scale_diff_step_sizes_set_intra[5], ... , scale_diff_step_sizes_set_intra[11]};
        stepSizeCentroid = centroid_step_size_set_intra[4];
    }
else {
      diff_step_size_array = { scale_diff_step_sizes_set_intra[5],
scale_diff_step_sizes_set_intra[6], ... , scale_diff_step_sizes_set_intra[12]};
      stepSizeCentroid = centroid_step_size_set_intra[5];
    }
  }
  else { // inter
    if (qindex_adjust <= 110) {
      diff_step_size_array = { scale_diff_step_sizes_set_inter[0],
      scale_diff_step_sizes_set_inter[1], ... , scale_diff_step_sizes_set_inter[7]};
      centroid_step_size = centroid_step_size_set_inter[0];
    }
    else if (qindex_adjust <= 135) {
      diff_step_size_array = { scale_diff_step_sizes_set_inter[1],
scale_diff_step_sizes_set_inter[2], ... , scale_diff_step_sizes_set_inter[8]};
      stepSizeCentroid = centroid_step_size_set_inter[1];
    }
    else if (qindex_adjust <= 160) {
      diff_step_size_array = {scale_diff_step_sizes_set_inter[2],
      scale_diff_step_sizes_set_inter[3], ... , scale_diff_step_sizes_set_inter[9]};
      stepSizeCentroid = centroid_step_size_set_inter[2];
    }
    else if (qindex_adjust <= 185) {
      diff_step_size_array = { scale_diff_step_sizes_set_inter[3],
      scale_diff_step_sizes_set_inter[4], ... , scale_diff_step_sizes_set_inter[10]};
      stepSizeCentroid = centroid_step_size_set_inter[3];
    }
    else if (qindex_adjust <= 210) {
      diff_step_size_array = {scale_diff_step_sizes_set_inter[4],
      scale_diff_step_sizes_set_inter[5], ... , scale_diff_step_sizes_set_inter[11]};
      stepSizeCentroid = centroid_step_size_set_inter[4];
    }
    else {
      diff_step_size_array = {scale_diff_step_sizes_set_inter[5],
      scale_diff_step_sizes_set_inter[6], ... , scale_diff_step_sizes_set_inter[12]};
      stepSizeCentroid = centroid_step_size_set_inter[5];
    }
  }
}
min(x, y) = (x<y) ? x : 0
```

In certain examples: PicH represents picture height (e.g., in pixels), and PicW represents picture width (e.g., in pixels). NNBlkEnable, In certain examples, NNScaleDiffVal0, NNScaleDiffVall, MergeEnable, MergeDirection, SplitType represents arrays of size PicH x PicW. In certain examples, all entries in the array are initialized to 0, 0, 0, 0, MERGE_DIRECTION_INVALID, NN_INVALID_SPLIT respectively prior to decoding. In one example, the initialization occurs at the beginning of picture decoding.

In certain examples, functions SetNNBlkEnable, SetNNScaleDiffVal0, SetNNScaleDiffVall, SetMergeEnable, SetMergeDirection, SetSplitType correspond to the following template function (e.g., where Array corresponds to the respective arrays NNBlkEnable, NNScaleDiffVal0, NNScaleDiffVall, MergeEnable, MergeDirection, SplitType):

```
SetArray(y, x, height, width, value) {for
(cur_y=y; cur_y< (y+height); cur_y++) {for
(cur_x=x; cur_x< (x+width); cur_x++) {
Array[cur_y][cur_x]=value}
  }
}
```

In certain examples, NN_NO_SPLIT corresponds to no split. In certain examples, NN_QUAD_SPLIT corresponds to a quad split. In certain examples, NN_VERT_SPLIT corresponds to vertical split. In certain examples, NN_HORZ_SPLIT corresponds to horizontal split.

In certain examples, leftNeighborSplitTypeAvailable is true only if valid SplitType information is available at neighboring left location (y, x−1), else it is false. In certain examples, leftNeighborMergeEnableAvailable is true only if valid MergeEnable information is available at is false. In certain examples, neighboring left location (y, x−1), else it leftNeighborBlkEnableAvailable is true only if valid BlkEnable information is available at neighboring left location (y, x−1), else it is false. In certain examples, topNeighborSplitTypeAvailable is true only if valid SplitType information is available at neighboring top location (y−1, x), else it is false. In certain examples, topNeighborMergeEnableAvailable is true only if valid MergeEnable information is available at neighboring top location (y−1, x), else it is false. In certain examples, topNeighborBlkEnableAvailable is true only if valid BlkEnable information is available at neighboring top location (y−1, x), else it is false.

In certain examples, TileNum has a value 0 for the first tile (e.g., rectangular area) of the picture (e.g., frame). In certain examples, $ScaleDiffVal0_{[y][x]}$ corresponds to difference0x,y. In certain examples, $ScaleDiffVal_{1([y][x])}$ corresponds to $difference_{1\ (x,y)}$. In certain examples, $NNBlkEnable_{([y][x])}$ equal to 1 specifies the method (e.g., dual channel output and/or scaling) is applied to a block located at y, x in the picture. $NNBlkEnable_{([y][x])}$ equal to 0 specifies the method (e.g., dual channel output and/or scaling) is not applied to a block located at pixel index (y, x) in the picture.

Flow Diagrams

Figure 71:
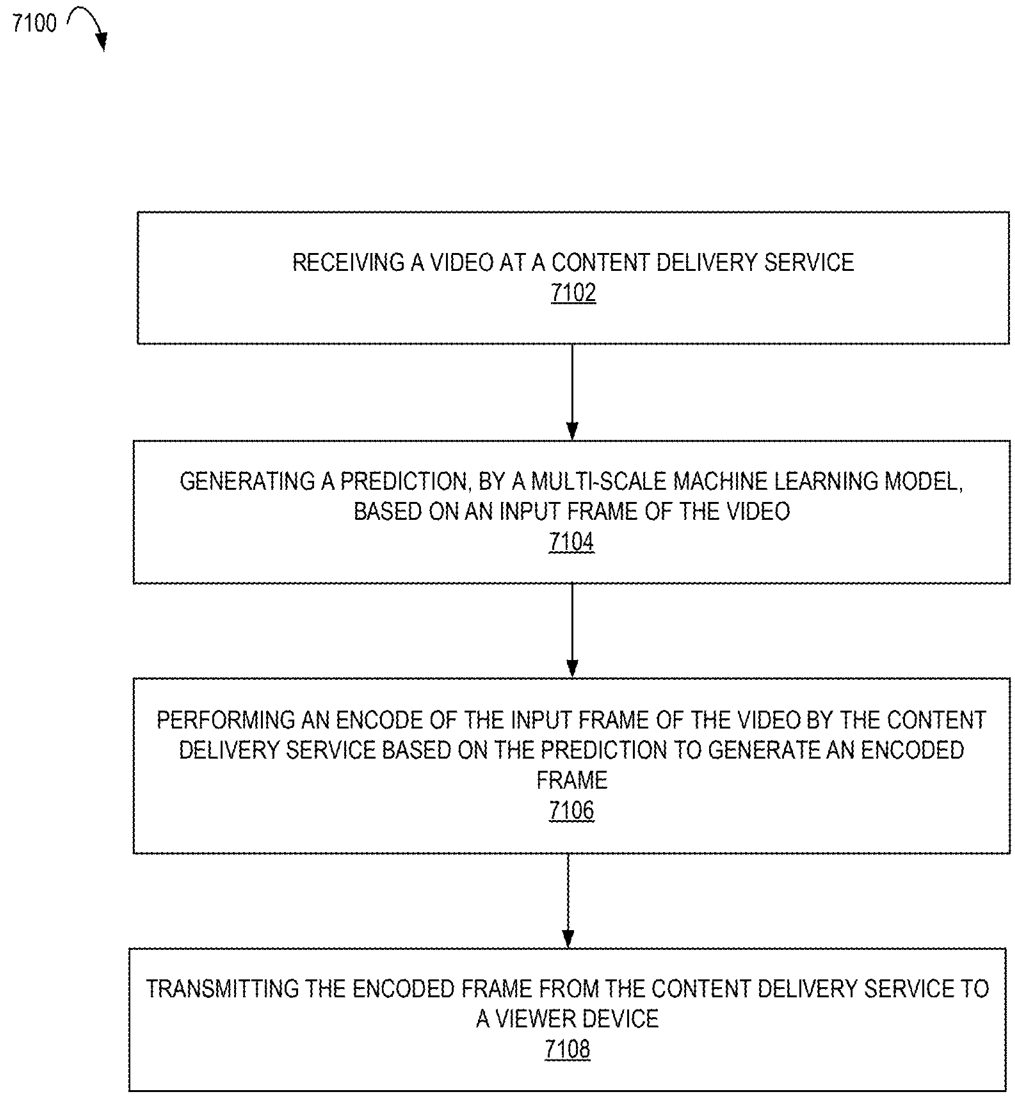
FIG. 71 is a flow diagram illustrating operations of a method of using a multi-scale machine learning model according to some examples.

FIG. 71 is a flow diagram illustrating operations 7100 of a method of using a multi-scale machine learning model according to some examples. Some or all of the operations 7100 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 7100 are performed by a device (e.g., device 7800) and/or content delivery system 102 (e.g., implemented in a provider network) of the other FIGS.

The operations 7100 include, at block 7102, receiving a video at a content delivery service. The operations 7100 include, at block 7104, generating a prediction, by a multi-scale machine learning model, based on an input frame of the video. The operations 7100 include, at block 7106, performing an encode of the input frame of the video by the content delivery service based on the prediction to generate an encoded frame. The operations 7100 include, at block 7108, transmitting the encoded frame from the content delivery service to a viewer device.

Figure 72:
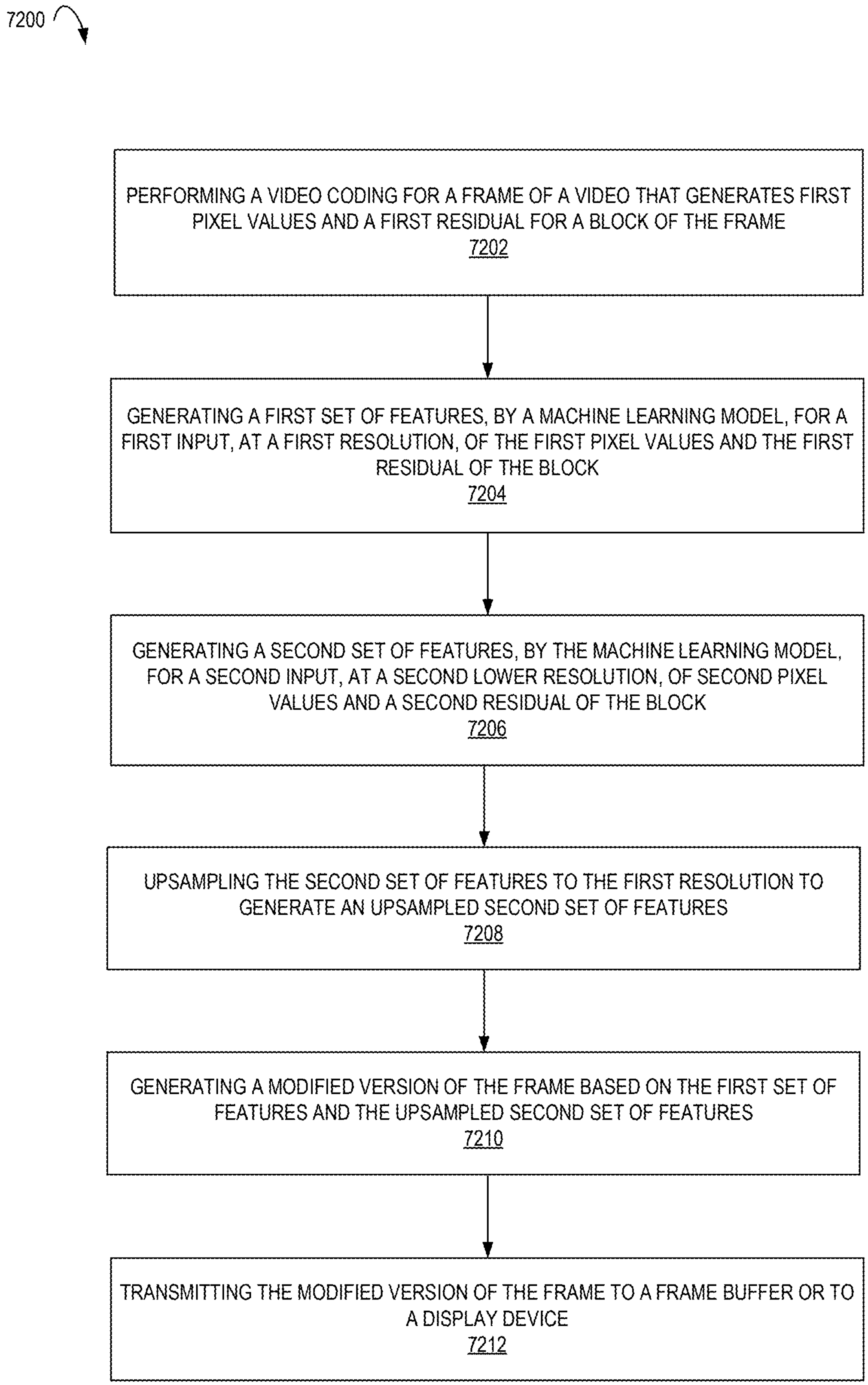
FIG. 72 is a flow diagram illustrating operations of a method of generating a modified version of a frame based on a first set of features and an upsampled second set of features generated by a machine learning model according to some examples.

FIG. 72 is a flow diagram illustrating operations of a method of generating a modified version of a frame based on a first set of features and an upsampled second set of features generated by a machine learning model according to some examples. Some or all of the operations 7200 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 7200 are performed by a device (e.g., device 7800) and/or content delivery system 102 (e.g., implemented in a provider network) of the other FIGS.

The operations 7200 include, at block 7202, performing a video coding for a frame of a video that generates first pixel values and a first residual for a block of the frame. The operations 7200 further include, at block 7204, generating a first set of features, by a machine learning model, for a first input, at a first resolution, of the first pixel values and the first residual of the block. The operations 7200 further include, at block 7206, generating a second set of features, by the machine learning model, for a second input, at a second lower resolution, of second pixel values and a second residual of the block. The operations 7200 further include, at block 7208, upsampling the second set of features to the first resolution to generate an upsampled second set of features. The operations 7200 further include, at block 7210, generating a modified version of the frame based on the first set of features and the upsampled second set of features. The operations 7200 further include, at block 7212, transmitting the modified version of the frame to a frame buffer or to a display device.

Figure 73:
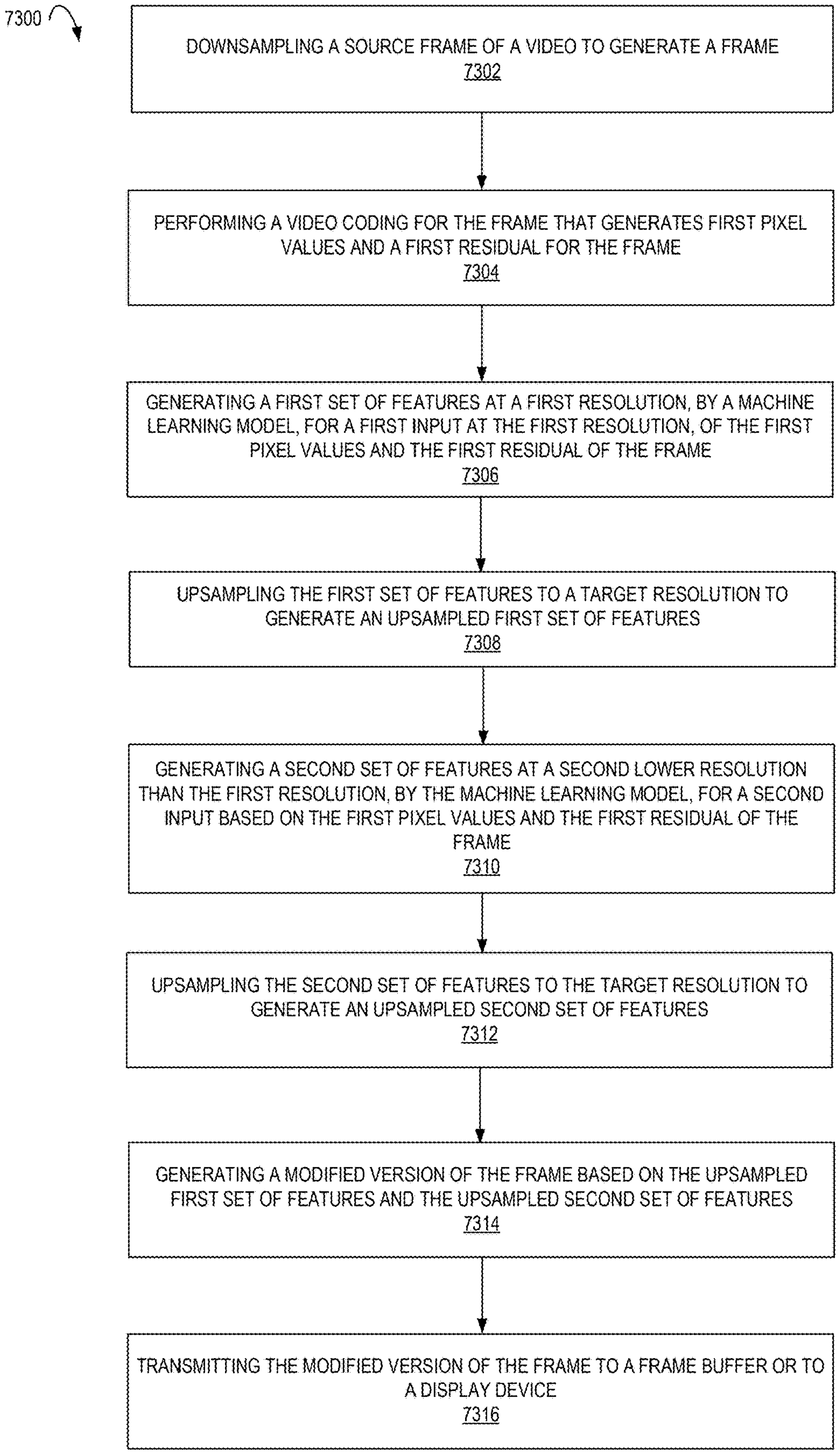
FIG. 73 is a flow diagram illustrating operations of a method of using a machine learning model for dual channel output operations according to some examples.

FIG. 73 is a flow diagram illustrating operations 7300 of a method of using a machine learning model for super-resolution operations according to some examples. Some or all of the operations 7300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 7300 are performed by a device (e.g., device 7800) and/or content delivery system 102 (e.g., implemented in a provider network) of the other FIGS.

The operations 7300 include, at block 7302, downsampling a source frame of a video to generate a frame. The operations 7300 further include, at block 7304, performing a video coding for the frame that generates first pixel values and a first residual for the frame. The operations 7300 further include, at block 7306, generating a first set of features at a first resolution, by a machine learning model, for a first input at the first resolution, of the first pixel values and the first residual of the frame. The operations 7300 further include, at block 7308, upsampling the first set of features to a target resolution to generate an upsampled first set of features. The operations 7300 further include, at block 7310, generating a second set of features at a second lower resolution than the first resolution, by the machine learning model, for a second input based on the first pixel values and the first residual of the frame. The operations 7300 further include, at block 7312, upsampling the second set of features to the target resolution to generate an upsampled second set of features. The operations 7300 further include, at block 7314, generating a modified version of the frame based on the upsampled first set of features and the upsampled second set of features. The operations 7300 further include, at block 7316, transmitting the modified version of the frame to a frame buffer or to a display device.

Figure 74:
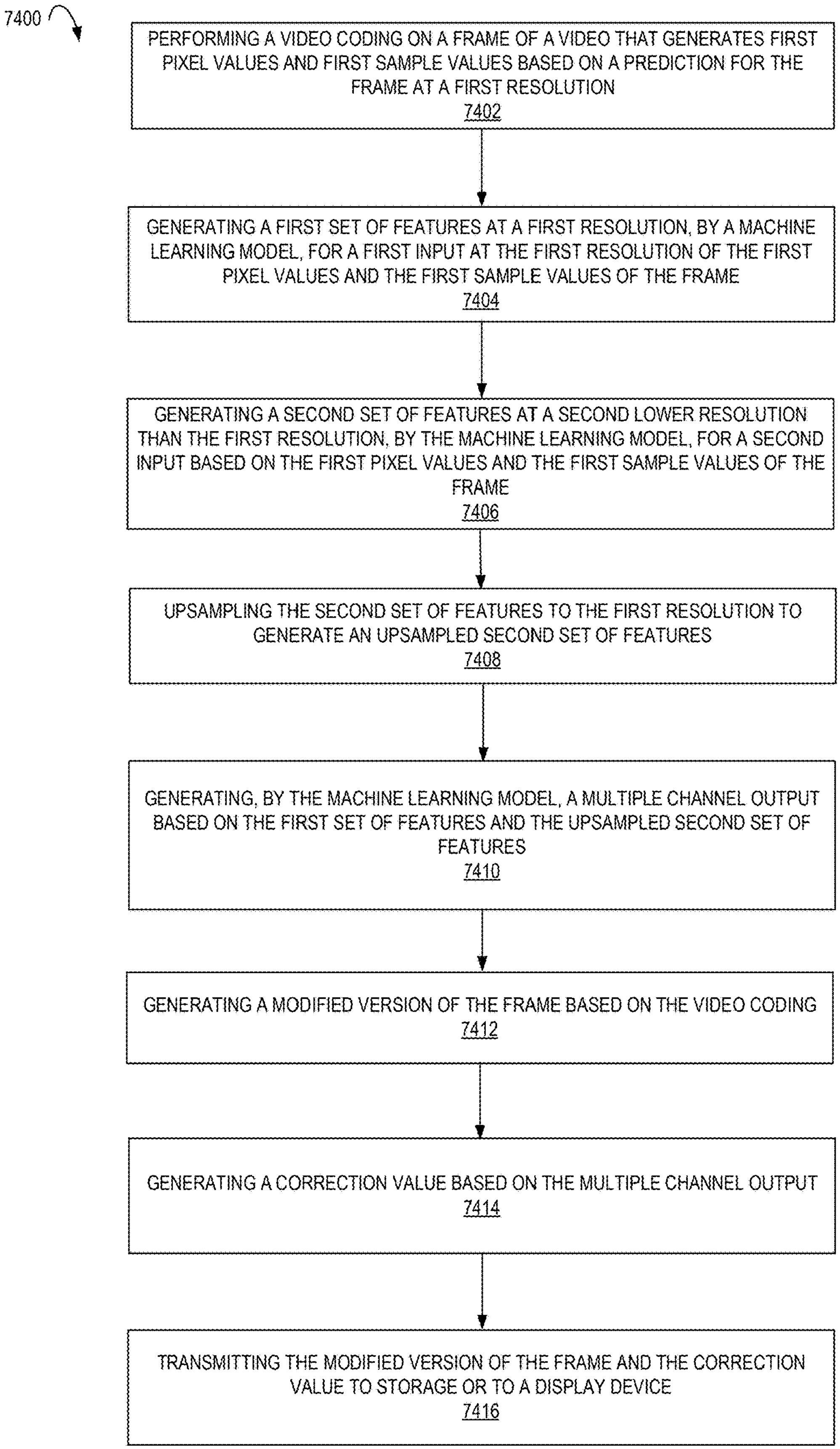
FIG. 74 is a flow diagram illustrating operations of a method of using a machine learning model for dual channel output operations according to some examples.

FIG. 74 is a flow diagram illustrating operations 7400 of a method of using a machine learning model for dual channel output (e.g., super-resolution) operations according to some examples. Some or all of the operations 7400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 7400 are performed by a device (e.g., device 7800) and/or content delivery system 102 (e.g., implemented in a provider network) of the other FIGS.

The operations 7400 include, at block 7402, performing a video coding on a frame of a video that generates first pixel values and first sample values based on a prediction for the frame at a first resolution. The operations 7400 further include, at block 7404, generating a first set of features at a first resolution, by a machine learning model, for a first input at the first resolution of the first pixel values and the first sample values of the frame. The operations 7400 further include, at block 7406, generating a second set of features at a second lower resolution than the first resolution, by the machine learning model, for a second input based on the first pixel values and the first sample values of the frame. The operations 7400 further include, at block 7408, upsampling the second set of features to the first resolution to generate an upsampled second set of features. The operations 7400 further include, at block 7410, generating, by the machine learning model, a multiple channel output based on the first set of features and the upsampled second set of features. The operations 7400 further include, at block 7412, generating a modified (e.g., compressed) version of the frame based on the video coding. The operations 7400 further include, at block 7414, generating a correction value based on the multiple channel output. The operations 7400 further include, at block 7416, transmitting (e.g., in a same bitstream) the modified (e.g., compressed) version of the frame and the correction value to storage or to a display device.

At least some examples of the disclosed technologies can be described in view of the following examples:

Example 1. A computer-implemented method comprising:
- receiving a video at a content delivery service;
- generating a prediction, by a multi-scale machine learning model, based on an input frame of the video;
- performing an encode of the input frame of the video by the content delivery service based on the prediction to generate an encoded frame; and
- transmitting the encoded frame from the content delivery service to a viewer device.

Example 2. The computer-implemented method of example 1, wherein the generating the prediction, by the multi-scale machine learning model, is within a prediction loop of a video codec.

Example 3. The computer-implemented method of example 1, wherein the generating the prediction, by the multi-scale machine learning model, is within a post-processor service after a decoder.

Example 4. The computer-implemented method of example 1, wherein the generating the prediction, by the multi-scale machine learning model, is based on the input frame and a residual value.

Example 5. The computer-implemented method of example 4, further comprising:
- generating quantized coefficients for the input frame;
- generating inverse quantized coefficients from the quantized coefficients; and determining the residual value based on the inverse quantized coefficients.

Example 6. The computer-implemented method of example 1, wherein the generating the prediction replaces a deblocking and constrained directional enhancement filter of a video codec.

Example 7. The computer-implemented method of example 1, wherein the generating the prediction, by the multi-scale machine learning model, is based on an inverse transform of the input frame.

Example 8. A computer-implemented method comprising:
- receiving a video at a content delivery service;
- performing an encode on a frame of the video by the content delivery service that coverts the frame from a pixel domain to a transform (e.g., frequency) domain and back to the pixel domain to generate first pixel values and a first residual for a block of the frame at a first resolution;
- generating a first set of features, by a machine learning model of the content delivery service, for a first input at the first resolution, of the first pixel values and the first residual of the block;
- generating a second set of features, by the machine learning model of the content delivery service, for a second input, at a second lower resolution, of second pixel values and a second residual of the block;
- upsampling the second set of features to the first resolution to generate an upsampled second set of features;
- generating a modified version of the frame based on the first set of features and the upsampled second set of features; and
- transmitting the modified version of the frame to a frame buffer or from the content delivery service to a viewer device.

Example 9. The computer-implemented method of example 8, further comprising:
- generating a third set of features, by the machine learning model of the content delivery service, for a third input, at a third resolution that is lower than the second lower resolution, of third pixel values and a third residual of the block; and upsampling the third set of features to the first resolution to generate an upsampled third set of features, wherein the generating the modified version of the frame is based on the first set of features, the upsampled second set of features, and the upsampled third set of features Example 10. The computer-implemented method of example 8, wherein the generating the first set of features, generating the second set of features, and generating the modified version of the frame occur within a loop filter of an encoder.

Example 11. A computer-implemented method comprising:
- performing a video coding for a frame of a video that generates first pixel values and a first residual for a block of the frame;
- generating a first set of features, by a machine learning model, for a first input at a first resolution, of the first pixel values and the first residual of the block;

generating a second set of features, by the machine learning model, for a second input, at a second lower resolution, of second pixel values and a second residual of the block;

upsampling the second set of features to the first resolution to generate an upsampled second set of features;

generating a modified version of the frame based on the first set of features and the upsampled second set of features; and transmitting the modified version of the frame to a frame buffer or to a display device.

Example 12. The computer-implemented method of example 11, further comprising:

generating a third set of features, by the machine learning model, for a third input, at a third resolution that is lower than the second lower resolution, of third pixel values and a third residual of the block; and upsampling the third set of features to the first resolution to generate an upsampled third set of features, wherein the generating the modified version of the frame is based on the first set of features, the upsampled second set of features, and the upsampled third set of features.

Example 13. The computer-implemented method of example 11, wherein the generating the first set of features, generating the second set of features, and generating the modified version of the frame occur within a loop filter of an encoder.

Example 14. The computer-implemented method of example 11, wherein a viewer device comprises a decoder and the display device, and the generating the first set of features, generating the second set of features, and generating the modified version of the frame occur within a loop filter of the decoder.

Example 15. The computer-implemented method of example 14, further comprising:

determining an indication of a subset of blocks of a frame that are to be processed by a machine learning model of the decoder; and sending the indication to the decoder to cause the decoder to process the subset of blocks of the frame by the machine learning model of the decoder.

Example 16. The computer-implemented method of example 11, wherein the generating the first set of features, generating the second set of features, and generating the modified version of the frame occur in a post-processor separate from any encoder and any decoder.

Example 17. The computer-implemented method of example 11, further comprising, before the generating the second set of features, downsampling the block from the first resolution to the second lower resolution.

Example 18. The computer-implemented method of example 17, wherein the downsampling comprises performing a strided convolution on the block at the first resolution.

Example 19. The computer-implemented method of example 11, wherein the upsampling comprises interleaving a plurality of channels into one channel.

Example 20. The computer-implemented method of example 11, wherein the generating the modified version of the frame comprises performing a cross-component sample offset operation.

Example 21. The computer-implemented method of example 11, further comprising selecting one of the modified version of the block and another version of the block as input to a cross-component sample offset operation.

Example 22. A non-transitory computer-readable medium storing code that, when executed by a device, causes the device to perform a method comprising:

performing a video coding for a frame of a video that generates first pixel values and a first residual for a block of the frame;

generating a first set of features, by a machine learning model, for a first input at a first resolution, of the first pixel values and the first residual of the block;

generating a second set of features, by the machine learning model, for a second input, at a second lower resolution, of second pixel values and a second residual of the block;

upsampling the second set of features to the first resolution to generate an upsampled second set of features;

generating a modified version of the frame based on the first set of features and the upsampled second set of features; and transmitting the modified version of the frame to a frame buffer or to a display device.

Example 23. The non-transitory computer-readable medium of example 22, wherein the method further comprises:

generating a third set of features, by the machine learning model, for a third input, at a third resolution that is lower than the second lower resolution, of third pixel values and a third residual of the block; and upsampling the third set of features to the first resolution to generate an upsampled third set of features, wherein the generating the modified version of the frame is based on the first set of features, the upsampled second set of features, and the upsampled third set of features.

Example 24. The non-transitory computer-readable medium of example 22, wherein the generating the first set of features, generating the second set of features, and generating the modified version of the frame occur within a loop filter of an encoder.

Example 25. The non-transitory computer-readable medium of example 22, wherein the device comprises a decoder and the display device, and the generating the first set of features, generating the second set of features, and generating the modified version of the frame occur within a loop filter of the decoder.

Example 26. The non-transitory computer-readable medium of example 22, wherein the generating the first set of features, generating the second set of features, and generating the modified version of the frame occur in a post-processor separate from any encoder of the device and any decoder of the device.

Example 27. The non-transitory computer-readable medium of example 22, wherein the generating the modified version of the frame comprises performing a cross-component sample offset operation.

Example 28. A computer-implemented method comprising:

downsampling a source frame of a video to generate a frame;

performing a video coding for the frame that generates first pixel values and a first residual for the frame;

performing super-resolution operations that comprise:

generating a first set of features, by a machine learning model, for a first input at a first resolution, of the first pixel values and the first residual of the frame, generating a second set of features, by the machine learning model, for a second input, at a second lower resolution, of second pixel values and a second residual of the frame, upsampling the second set of features to the first resolution to generate an upsampled second set of features, and generating a modified version of the frame based on the first set of features and the upsampled second set of features; and transmitting the modified version of the frame to a frame buffer or to a display device.

Example 29. The computer-implemented method of example 28, wherein the generating the first set of features or the second set of features by the machine learning model is based on a deblocking input.

Example 30. The computer-implemented method of example 28, wherein the upsampling is a linear upsampling.

Example 31. The computer-implemented method of example 28, wherein the upsampling comprises selecting a super-resolution spatial resampling scale factor from a set of super-resolution spatial resampling scale factors.

Example 32. The computer-implemented method of example 31, wherein the super-resolution spatial resampling scale factor is indicated by a syntax element at a single block level of granularity.

Example 33. The computer-implemented method of example 31, wherein the super-resolution spatial resampling scale factor is indicated by a syntax element at a single frame level of granularity.

Example 34. The computer-implemented method of example 28, wherein the generating the first set of features by the machine learning model comprises performing a sequential application of a spatial convolution independently over each input channel followed by a point-wise convolution on the first pixel values and the first residual of the frame.

Example 35. The computer-implemented method of example 34, wherein the generating the second set of features by the machine learning model comprises performing a sequential application of a spatial convolution independently over each input channel followed by a point-wise convolution on the second pixel values and the second residual of the frame.

Example 36. The computer-implemented method of example 28, wherein the generating the second set of features by the machine learning model comprises performing a sequential application of a spatial convolution independently over each input channel followed by a point-wise convolution on the second pixel values and the second residual of the frame.

Example 37. The computer-implemented method of example 28, wherein the upsampling comprises interleaving a plurality of channels into one channel.

Example 38. The computer-implemented method of example 28, wherein the generating the first set of features by the machine learning model comprises performing a first adaptive polyphase upsampling filtering, and the generating the second set of features by the machine learning model comprises performing a second adaptive polyphase upsampling filtering.

Example 39. The computer-implemented method of example 38, further comprising determining one or more parameters for the first adaptive polyphase upsampling filtering or the second adaptive polyphase upsampling filtering based on a super-resolution spatial resampling scale factor.

Example 40. A computer-implemented method comprising:

downsampling a source frame of a video to generate a frame;

performing a video coding for the frame that generates first pixel values and a first residual for the frame;

performing super-resolution operations that comprise:

generating a first set of features, by a machine learning model, for a first input at a first resolution, of the first pixel values and the first residual of the frame, generating a second set of features, by the machine learning model, for a second input, at a second lower resolution, of second pixel values and a second residual of the frame, upsampling the second set of features to the first resolution to generate an upsampled second set of features, and generating a modified version of the frame based on the first set of features and the upsampled second set of features; and storing the modified version of the frame in a frame buffer.

Example 41. The computer-implemented method of example 40, further comprising:

performing additional processing on the modified version of the frame from the frame buffer to generate a further modified frame; and sending the further modified frame for display.

Example 42. A computer-implemented method comprising:

receiving a video at a content delivery service;

downsampling a source frame of the video to generate a frame;

performing an encode on the frame of the video by the content delivery service that coverts the frame from a pixel domain to a transform domain and back to the pixel domain to generate first pixel values and a first residual for a block of the frame at a first resolution;

generating a first set of features at the first resolution, by a machine learning model of the content delivery service, for a first input at the first resolution, of (e.g., based on) the first pixel values and the first residual of the block;

upsampling the first set of features to a target resolution to generate an upsampled first set of features;

generating a second set of features at a second lower resolution than the first resolution, by the machine learning model of the content delivery service, for a second input based on the first pixel values and the first residual of the block (e.g., an input of a down sampled version of the block);

upsampling the second set of features to the target resolution to generate an upsampled second set of features;

generating a modified version of the frame based on the upsampled first set of features and the upsampled second set of features; and transmitting the modified version of the frame to a frame buffer or from the content delivery service to a viewer device.

Example 43. The computer-implemented method of example 42, wherein the upsampling of the first set of features comprises selecting a super-resolution spatial resampling scale factor from a set of super-resolution spatial resampling scale factors.

Example 44. The computer-implemented method of example 42, wherein the upsampling of the first set of features and the upsampling of the second set of features are in a feature domain.

Example 45. A computer-implemented method comprising:

downsampling a source frame of a video to generate a frame;

performing a video coding for the frame that generates first pixel values and a first residual for the frame;

generating a first set of features at a first resolution, by a machine learning model, for a first input at the first resolution, of (e.g., based on) the first pixel values and the first residual of the frame;

upsampling the first set of features to a target resolution to generate an upsampled first set of features;

generating a second set of features at a second lower resolution than the first resolution, by the machine learning model, for a second input based on the first pixel values and the first residual of the frame;

upsampling the second set of features to the target resolution to generate an upsampled second set of features;

generating a modified version of the frame based on the upsampled first set of features and the upsampled second set of features; and transmitting the modified version of the frame to a frame buffer or to a display device.

Example 46. The computer-implemented method of example 45, wherein the upsampling of the first set of features comprises selecting a super-resolution spatial resampling scale factor from a set of super-resolution spatial resampling scale factors.

Example 47. The computer-implemented method of example 46, wherein the super-resolution spatial resampling scale factor indicates a first number of output channels per input channel for a first processing path of the machine learning model for the first set of features at the first resolution, and a second number of output channels per input channel for a second processing path of the machine learning model for the second set of features at the second lower resolution.

Example 48. The computer-implemented method of any one of examples 46-47, wherein the super-resolution spatial resampling scale factor indicates a first stride for a convolution layer of a first processing path of the machine learning model for the first set of features at the first resolution, and a second stride for a convolution layer of a second processing path of the machine learning model for the second set of features at the second lower resolution.

Example 49. The computer-implemented method of any one of examples 46-48, wherein the super-resolution spatial resampling scale factor indicates a first upscaling factor of a first processing path of the machine learning model for the first set of features at the first resolution, and a second upscaling factor of a second processing path of the machine learning model for the second set of features at the second lower resolution.

Example 50. The computer-implemented method of example 45, wherein the generating the first set of features by the machine learning model comprises performing a sequential application of a spatial convolution independently over each input channel followed by a point-wise convolution, and/or the generating the second set of features by the machine learning model comprises performing a sequential application of a spatial convolution independently over each input channel followed by a point-wise convolution.

Example 51. The computer-implemented method of example 45, wherein the upsampling comprises interleaving a plurality of channels into one channel.

Example 52. The computer-implemented method of example 45, wherein the upsampling of the first set of features and the upsampling of the second set of features are in a feature domain.

Example 53. The computer-implemented method of example 52, wherein the performing the video coding for the frame comprises a pixel domain upsampling of the frame to the target resolution, and the generating the modified version of the frame comprises modifying an output from the pixel domain upsampling.

Example 54. The computer-implemented method of example 45, wherein the generating the first set of features by the machine learning model comprises performing a first adaptive polyphase upsampling filtering, and the generating the second set of features by the machine learning model comprises performing a second adaptive polyphase upsampling filtering.

Example 55. The computer-implemented method of example 54, further comprising determining one or more parameters for the first adaptive polyphase upsampling filtering or the second adaptive polyphase upsampling filtering based on a super-resolution spatial resampling scale factor.

Example 56. A non-transitory computer-readable medium storing code that, when executed by a device, causes the device to perform a method comprising:

downsampling a source frame of a video to generate a frame;

performing a video coding for the frame that generates first pixel values and a first residual for the frame;

generating a first set of features at a first resolution, by a machine learning model, for a first input at a first resolution, of the first pixel values and the first residual of the frame;

upsampling the first set of features to a target resolution to generate an upsampled first set of features, generating a second set of features at a second lower resolution than the first resolution, by the machine learning model, for a second input based on the first pixel values and the first residual of the frame;

upsampling the second set of features to the target resolution to generate an upsampled second set of features;

generating a modified version of the frame based on the upsampled first set of features and the upsampled second set of features; and transmitting the modified version of the frame to a frame buffer or to a display device.

Example 57. The non-transitory computer-readable medium of example 56, wherein the upsampling of the first set of features comprises selecting a super-resolution spatial resampling scale factor from a set of super-resolution spatial resampling scale factors.

Example 58. The non-transitory computer-readable medium of example 57, wherein the super-resolution spatial resampling scale factor indicates a first number of output channels per input channel for a first processing path of the machine learning model for the first set of features at the first resolution, and a second number of output channels per input channel for a second processing path of the machine learning model for the second set of features at the second lower resolution.

Example 59. The non-transitory computer-readable medium of example 56, wherein the generating the first set of features and the generating the second set of features by the machine learning model each comprise performing a sequential application of a spatial convolution independently over each input channel followed by a point-wise convolution.

Example 60. The non-transitory computer-readable medium of example 56, wherein the upsampling of the first set of features and the upsampling of the second set of features are in a feature domain.

Example 61. The non-transitory computer-readable medium of example 60, wherein the performing the video coding for the frame comprises a pixel domain upsampling of the frame to the target resolution, and the generating the modified version of the frame comprises modifying an output from the pixel domain upsampling.

Example 62. A computer-implemented method comprising:

receiving a video comprising a frame at a content delivery service;

performing an encode on the frame of the video by the content delivery service that coverts the frame from a pixel domain to a transform domain and back to the pixel domain to generate first pixel values and first sample values based on a prediction for a block of the frame at a first resolution;

generating a first set of features at the first resolution, by a machine learning model of the content delivery service, for a first input at the first resolution of the first pixel values and the first sample values of the block;

generating a second set of features (e.g., in parallel with the generating the first set of features) at a second lower resolution than the first resolution, by the machine learning model of the content delivery service, for a second input based on the first pixel values and the first sample values of the block;

upsampling the second set of features to the first resolution to generate an upsampled second set of features;

generating, by the machine learning model of the content delivery service, a multiple channel output based on the first set of features and the upsampled second set of features;

generating a modified version of the frame based on the encode;

generating a correction value based on the multiple channel output; and transmitting the modified version of the frame and the correction value from the content delivery service to a viewer device.

Example 63. The computer-implemented method of example 62, wherein the generating the correction value comprises generating a first scaling value for a first channel output of the multiple channel output and a second scaling value for a second channel output of the multiple channel output.

Example 64. The computer-implemented method of example 63, wherein the generating the first scaling value comprises generating a first centroid for the video and a first scaling difference relative to the first centroid for the first channel output, and the generating the second scaling value comprises generating a second centroid for the video and a second scaling difference relative to the second centroid for the second channel output.

Example 65. A computer-implemented method comprising:

performing a video coding on a frame of a video that generates first pixel values and first sample values based on a prediction for the frame at a first resolution;

generating a first set of features at a first resolution, by a machine learning model, for a first input at the first resolution of the first pixel values and the first sample values of the frame;

generating a second set of features (e.g., in parallel with the generating the first set of features) at a second lower resolution than the first resolution, by the machine learning model, for a second input based on the first pixel values and the first sample values of the frame;

upsampling the second set of features to the first resolution to generate an upsampled second set of features;

generating, by the machine learning model, a multiple channel output based on the first set of features and the upsampled second set of features;

generating a modified version of the frame based on the video coding;

generating a correction value based on the multiple channel output; and transmitting the modified version of the frame and the correction value to storage or to a display device.

Example 66. The computer-implemented method of example 65, wherein the generating the correction value comprises generating a first scaling value for a first channel output of the multiple channel output and a second scaling value for a second channel output of the multiple channel output.

Example 67. The computer-implemented method of example 66, further comprising sending an indication to the display device to indicate the first scaling value is to be reused for a different portion of the video.

Example 68. The computer-implemented method of example 67, wherein the generating the first scaling value comprises generating a first centroid for the video and a first scaling difference from relative to the first centroid for the first channel output, and the generating the second scaling value comprises generating a second centroid for the video and a second scaling difference from relative to the second centroid for the second channel output.

Example 69. The computer-implemented method of example 66, wherein the generating the first scaling value comprises generating a first centroid for the video and a first scaling difference from the first centroid for the first channel output, and the generating the second scaling value comprises generating a second centroid for the video and a second scaling difference from the second centroid for the second channel output.

Example 70. The computer-implemented method of example 69, wherein the first centroid and the first scaling difference form a first luma correction value for the first channel output and the second centroid and the second scaling difference form a second luma correction value for the second channel output.

Example 71. The computer-implemented method of example 69, wherein the first scaling difference and the second scaling difference are at a block level of multiple blocks of the frame.

Example 72. The computer-implemented method of example 69, wherein the first scaling difference and the second scaling difference are at a frame level of multiple frames of the video.

Example 73. The computer-implemented method of example 69, wherein the generating the first scaling value comprises generating a first step size for the first centroid for the video, and the generating the second scaling value comprises generating a second step size (e.g., the same or different than the first step size) for the second centroid for the video.

Example 74. The computer-implemented method of example 73, wherein the generating the first scaling value further comprises generating a first step size for the first scaling difference, and the generating the second scaling value further comprises generating a second step size (e.g., the same or different than the first step size) for the second scaling difference.

Example 75. The computer-implemented method of example 69, wherein the generating the first scaling value comprises generating a first step size for the first scaling difference, and the generating the second scaling value comprises generating a second step size (e.g., the same or different than the first step size) for the second scaling difference.

Example 76. A non-transitory computer-readable medium storing code that, when executed by a device, causes the device to perform a method comprising:

- performing a video coding on a frame of a video that generates first pixel values and first sample values based on a prediction for the frame at a first resolution;
- generating a first set of features at a first resolution, by a machine learning model, for a first input at the first resolution of the first pixel values and the first sample values of the frame;
- generating a second set of features (e.g., in parallel with the generating the first set of features) at a second lower resolution than the first resolution, by the machine learning model, for a second input based on the first pixel values and the first sample values of the frame;
- upsampling the second set of features to the first resolution to generate an upsampled second set of features;
- generating, by the machine learning model, a multiple channel output based on the first set of features and the upsampled second set of features;
- generating a modified version of the frame based on the video coding;
- generating a correction value based on the multiple channel output; and
- transmitting the modified version of the frame and the correction value to storage or to a display device.

Example 77. The non-transitory computer-readable medium of example 76, wherein the generating the correction value comprises generating a first scaling value for a first channel output of the multiple channel output and a second scaling value for a second channel output of the multiple channel output.

Example 78. The non-transitory computer-readable medium of example 77, wherein the method further comprises sending an indication to the display device to indicate the first scaling value is to be reused for a different portion of the video.

Example 79. The non-transitory computer-readable medium of example 77, wherein the generating the first scaling value comprises generating a first centroid for the video and a first scaling difference relative to the first centroid for the first channel output, and the generating the second scaling value comprises generating a second centroid for the video and a second scaling difference relative to the second centroid for the second channel output.

Example 80. The non-transitory computer-readable medium of example 77, wherein the generating the first scaling value comprises generating a first step size for the first centroid for the video, and the generating the second scaling value comprises generating a second step size (e.g., the same or different than the first step size) for the second centroid for the video.

Example 81. The non-transitory computer-readable medium of example 80, wherein the generating the first scaling value further comprises generating a first step size for the first scaling difference, and the generating the second scaling value comprises generating a second step size (e.g., the same or different than the first step size) for the second scaling difference.

Exemplary environments, systems, etc. that the above may be used in are detailed below.

Figure 75:
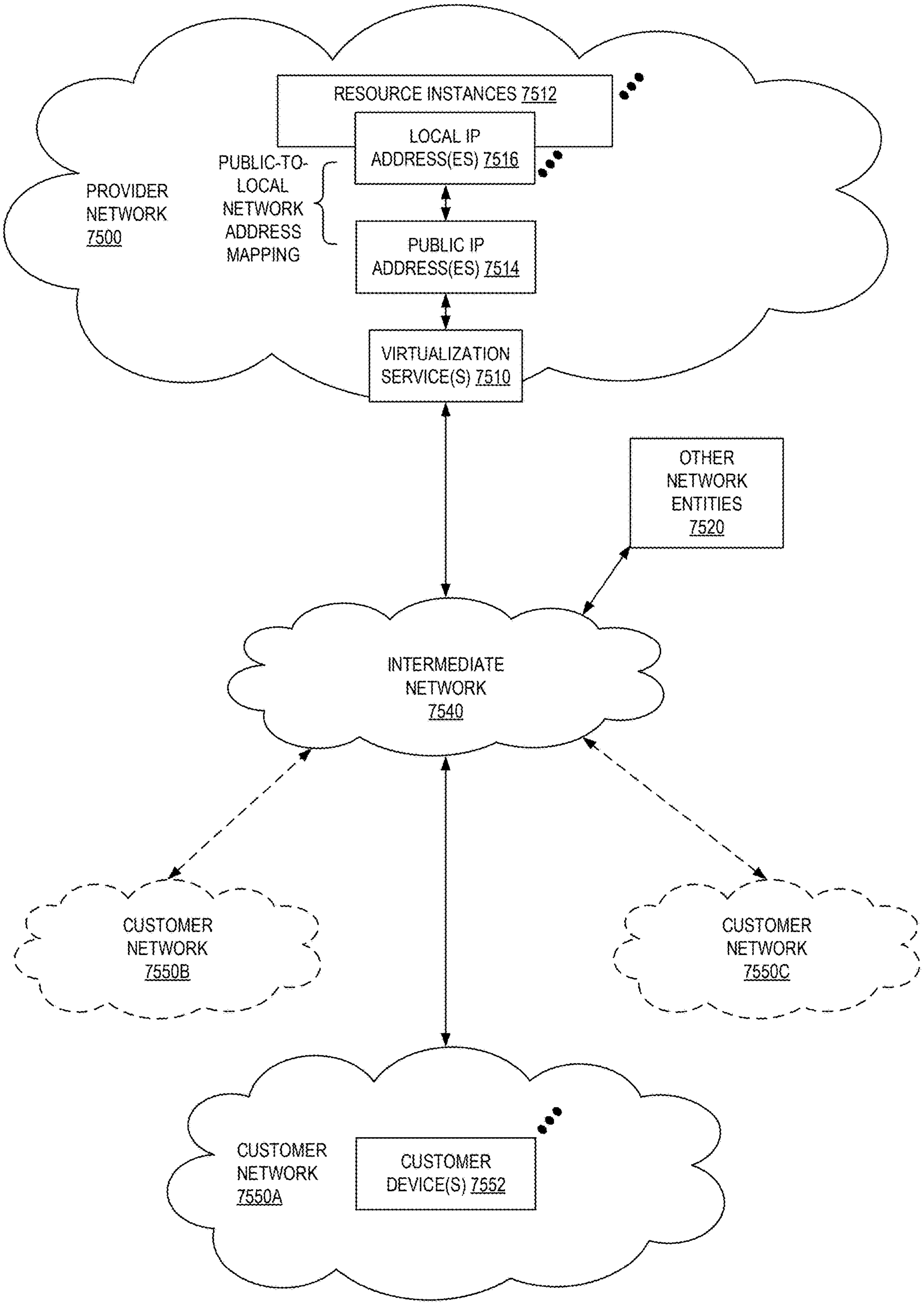
FIG. 75 illustrates an example provider network environment according to some examples.

FIG. 75 illustrates an example provider network (or "service provider system") environment according to some examples. A provider network 7500 may provide resource virtualization to customers via one or more virtualization services 7510 that allow customers to purchase, rent, or otherwise obtain instances 7512 of virtualized resources, including but not limited to computation and storage resources, implemented on devices within the provider network or networks in one or more data centers. Local Internet Protocol (IP) addresses 7516 may be associated with the resource instances 7512; the local IP addresses are the internal network addresses of the resource instances 7512 on the provider network 7500. In some examples, the provider network 7500 may also provide public IP addresses 7514 and/or public IP address ranges (e.g., Internet Protocol version 4 (IPv4) or Internet Protocol version 6 (IPv6) addresses) that customers may obtain from the provider 7500.

Conventionally, the provider network 7500, via the virtualization services 7510, may allow a customer of the service provider (e.g., a customer that operates one or more client networks 7550A-7550C including one or more customer device(s) 7552) to dynamically associate at least some public IP addresses 7514 assigned or allocated to the customer with particular resource instances 7512 assigned to the customer. The provider network 7500 may also allow the customer to remap a public IP address 7514, previously mapped to one virtualized computing resource instance 7512 allocated to the customer, to another virtualized computing resource instance 7512 that is also allocated to the customer. Using the virtualized computing resource instances 7512 and public IP addresses 7514 provided by the service provider, a customer of the service provider such as the operator of customer network(s) 7550A-7550C may, for example, implement customer-specific applications and present the customer's applications on an intermediate network 7540, such as the Internet. Other network entities 7520 on the intermediate network 7540 may then generate traffic to a destination public IP address 7514 published by the customer network(s) 7550A-7550C; the traffic is routed to the service provider data center, and at the data center is routed, via a network substrate, to the local IP address 7516 of the virtualized computing resource instance 7512 currently mapped to the destination public IP address 7514. Similarly, response traffic from the virtualized computing resource instance 7512 may be routed via the network substrate back onto the intermediate network 7540 to the source entity 7520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 7500; a customer may then assign their allocated public IP addresses to particular resource instances allocated to the customer. These public IP addresses may be referred to as customer public IP addresses, or simply customer IP addresses. Instead of being assigned by the provider network 7500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 76:
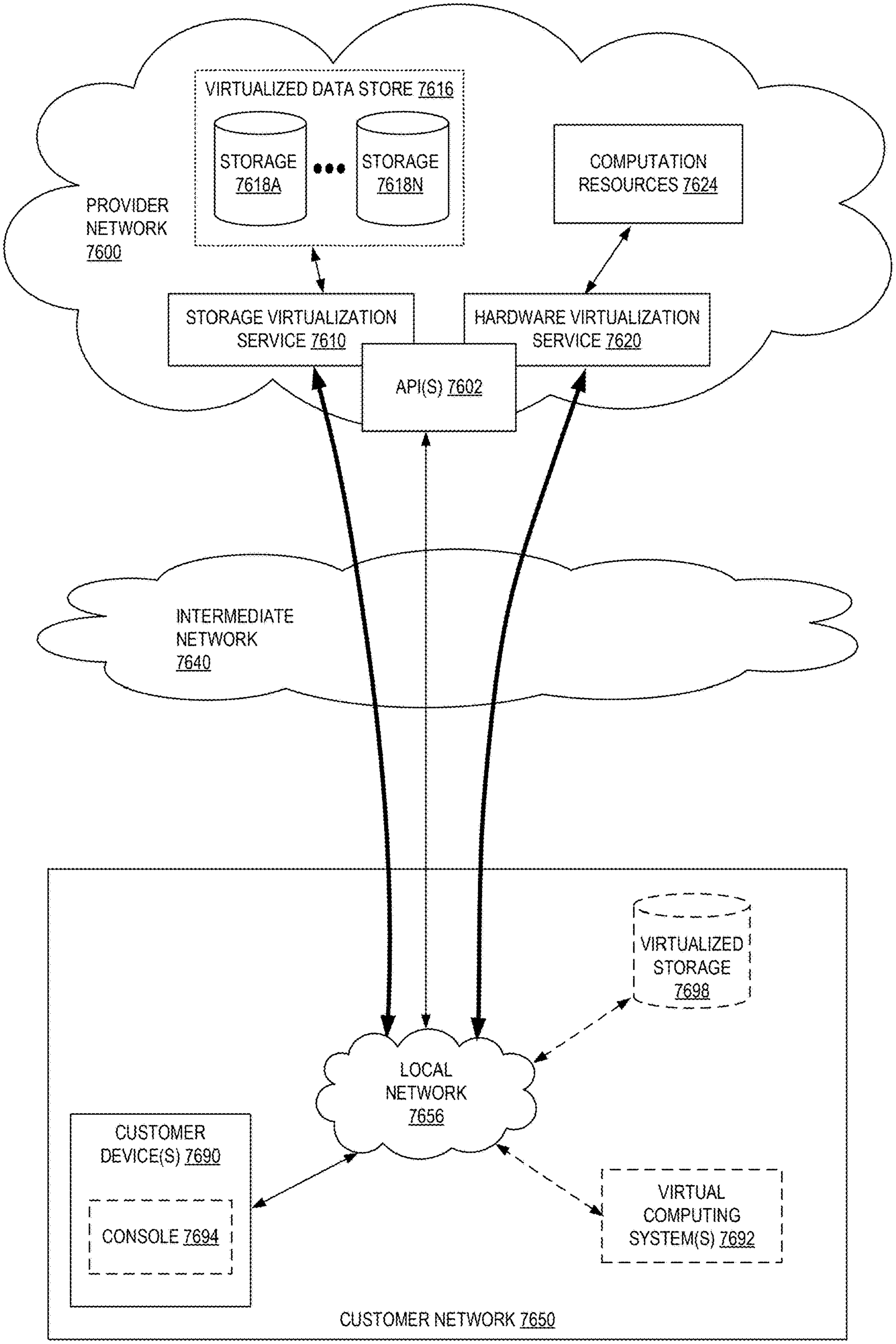
FIG. 76 is a block diagram of an example provider network that provides a storage service and a hardware virtualization service to customers according to some examples.

FIG. 76 is a block diagram of an example provider network that provides a storage service and a hardware virtualization service to customers, according to some examples. Hardware virtualization service 7620 provides multiple computation resources 7624 (e.g., VMs) to customers. The computation resources 7624 may, for example, be rented or leased to customers of the provider network 7600 (e.g., to a customer that implements customer network 7650). Each computation resource 7624 may be provided with one or more local IP addresses. Provider network 7600 may be configured to route packets from the local IP addresses of the computation resources 7624 to public Internet destinations, and from public Internet sources to the local IP addresses of computation resources 7624.

Provider network 7600 may provide a customer network 7650, for example coupled to intermediate network 7640 via local network 7656, the ability to implement virtual computing systems 7692 via hardware virtualization service 7620 coupled to intermediate network 7640 and to provider network 7600. In some examples, hardware virtualization service 7620 may provide one or more APIs 7602, for example a web services interface, via which a customer network 7650 may access functionality provided by the hardware virtualization service 7620, for example via a console 7694 (e.g., a web-based application, standalone application, mobile application, etc.). In some examples, at the provider network 7600, each virtual computing system 7692 at customer network 7650 may correspond to a computation resource 7624 that is leased, rented, or otherwise provided to customer network 7650.

From an instance of a virtual computing system 7692 and/or another customer device 7690 (e.g., via console 7694), the customer may access the functionality of storage service 7610, for example via one or more APIs 7602, to access data from and store data to storage resources 7618A-7618N of a virtual data store 7616 (e.g., a folder or "bucket", a virtualized volume, a database, etc.) provided by the provider network 7600. In some examples, a virtualized data store gateway (not shown) may be provided at the customer network 7650 that may locally cache at least some data, for example frequently-accessed or critical data, and that may communicate with storage service 7610 via one or more communications channels to upload new or modified data from a local cache so that the primary store of data (virtualized data store 7616) is maintained. In some examples, a user, via a virtual computing system 7692 and/or on another customer device 7690, may mount and access virtual data store 7616 volumes via storage service 7610 acting as a storage virtualization service, and these volumes may appear to the user as local (virtualized) storage 7698.

While not shown in FIG. 76, the virtualization service(s) may also be accessed from resource instances within the provider network 7600 via API(s) 7602. For example, a customer, appliance service provider, or other entity may access a virtualization service from within a respective virtual network on the provider network 7600 via an API 7602 to request allocation of one or more resource instances within the virtual network or within another virtual network.

Illustrative System

Figure 77:
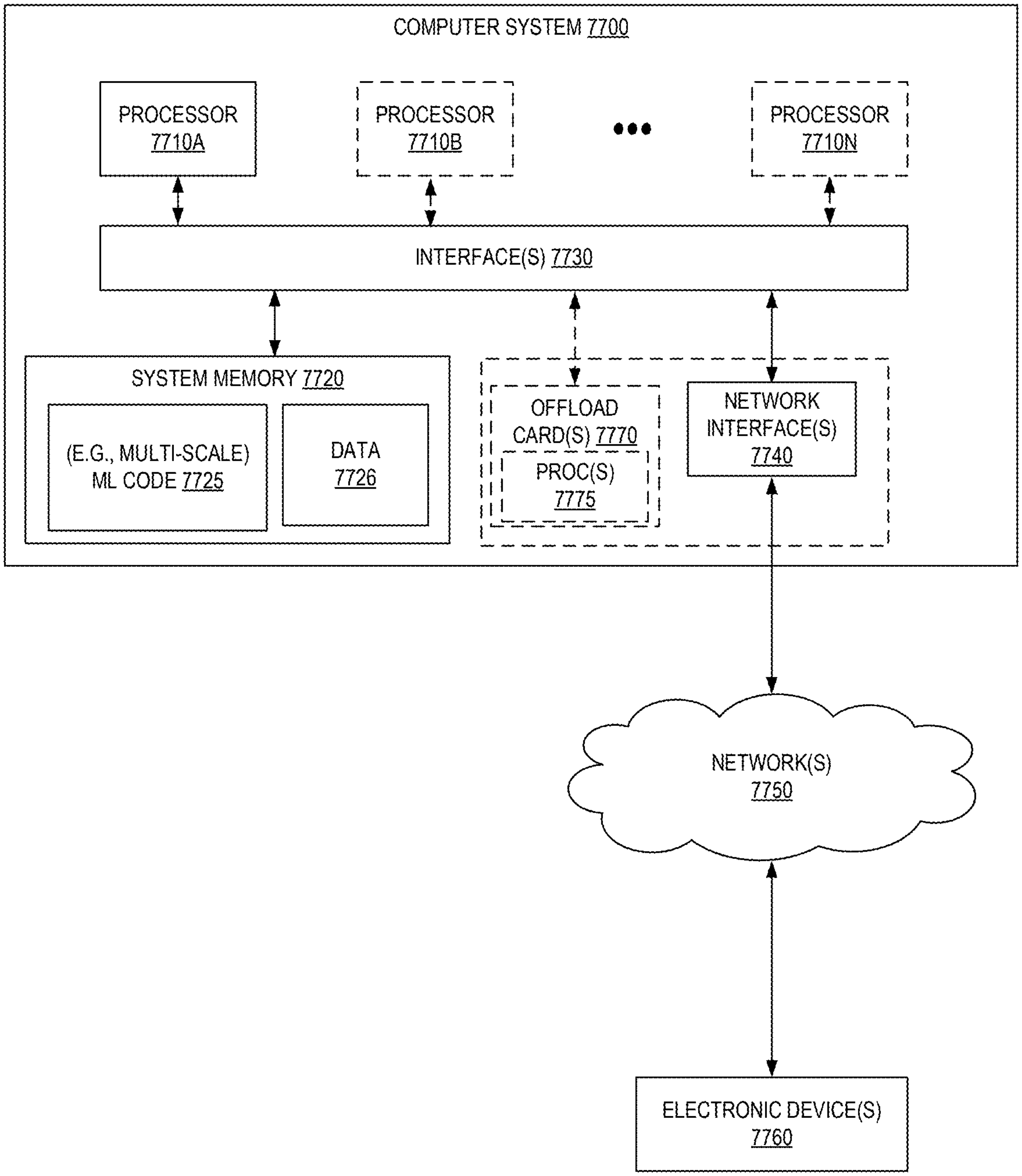
FIG. 77 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 7700 illustrated in FIG. 77. In the illustrated example, computer system 7700 includes one or more processors 7710 coupled to a system memory 7720 via an input/output (I/O) interface 7730. Computer system 7700 further includes a network interface 7740 coupled to I/O interface 7730. While FIG. 77 shows computer system 7700 as a single computing device, in various examples a computer system 7700 may include one computing device or any number of computing devices configured to work together as a single computer system 7700.

In various examples, computer system 7700 may be a uniprocessor system including one processor 7710, or a multiprocessor system including several processors 7710 (e.g., two, four, eight, or another suitable number). Processors 7710 may be any suitable processors capable of executing instructions. For example, in various examples, processors 7710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 7710 may commonly, but not necessarily, implement the same ISA.

System memory 7720 may store instructions and data accessible by processor(s) 7710. In various examples, system memory 7720 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 7720 as (e.g., multi-scale) ML code 7725 (e.g., executable to implement, in whole or in part, the ML model(s) or other operations discussed herein) and data 7726.

In one example, I/O interface 7730 may be configured to coordinate I/O traffic between processor 7710, system memory 7720, and any peripheral devices in the device, including network interface 7740 or other peripheral interfaces. In some examples, I/O interface 7730 may perform any necessary protocol, timing, or other data transformations to convert data signals from one component (e.g., system memory 7720) into a format suitable for use by another component (e.g., processor 7710). In some examples, I/O interface 7730 may include support for devices attached through various types of peripheral buses, such as a variant of the Peripheral Component Interconnect (PCI) bus standard or the Universal Serial Bus (USB) standard, for example. In some examples, the function of I/O interface 7730 may be split into two or more separate components, such as a north bridge and a south bridge, for example. Also, in some examples some or all of the functionality of I/O interface 7730, such as an interface to system memory 7720, may be incorporated directly into processor 7710.

Network interface 7740 may be configured to allow data to be exchanged between computer system 7700 and other devices 7760 attached to a network or networks 7750, such as other computer systems or devices as illustrated in FIG. 1, for example. In various examples, network interface 7740 may support communication via any suitable wired or wireless general data networks, such as types of Ethernet network, for example. Additionally, network interface 7740 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 7700 includes one or more offload cards 7770 (including one or more processors 7775, and possibly including the one or more network interfaces 7740) that are connected using an I/O interface 7730 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 7700 may act as a host electronic device (e.g., operating as part of a hardware virtualization service) that hosts compute instances, and the one or more offload cards 7770 execute a virtualization manager that can manage compute instances that execute on the host electronic device. As an example, in some examples the offload card(s) 7770 can perform compute instance management operations such as pausing and/or un-pausing compute instances, launching and/or terminating compute instances, performing memory transfer/copying operations, etc. These management operations may, in some examples, be performed by the offload card(s) 7770 in coordination with a hypervisor (e.g., upon a request from a hypervisor) that is executed by the other processors 7710A-7710N of the computer system 7700. However, in some examples the virtualization manager implemented by the offload card(s) 7770 can accommodate requests from other entities (e.g., from compute instances themselves), and may not coordinate with (or service) any separate hypervisor.

In some examples, system memory 7720 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 7700 via I/O interface 7730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 7700 as system memory 7720 or another type of memory. Further, a computer-accessible medium may include transmission media or signals such as electrical, electromagnetic, or digital signals, conveyed via a communication medium such as a network and/or a wireless link, such as may be implemented via network interface 7740.

Figure 78:
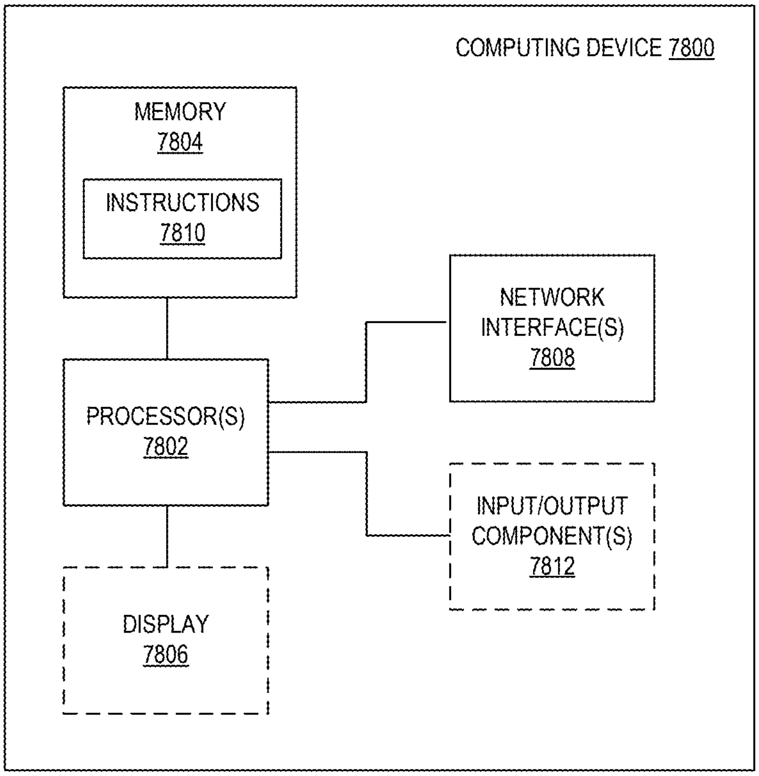
FIG. 78 illustrates a logical arrangement of a set of general components of an exemplary computing device that can be utilized in accordance with various examples.

FIG. 78 illustrates a logical arrangement of a set of general components of an example computing device 7800. Generally, a computing device 7800 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 7802 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 7804) to store code (for example, instructions 7810, e.g., which implement a content delivery service as disclosed herein), and a set of one or more wired or wireless network interfaces 7808 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 7804) of a given electronic device typically stores code (e.g., instructions 7810) for execution on the set of one or more processors 7802 of that electronic device. One or more parts of various examples may be implemented using different combinations of software, firmware, and/or hardware.

A computing device 7800 can include some type of display element 7806, such as a touch screen or liquid crystal display (LCD), although many devices such as portable media players might convey information via other means, such as through audio speakers, and other types of devices such as server end stations may not have a display element 7806 at all. As discussed, some computing devices used in some examples include at least one input and/or output component(s) 7812 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 79:
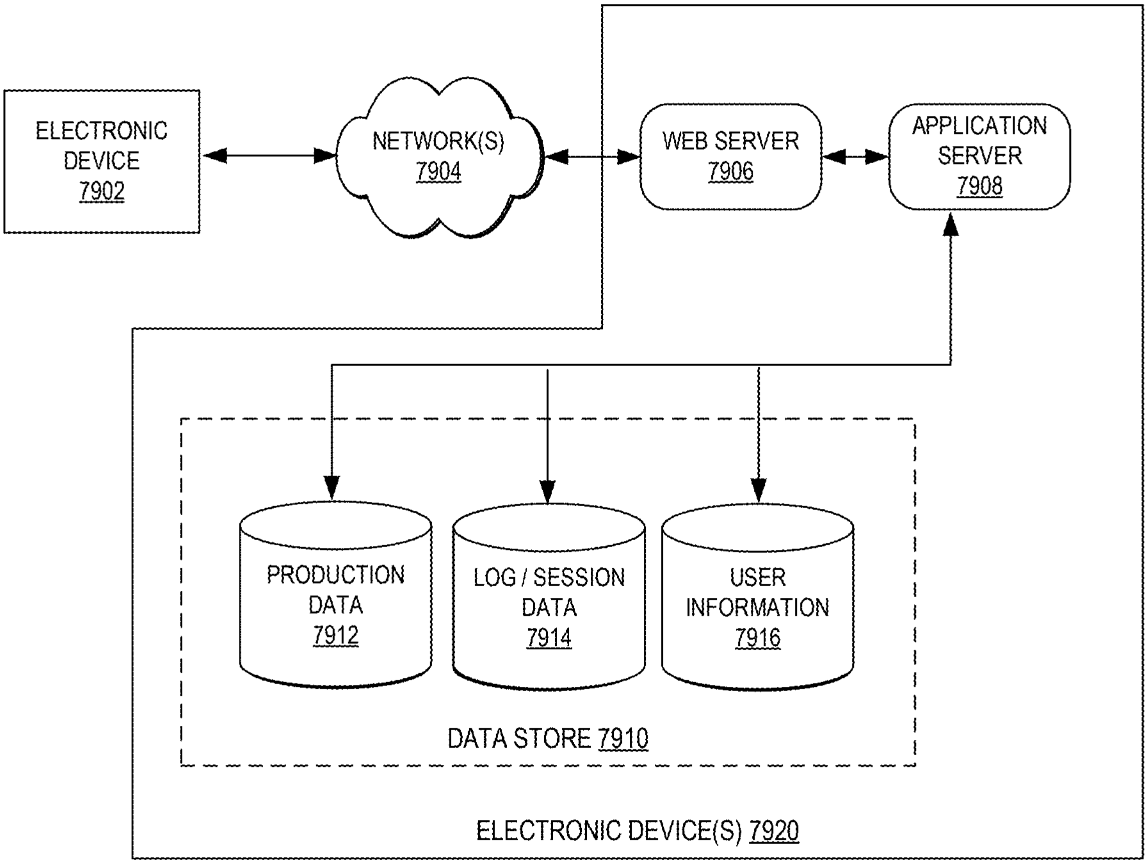
FIG. 79 illustrates an example of an environment for implementing aspects in accordance with various examples.

As discussed, different approaches can be implemented in various environments in accordance with the described examples. For example, FIG. 79 illustrates an example of an environment 7900 for implementing aspects in accordance with various examples. For example, in some examples messages are HyperText Transfer Protocol (HTTP) requests that are received by a web server (e.g., web server 7906), and the users, via electronic devices, may interact with the provider network via a web portal provided via the web server 7906 and application server 7908. As will be appreciated, although a web-based environment is used for purposes of explanation, different environments may be used, as appropriate, to implement various examples. The system includes an electronic client device 7902, which may also be referred to as a client device and can be any appropriate device operable to send and receive requests, messages, or information over an appropriate network 7904 and convey information back to a user of the device 7902. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 7904 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 7904 includes the Internet, as the environment includes a web server 7906 for receiving requests and serving content in response thereto, although for other networks an alternative device serving a similar purpose could be used, as would be apparent to one of ordinary skill in the art.

The illustrative environment includes at least one application server 7908 and a data store 7910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 7908 can include any appropriate hardware and software for integrating with the data store 7910 as needed to execute aspects of one or more applications for the client device 7902 and handling a majority of the data access and business logic for an application. The application server 7908 provides access control services in cooperation with the data store 7910 and is able to generate content such as text, graphics, audio, video, etc., to be transferred to the client device 7902, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 7902 and the application server 7908, can be handled by the web server 7906. It should be understood that the web server 7906 and application server 7908 are not required and are merely example components, as structured code discussed herein can be executed on any appropriate device or host machine as discussed elsewhere herein.

The data store 7910 can include several separate data tables, databases, or other data storage mechanisms and media for storing data relating to a particular aspect. For example, the data store illustrated includes mechanisms for storing production data 7912 and user information 7916, which can be used to serve content for the production side. The data store 7910 also is shown to include a mechanism for storing log or session data 7914. It should be understood that there can be many other aspects that may need to be stored in the data store, such as page image information and access rights information, which can be stored in any of the above listed mechanisms as appropriate or in additional mechanisms in the data store 7910. The data store 7910 is operable, through logic associated therewith, to receive instructions from the application server 7908 and obtain, update, or otherwise process data in response thereto. In one example, a user might submit a search request for a certain type of item. In this case, the data store 7910 might access the user information 7916 to verify the identity of the user and can access a production data 7912 to obtain information about items of that type. The information can then be returned to the user, such as in a listing of results on a web page that the user is able to view via a browser on the user device 7902. Information for a particular item of interest can be viewed in a dedicated page or window of the browser.

The web server 7906, application server 7908, and/or data store 7910 may be implemented by one or more electronic devices 7920, which can also be referred to as electronic server devices or server end stations, and may or may not be located in different geographic locations. Each of the one or more electronic devices 7920 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 79. Thus, the depiction of the environment 7900 in FIG. 79 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) may be used herein to illustrate optional operations that add additional features to some examples. However, such notation should not be taken to mean that these are the only options or optional operations, and/or that blocks with solid borders are not optional in certain examples.

Reference numerals with suffix letters (e.g., 7618A-7618N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary.

Thus, two entities using the same or different suffix letters may or may not have the same number of instances in various examples.

References to "one example," "an example," "certain examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:

receiving a video comprising a frame at a content delivery service;

performing an encode on the frame of the video by the content delivery service that coverts converts the frame from a pixel domain to a transform domain and back to the pixel domain to generate first pixel values and first sample values based on a prediction for a block of the frame at a first resolution;

generating a first set of features at the first resolution, by a machine learning model of the content delivery service, for a first input at the first resolution of the first pixel values and the first sample values of the block;

generating a second set of features at a second lower resolution than the first resolution, by the machine learning model of the content delivery service, for a second input based on the first pixel values and the first sample values of the block;

upsampling the second set of features to the first resolution to generate an upsampled second set of features;

generating, by the machine learning model of the content delivery service, a multiple channel output based on the first set of features and the upsampled second set of features;

generating a modified version of the frame based on the encode;

generating a correction value based on the multiple channel output; and transmitting the modified version of the frame and the correction value from the content delivery service to a viewer device.

2. The computer-implemented method of claim 1, wherein the generating the correction value comprises generating a first scaling value for a first channel output of the multiple channel output and a second scaling value for a second channel output of the multiple channel output.

3. The computer-implemented method of claim 2, wherein the generating the first scaling value comprises generating a first centroid for the video and a first scaling difference relative to the first centroid for the first channel output, and the generating the second scaling value comprises generating a second centroid for the video and a second scaling difference relative to the second centroid for the second channel output.

4. A computer-implemented method comprising:

performing a video coding on a frame of a video that generates first pixel values and first sample values based on a prediction for the frame at a first resolution;

generating a first set of features at a first resolution, by a machine learning model, for a first input at the first resolution of the first pixel values and the first sample values of the frame;

generating a second set of features at a second lower resolution than the first resolution, by the machine learning model, for a second input based on the first pixel values and the first sample values of the frame;

upsampling the second set of features to the first resolution to generate an upsampled second set of features;

generating, by the machine learning model, a multiple channel output based on the first set of features and the upsampled second set of features;

generating a modified version of the frame based on the video coding;

generating a correction value based on the multiple channel output; and transmitting the modified version of the frame and the correction value to storage or to a display device.

5. The computer-implemented method of claim 4, wherein the generating the correction value comprises generating a first scaling value for a first channel output of the multiple channel output and a second scaling value for a second channel output of the multiple channel output.

6. The computer-implemented method of claim 5, further comprising sending an indication to the display device to indicate the first scaling value is to be reused for a different portion of the video.

7. The computer-implemented method of claim 6, wherein the indication further indicates the second scaling value is to be reused for the different portion of the video.

8. The computer-implemented method of claim 5, wherein the generating the first scaling value comprises generating a first centroid for the video and a first scaling difference relative to the first centroid for the first channel output, and the generating the second scaling value comprises generating a second centroid for the video and a second scaling difference relative to the second centroid for the second channel output.

9. The computer-implemented method of claim 8, wherein the first centroid and the first scaling difference form a first luma correction value for the first channel output and the second centroid and the second scaling difference form a second luma correction value for the second channel output.

10. The computer-implemented method of claim 8, wherein the first scaling difference and the second scaling difference are at a block level of multiple blocks of the frame.

11. The computer-implemented method of claim 8, wherein the first scaling difference and the second scaling difference are at a frame level of multiple frames of the video.

12. The computer-implemented method of claim 8, wherein the generating the first scaling value comprises generating a first step size for the first centroid for the video, and the generating the second scaling value comprises generating a second step size for the second centroid for the video.

13. The computer-implemented method of claim 12, wherein the generating the first scaling value further comprises generating a first step size for the first scaling difference, and the generating the second scaling value further comprises generating a second step size for the second scaling difference.

14. The computer-implemented method of claim 8, wherein the generating the first scaling value comprises generating a first step size for the first scaling difference, and the generating the second scaling value comprises generating a second step size for the second scaling difference.

15. A non-transitory computer-readable medium storing code that, when executed by a device, causes the device to perform a method comprising:

performing a video coding on a frame of a video that generates first pixel values and first sample values based on a prediction for the frame at a first resolution;

generating a first set of features at a first resolution, by a machine learning model, for a first input at the first resolution of the first pixel values and the first sample values of the frame;

generating a second set of features at a second lower resolution than the first resolution, by the machine learning model, for a second input based on the first pixel values and the first sample values of the frame;

upsampling the second set of features to the first resolution to generate an upsampled second set of features;

generating, by the machine learning model, a multiple channel output based on the first set of features and the upsampled second set of features;

generating a modified version of the frame based on the video coding;

generating a correction value based on the multiple channel output; and transmitting the modified version of the frame and the correction value to storage or to a display device.

16. The non-transitory computer-readable medium of claim 15, wherein the generating the correction value comprises generating a first scaling value for a first channel output of the multiple channel output and a second scaling value for a second channel output of the multiple channel output.

17. The non-transitory computer-readable medium of claim 16, wherein the method further comprises sending an indication to the display device to indicate the first scaling value is to be reused for a different portion of the video.

18. The non-transitory computer-readable medium of claim 16, wherein the generating the first scaling value comprises generating a first centroid for the video and a first scaling difference relative to the first centroid for the first channel output, and the generating the second scaling value comprises generating a second centroid for the video and a second scaling difference relative to the second centroid for the second channel output.

19. The non-transitory computer-readable medium of claim 18, wherein the generating the first scaling value comprises generating a first step size for the first centroid for the video, and the generating the second scaling value comprises generating a second step size for the second centroid for the video.

20. The non-transitory computer-readable medium of claim 19, wherein the generating the first scaling value further comprises generating a first step size for the first scaling difference, and the generating the second scaling value comprises generating a second step size for the second scaling difference.

* * * * *